United States Patent
Nhan et al.

(10) Patent No.: US 11,232,120 B1
(45) Date of Patent: Jan. 25, 2022

(54) SCHEMA VIEWER SEARCHING FOR A DATA ANALYTICS PLATFORM

(71) Applicant: Tableau Software, LLC, Seattle, WA (US)

(72) Inventors: Thomas Nhan, Seattle, WA (US); Elaine Weatherfield Sulc, Seattle, WA (US); Nylah Ann McClellan DePass, Grand Prairie, TX (US); Susan Denise Doan, Brier, WA (US); Allison Chia-Chun Sun, Los Altos, CA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 16/944,076

(22) Filed: Jul. 30, 2020

(51) Int. Cl.
| | |
|---|---|
| *G06F 16/242* | (2019.01) |
| *G06F 16/248* | (2019.01) |
| *G06F 3/0488* | (2013.01) |
| *G06F 3/0482* | (2013.01) |
| *G06F 16/21* | (2019.01) |

(52) U.S. Cl.
CPC .......... *G06F 16/248* (2019.01); *G06F 3/0482* (2013.01); *G06F 3/04883* (2013.01); *G06F 16/212* (2019.01); *G06F 16/2423* (2019.01)

(58) Field of Classification Search
CPC ................................................ G06F 16/2423
USPC ......................................................... 715/722
See application file for complete search history.

(56) References Cited

U.S. PATENT DOCUMENTS

| | | | | |
|---|---|---|---|---|
| 7,233,940 | B2 * | 6/2007 | Bamberger | G06F 11/006 |
| 7,669,147 | B1 * | 2/2010 | Molander | G06F 3/0482 |
| | | | | 715/854 |
| 10,042,533 | B2 * | 8/2018 | Kim | G06F 3/0486 |
| 10,156,975 | B1 * | 12/2018 | Kim | G06F 16/26 |
| 10,242,079 | B2 * | 3/2019 | Kim | G06F 16/2453 |
| 10,248,720 | B1 * | 4/2019 | Wesley | G06F 16/34 |
| 10,380,140 | B2 * | 8/2019 | Sherman | G06F 16/54 |
| 10,394,691 | B1 * | 8/2019 | Cole | G06F 11/3612 |
| 10,489,045 | B1 * | 11/2019 | Kim | G06F 3/0482 |
| 10,515,093 | B2 * | 12/2019 | Sherman | G06F 16/258 |
| 10,515,121 | B1 * | 12/2019 | Setlur | G10L 15/1815 |
| 10,521,077 | B1 * | 12/2019 | Beran | G06F 3/04842 |

(Continued)

OTHER PUBLICATIONS

"Worksheet in Tabeau Desktop", published on Aug. 11, 2016, by Helpfolder, online available at[https://www.youtube.com/watch?v=8M438DRiaZs], 7 pages. (Year: 2016).*

(Continued)

*Primary Examiner* — Reza Nabi
(74) *Attorney, Agent, or Firm* — Morgan, Lewis & Bockius LLP

(57) ABSTRACT

A method for analyzing data from data sources includes receiving user selection of a data source and displaying an interface that includes a schema region and a search box. Each data field in the schema region is associated with a respective system-defined object from the data source. The method also includes receiving user input in the search box. The user input includes a predefined contiguous string of characters specifying a search parameter. The method also includes, in response to the user input in the search box, filtering the data fields displayed in the schema region, thereby displaying only data fields whose data type matches the data type specified by the search parameter.

18 Claims, 68 Drawing Sheets

(56) References Cited

U.S. PATENT DOCUMENTS

| | | | | |
|---|---|---|---|---|
| 10,656,779 B1* | 5/2020 | Rueter | | G06F 16/904 |
| 10,691,304 B1* | 6/2020 | Anand | | G06F 3/0482 |
| 10,698,593 B1* | 6/2020 | Martin | | G06F 16/248 |
| 10,795,902 B1* | 10/2020 | Setlur | | G06F 16/248 |
| 10,795,908 B1* | 10/2020 | Talbot | | G06F 16/9024 |
| 10,817,527 B1* | 10/2020 | Setlur | | G06F 3/04847 |
| 10,860,622 B1* | 12/2020 | Florissi | | G06F 7/08 |
| 10,877,970 B1* | 12/2020 | Brochu | | G06F 16/26 |
| 10,884,574 B1* | 1/2021 | Rueter | | G06F 3/04812 |
| 10,884,694 B1* | 1/2021 | Moy | | H04L 65/403 |
| 10,885,057 B2* | 1/2021 | Pugh | | G06F 16/904 |
| 10,891,041 B1* | 1/2021 | Johnson | | G06F 3/04847 |
| 10,896,297 B1* | 1/2021 | Tory | | G06F 40/289 |
| 10,896,531 B1* | 1/2021 | Ting | | G06T 11/206 |
| 10,996,835 B1* | 5/2021 | Gyldenege | | G06F 40/177 |
| 10,997,217 B1* | 5/2021 | Nielsen | | G06F 16/2308 |
| 11,010,396 B1* | 5/2021 | Setlur | | G06F 3/04847 |
| 11,030,207 B1* | 6/2021 | Setlur | | G06K 9/6223 |
| 11,030,256 B2* | 6/2021 | Talbot | | G06F 3/04842 |
| 11,042,558 B1* | 6/2021 | Hearst | | G06F 40/18 |
| 11,055,489 B2* | 7/2021 | Djalali | | G06F 3/0481 |
| 11,061,534 B2* | 7/2021 | Kim | | G06F 16/254 |
| 11,068,122 B2* | 7/2021 | Mackinlay | | G06Q 40/025 |
| 11,068,131 B1* | 7/2021 | Atallah | | G06F 16/252 |
| 2008/0059912 A1* | 3/2008 | Scherpa | | G06F 3/0481 |
| | | | | 715/853 |
| 2016/0224532 A1* | 8/2016 | Miller | | G06F 16/00 |
| 2016/0224614 A1* | 8/2016 | Robichaud | | G06Q 10/103 |
| 2017/0286502 A1* | 10/2017 | Bar-Or | | G06F 16/2423 |
| 2017/0316084 A1* | 11/2017 | Pogrebtsov | | G06T 11/206 |
| 2020/0125602 A1* | 4/2020 | Sezgin | | G06F 16/367 |

OTHER PUBLICATIONS

IBM, "IBM Cognos Report Studio Version 10.2.1 user guide", published on Sep. 2012, 1056 pages. Teaches user interface where user can visualize data from plurality of data sources via drag and drop data fields to visualizaiton region. (Year: 2012).*

* cited by examiner

---
920 In the second display mode, detect a user gesture corresponding to the first data field.
---

---
922 In accordance with detecting the user gesture corresponding to the first data field, display a system-defined object that is associated with the first data field.
---

| 1074 Automatically generate a name and caption associated with the calculated data field. |

SCHEMA VIEWER SEARCHING FOR A DATA ANALYTICS PLATFORM

RELATED APPLICATIONS

This application is related to U.S. application Ser. No. 16/944,047, filed Jul. 30, 2020, entitled "Analyzing Data Using Data Fields from Multiple Objects in an Object Model," which is incorporated by reference herein in its entirety.

This application is related to U.S. application Ser. No. 16/944,056, filed Jul. 30, 2020, entitled "Using Objects in an Object Model as Database Entities," which is incorporated by reference herein in its entirety.

TECHNICAL FIELD

The disclosed implementations relate generally to analyzing data from data sources, and more specifically to analyzing data using data visualizations constructed according to data fields from multiple objects in an object model.

BACKGROUND

Data visualization applications enable a user to understand information in a database visually, including distribution, trends, outliers, and other factors that are important to making business decisions. In some cases, it is necessary for a user to access information from different data sources or tables to build a data visualization or create a custom calculation. For example, a large database may include hundreds or thousands of distinct tables or views, and it is frequently necessary to combine many of the tables in order to get a desired result. In some cases, a user's analysis requires access to more than one database (e.g., one or more tables in an SQL database and also data stored in a spreadsheet or CSV file). When there are many objects, it can be difficult for a user to find or access the right data.

Some data visualization applications provide a user interface that enables users to build data visualizations and perform calculations. However, when using data from more than one object or table in the database, information regarding relationships between the objects may be required, or the tables may need to be joined in order to generate a new data set that includes data from multiple tables needed for a data visualization.

In some cases, users do not know how the data from the tables will be used and thus may not be able to specify join types in anticipation of what questions can or will be asked from the data. Thus, the technical problem of using data from multiple objects or tables to build a data visualization or calculation can be particularly challenging.

SUMMARY

Analyzing data from multiple data sets can be challenging. In some cases, it can help to organize the data as an object model. By storing relationships between different data sets in a database as an object model, relationships between data sets can be leveraged to assist users analyzing the data.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON.

A class is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between them. Classes that are related by 1-to-1 relationships are conceptually treated as a single class, even if they are meaningfully distinct to a user. In addition, classes that are related by 1-to-1 relationships may be presented as distinct classes in a data visualization user interface. Many-to-many relationships are conceptually split into two many-to-one relationships by adding an associative table capturing the relationship. Thus, in a hierarchical object model, the objects are organized in a hierarchical order based on their classes. FIG. 1A provides an example of how a database that includes multiple logical tables may be organized in a hierarchical object model of object classes. As used herein, an object class is typically referred to as a "data object" or a "data set." In some implementations, object model may include different data objects that are obtained from different databases. For example, a first data object may be stored in an SQL database, a second data object may be stored as a desktop file (such as a spreadsheet file or a CSV file), and a third data object may be stored in cloud storage. In some instances, a data object corresponds almost exactly to a single physical table in a database. In some instances, a single physical table in a database corresponds to two or more logically distinct data objects that have been combined by a union and/or a join.

In some implementations, a user may combine multiple physical tables (e.g., using joins and/or unions) to form one master table. In many cases such a master table is a logical table that is constructed on the fly as needed, but in some cases the master table is materialized as another physical table (e.g., in a data warehouse). Either way, the master table can be designated as a single data object. In particular, users can construct new objects from existing objects. Users can also create individual new data fields using data from one or more existing objects. When defining a new calculated data field, an important question is to determine where the new data field belongs in the object model. As described below, some implementations are able to determine where a new data field belongs based on the objects used to create the new data field and the relations between those objects. For example, a scalar calculation using data fields from a single object creates a new data field that is a member of the same single object.

Once an object model is constructed, a data visualization application can assist a user in various ways. In some implementations, data fields may be displayed to a user organized hierarchically based on the object model. Alternatively, a data visualization application may present the data fields to a user based on a user-defined organization scheme, such as displaying the data fields based on their associations with user-defined folders. User-defined folders are particularly useful to users who access the same data sources repeatedly, but access only a small number of the available data fields.

In some implementations, the data visualization application provides the user with relevant information, such as identifying which data fields are used in a data visualization or calculation, or the number of records from a data object that are used in a data visualization or a calculation. In another example, the data visualization application may also identify data fields that are not used in any data visualizations or calculations.

By allowing the user to use data fields across multiple data sets in a database without having to combine the data sets into a single data set, the data visualization application allows users greater flexibility in working with their data as well as preventing aggregation errors that can occur when all of the data objects are combined into a single monolithic data set before generating a data visualization. This is explained in more details in U.S. application Ser. No. 16/246,611, filed Dec. 30, 2018, entitled "Generating Data Visualizations According to an Object Model of Selected Data Sources," U.S. application Ser. No. 16/236,612, filed Dec. 30, 2018, entitled "Generating Data Visualizations According to an Object Model of Selected Data Sources," and U.S. patent application Ser. No. 16/570,969, filed Sep. 13, 2019, entitled "Utilizing Appropriate Measure Aggregation for Generating Data Visualizations of Multi-Fact Datasets," each of which is incorporated by reference herein in its entirety.

(A1) In accordance with some implementations, a method for analyzing data from data sources is performed at a computer having one or more processors and memory. The memory stores one or more programs configured for execution by the one or more processors. The computer receives user selection of a data source and displays a data visualization user interface. The data visualization user interface includes a schema region, a data visualization region, and a plurality of shelf regions. Each shelf region is configured to define a respective characteristic of a displayed data visualization according to placement of data fields from the schema region into the respective shelf region. Each data field in the schema region is associated with a respective system-defined object from the data source. In a first display mode, displaying the schema region includes hierarchically displaying each system-defined object and the data fields associated with the respective system-defined object. In the first display mode, the computer receives a user input to switch from the first display mode to a second display mode. In the second display mode, each data field is displayed hierarchically in a respective user-defined folder and the user-defined folders are distinct from the system-defined objects. In either the first display mode or the second display mode, the computer receives user selection of a first data field from the schema region and user placement of the first data field into a first shelf region. The computer also receives user selection of a second data field from the schema region and user placement of the second data field into a second shelf region. (The placement of the first data field and the placement of the second data field may be performed in the same display mode or in different display modes.) In accordance with placement of the first data field into the first shelf region and placement of the second data field into the second shelf region, the computer generates and displays a data visualization in the data visualization region using data for the first data field and data for the second data field retrieved from the data source.

(A2) In some implementations, the computer automatically generates a new data field that specifies the number of records in a first system-defined data object. The computer also automatically associates the new data field with the first system-defined object. In the first display mode, the computer displays the new data field in association with the first system-defined object. The "number of records" data field is a calculation that depends on context. The context includes what filters are applied. If some rows are being filtered out in a data visualization, then only the unfiltered rows add to the "number of records." In addition, the number of records is split based on the visualization level of detail. For example, if the data is grouped by a Region data field, then the "number of records" data field computes the corresponding number of records for each of the Regions.

(A3) In some implementations, in the second display mode, the computer detects a user gesture (e.g., click or hover) corresponding to the first data field. In accordance with detection of the user gesture corresponding to the first data field, the computer displays the system-defined object that is associated with the first data field (e.g., in a popup or tooltip).

(A4) In some implementations, the first data field corresponds to (e.g., belongs to) a first system-defined object and the second data field corresponds to (e.g., belongs to) a second system-defined object that is distinct from the first system-defined object. In particular, a user can select data fields from any of the objects.

(A5) In some implementations, in either the first display mode or the second display mode, and in accordance with placement of the first data field into the first shelf region and placement of the second data field into the second shelf region, the computer automatically joins the first system-defined object with the second system-defined object to retrieve data for the desired data visualization. In some implementations, the computer determines a join type between the first system-defined object and the second system-defined object based on the placement of the first and second data fields into the first and second shelf regions, and then the computer generates a joined table based on the join type. The computer then generates a data visualization based on the joined table. In some implementations, the join type is based on which data fields are selected by the user and the relationships between the data objects in the object model that connect the selected data fields.

(A6) In some implementations, the first system-defined object is linked to the second system-defined object through a sequence of one or more relationships and at least one of the relationships in the sequence of one or more relationships is a many-to-many relationship. In some implementations, at least one of the relationships in the sequence of one or more relationships is a many-to-one relationship (A7) In some implementations, the computer receives user input to create a calculated data field using a fourth data field belonging to a third system-defined object. In accordance with the user input to create the calculation, the computer automatically generates a name and a caption for the calculation.

(A8) In some implementations, in accordance with receiving the user input to create a new calculated data field, the computer automatically associates the calculated data field with the third system-defined object.

(A9) In some implementations, in either the first display mode or the second display mode, the computer displays a search box in the schema region. The computer receives, in the search box, user input that includes a predefined contiguous string of characters that specify a parameter of a search. In response to the user input in the search box, the computer filters the data fields displayed in the schema region, displaying only data fields whose data type matches a data type specified by the search parameter.

(A10) In some implementations, in the second display mode, the computer receives user input to associate a fifth data field with a first user-defined folder and user input to associate a sixth data field with the first user-defined folder. The fifth data field is associated with a sixth system-defined object, the sixth data field is distinct from the fifth data field, and the sixth data field is associated with a seventh system-defined object that is distinct from the sixth system-defined object. In the second display mode, the computer displays the fifth data field and the sixth data field in association with the first user-defined folder. The computer receives user input to switch from the second display mode to the first display mode. In the first display mode, the computer displays, in the schema region, the fifth data field as associated with the sixth system-defined object and the sixth data field as associated with the seventh system-defined object.

(B1) In accordance with some implementations, a method for analyzing data from data sources is performed at a computer having one or more processors and memory. The memory stores one or more programs configured for execution by the one or more processors. The computer receives user input to specify a mathematical expression. The mathematical expression includes a first data field from a first system-defined object and a second data field from a second system-defined object. The second data field is distinct from the first data field. The first object and the second object are distinct objects of an object model comprising a tree in which each relation between objects represents a respective many-to-one relationship between respective objects. The computer then generates a calculated data field based on the mathematical expression and automatically assigns the calculated data field as a member of a third object in the object model according to relations in the tree connecting the first object to the second object.

(B2) In some instances, the third object is distinct from the first object and distinct from the second object.

(B3) In some instances, the tree includes a many-to-one relationship from the third object to the first object and a many-to-one relationship from the third object to the second object, and the third object is distinct from each of the first object and the second object.

(B4) In some instances, the third object is the same as the first object or the third object is the same as the second object.

(B5) In some instances, the tree includes a many-to-one relationship from the first object to the second object. In such cases, assigning the calculated data field as a member of the third object in the object model includes assigning the calculated data field as a member of the first object.

(B6) In some instances, the mathematical expression includes a third data field from a fourth object. The tree includes a many-to-one relationship from the first object to the second object and a many-to-one relationship from the first object to the fourth object. In such cases, assigning the calculated data field as a member of the third object in the object model includes assigning the calculated data field as a member of the first object.

(B7) In some instances, the mathematical expression includes a third data field from a fourth object, distinct from the first object and distinct from the second object. The tree includes: 1) a many-to-one relationship from the third object to the first object, 2) a many-to-one relationship from the third object to the second object, and 3) a many-to-one relationship from the third object to the fourth object. The third object is distinct from each of the first object, the second object, and the fourth object.

(B8) In some implementations, assigning the calculated data field as a member of the third object in the object model includes identifying a set of candidate objects. Each candidate object has a respective sequence of zero or more many-to-one relations in the tree from the respective candidate object to each of the first and second objects. Assigning the calculated data field as a member of the third object in the object model includes selecting the third object as an object in the set of candidate objects having a smallest total sequence length to the first and second objects.

(B9) In some implementations, each of the first object, the second object, and the third object belongs to a same data source.

(B10) In some implementations, the computer receives a user selection to include the calculated data field in a data visualization and generates and displays the data visualization according to calculated data values for the calculated data field.

(B11) In some implementations, the computer automatically generates a name and a caption associated with the calculated data field.

(B12) In some implementations, in a first display mode of a user interface, the computer displays, in a schema region of the user interface, the calculated data field as belonging to the third object.

(B13) In some implementations, the computer receives, in the first display mode, a user input to switch from the first display mode to a second display mode that is different from the first display mode. In the second display mode, the computer displays, in the schema region of the user interface, the calculated data field as belonging to a default folder.

(B14) In some implementations, in the second display mode, the computer receives user input to associate the calculated data field with a user-defined folder that is distinct from the default folder. The computer also displays, in the schema region of the user interface, the calculated data field as belonging to the user-defined folder.

(B15) In some implementations, in the second display mode, the computer receives user input to associate the first data field with the user-defined folder and displays, in the schema region of the user interface, the first data field and the calculated data field as belonging to the user-defined folder.

(B16) In some implementations, the computer displays a search box in the schema region and receives user input in the search box. The user input includes a predefined contiguous string of characters that specify a parameter of a search. In response to the user input in the search box, the computer filters the data fields displayed in the schema region, displaying only data fields whose data type matches a data type specified by the search parameter.

(B17) In some implementations, the predefined contiguous string of characters includes "C:" and the user input includes the predefined contiguous string of characters followed by one or more characters specifying a search term. The predefined contiguous string of characters specify a search of calculated data fields whose calculation expressions include the search term.

(C1) In accordance with some implementations, a method for analyzing data from data sources is performed at a computer having one or more processors and memory. The memory stores one or more programs configured for execution by the one or more processors. The computer receives user selection of a data source and displays a data visualization user interface that includes a schema region and a search box. Each data field displayed in the schema region is associated with a respective system-defined object from the data source. In a first display mode, the computer displays the schema region by hierarchically displaying each system-defined object and the data fields associated with the respective system-defined object. The computer receives user input to switch from the first display mode to a second display mode. In the second display mode, each data field is displayed hierarchically in a respective user-defined folder, and the user-defined folders are distinct from the system-defined objects. In either the first display mode or the second display mode, the computer receives user input in the search box. The user input includes a predefined contiguous string of characters that specify a search parameter. In response to the user input in the search box, the data fields displayed in the schema region are filtered such that the computer displays only data fields whose data type matches the data type specified by the search parameter.

(C2) In some implementations, the user input includes the predefined contiguous string of characters followed by one or more characters specifying a search string. Filtering the data fields displayed in the schema region includes displaying only data fields whose displayed names include the search string.

(C3) In some implementations, the user input includes the predefined contiguous string of characters followed by one or more characters specifying a search string. The search parameter specifies searching for calculated data fields. Filtering the data fields displayed in the schema region includes displaying only data fields whose displayed names include the search string or whose corresponding calculation expressions include the search string.

(C4) In some implementations, the data type specified by the search parameter is one of (i) dimension, (ii) measure, or (iii) calculation.

(C5) In some implementations, receiving the user input in the search box includes detecting a user gesture to display a list of predefined search parameters. In response to detecting the user gesture, the computer displays a list of predefined search parameters. In response to receiving a user selection from the displayed list, the computer automatically populates the search box with the predefined contiguous string of characters corresponding to the user selection from the displayed list.

(C6) In some implementations, the computer continues to display only data fields whose data type matches the data type specified by the search parameter in response to receiving the user input to switch from the first display mode to the second display mode.

(C7) In some implementations, the schema region includes the search box.

(C8) In some implementations, the computer receives user selection of a data field displayed in the schema region and user placement of the selected data field into a data visualization definition region of the data visualization user interface. The computer also generates a data visualization based on the user selection and placement, and displays the generated data visualization, including one or more visual marks corresponding to data from the selected data field.

(C9) In accordance with some implementations, a method for analyzing data from data sources is performed at a computer having one or more processors and memory. The memory stores one or more programs configured for execution by the one or more processors. The computer receives user selection of a data source and displays a data visualization user interface that includes a schema region and a search box. Each data field displayed in the schema region is associated with a respective system-defined object from the data source. In a first display mode, the computer displays the schema region by hierarchically displaying each system-defined object and the data fields associated with the respective system-defined object. The computer receives user input to switch from the first display mode to a second display mode. In the second display mode, each data field is displayed hierarchically in a respective user-defined folder, and the user-defined folders are distinct from the system-defined objects. In either the first display mode or the second display mode, the computer receives user input, in the search box. The user input includes (i) a predefined contiguous string of characters specifying a search parameter and (ii) a search string. In response to the user input in the search box and a determination that the search parameter specifies a first metadata characteristic about data fields in the data source, the computer filters the data fields displayed in the schema region, displaying only data fields whose first metadata characteristic includes the search string.

(C10) In some implementations, the first metadata characteristic stores user-provided comments about data fields from the data source.

(C11) In some implementations, the computer detects a user gesture corresponding to a first data field displayed in the schema region, and in response to detecting the user gesture, the computer displays a comment associated with the first data field.

(C12) In some implementations, the schema region includes the search box.

In accordance with some implementations, a system for analyzing data from data sources includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided for analyzing data from data sources.

BRIEF DESCRIPTIONS OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIGS. 9A-9G provide a flow chart for a method of analyzing a data source with multiple data objects in accordance with some implementations.

FIGS. 10A-10F provide a flow chart for a method of analyzing a data source with multiple data objects in accordance with some implementations.

Figure 11A:
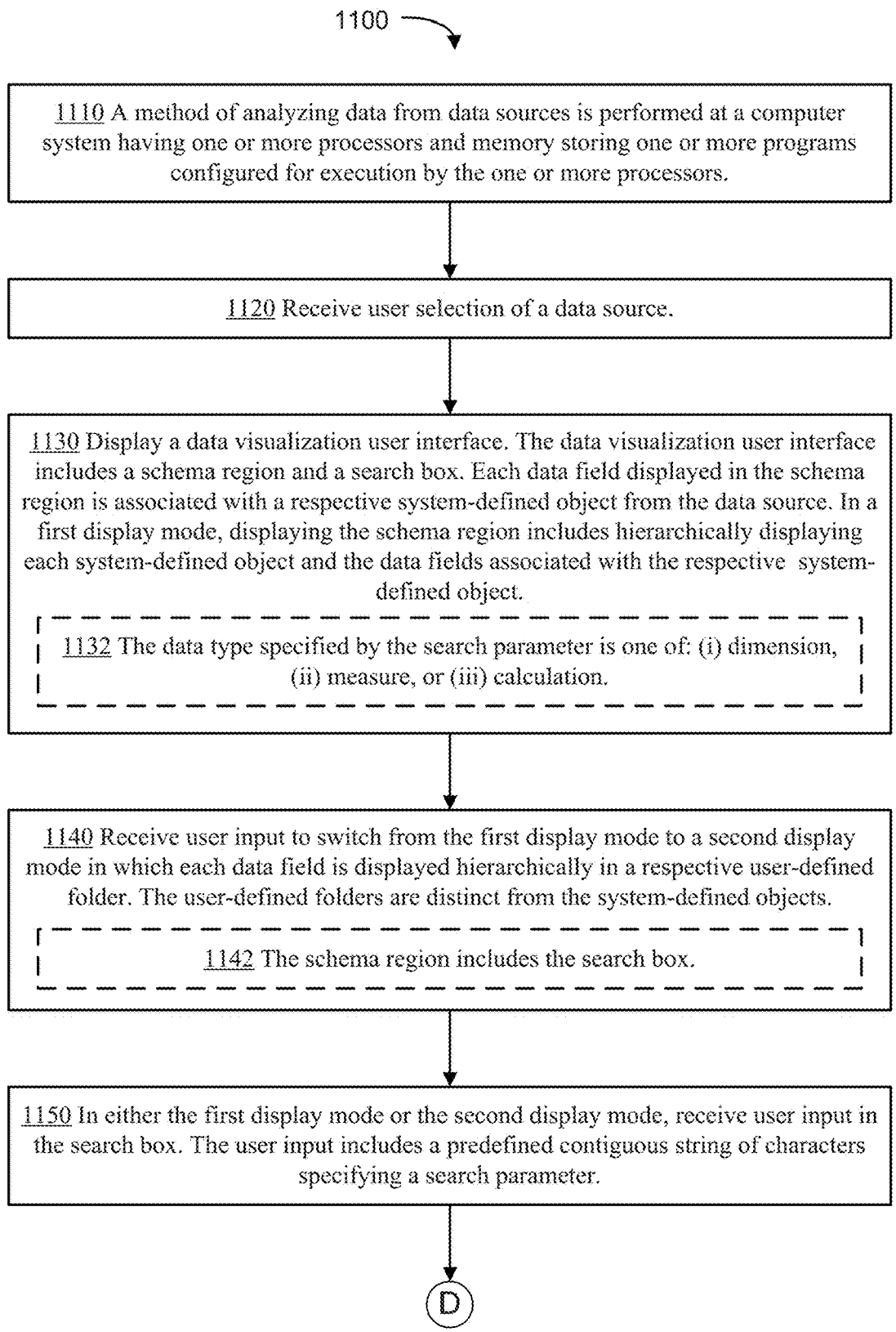
Figure 11B:
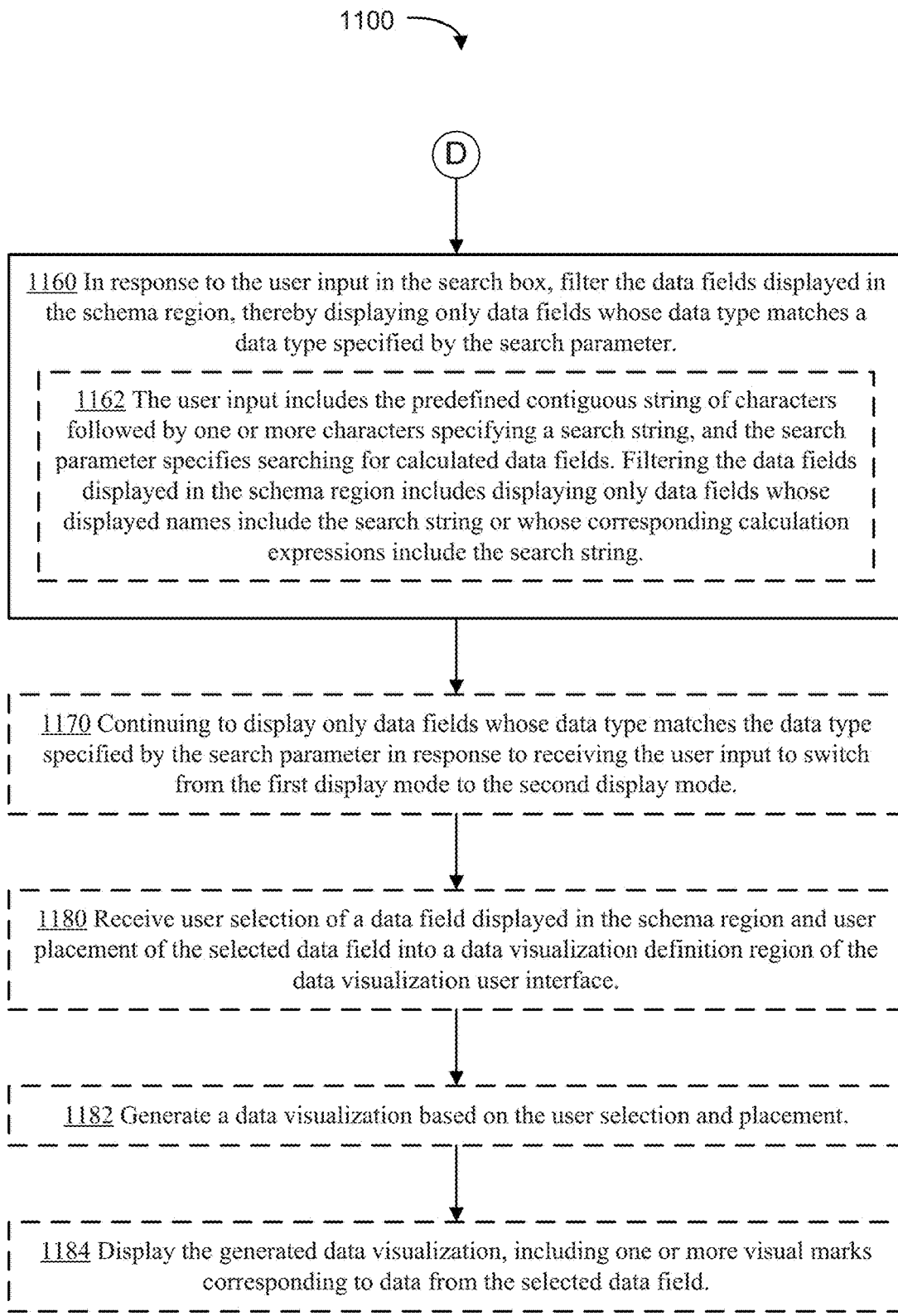

FIGS. 11A-11B provide a flow chart for a method of analyzing a data source in accordance with some implementations.

Figure 12A:
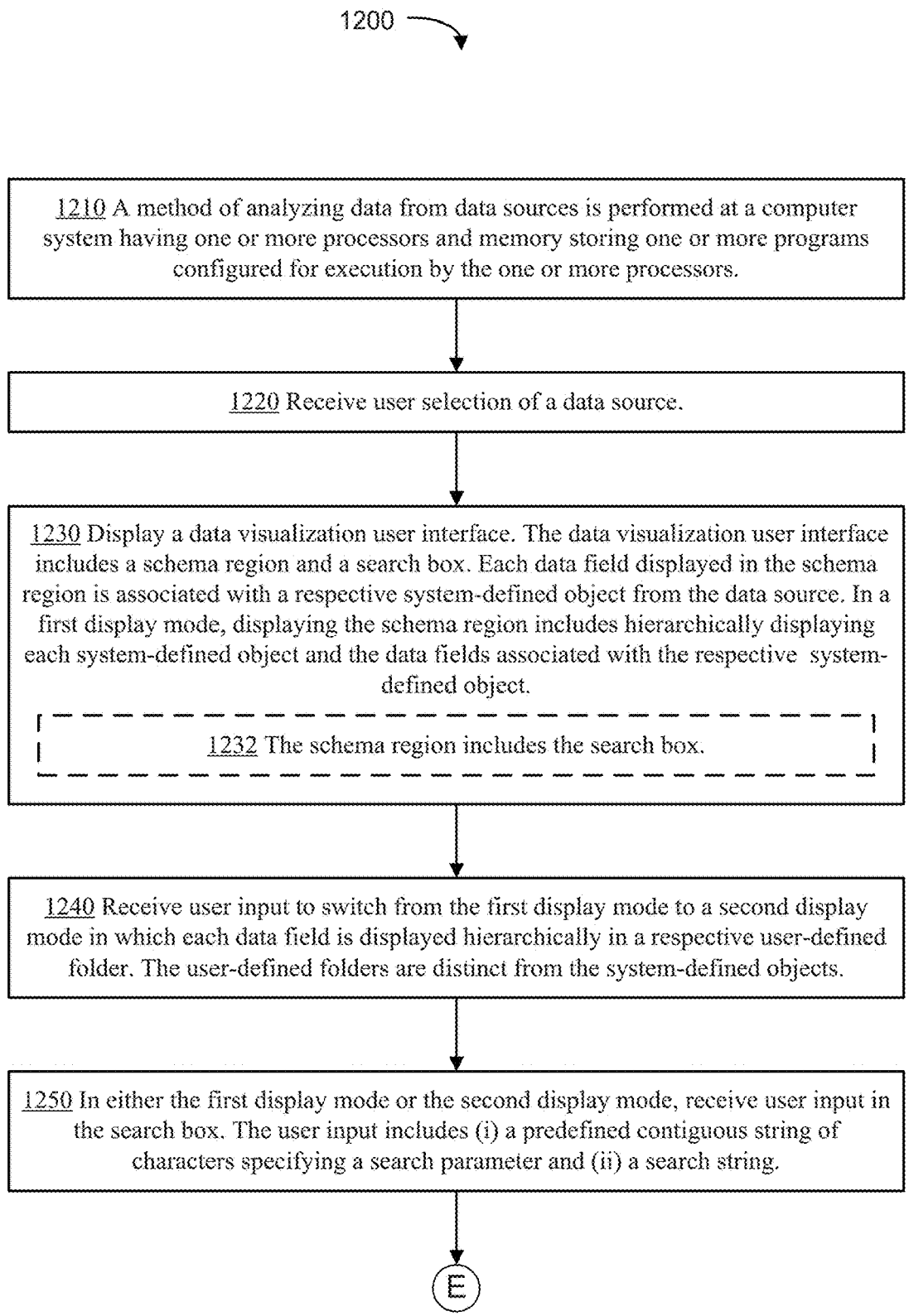
Figure 12B:
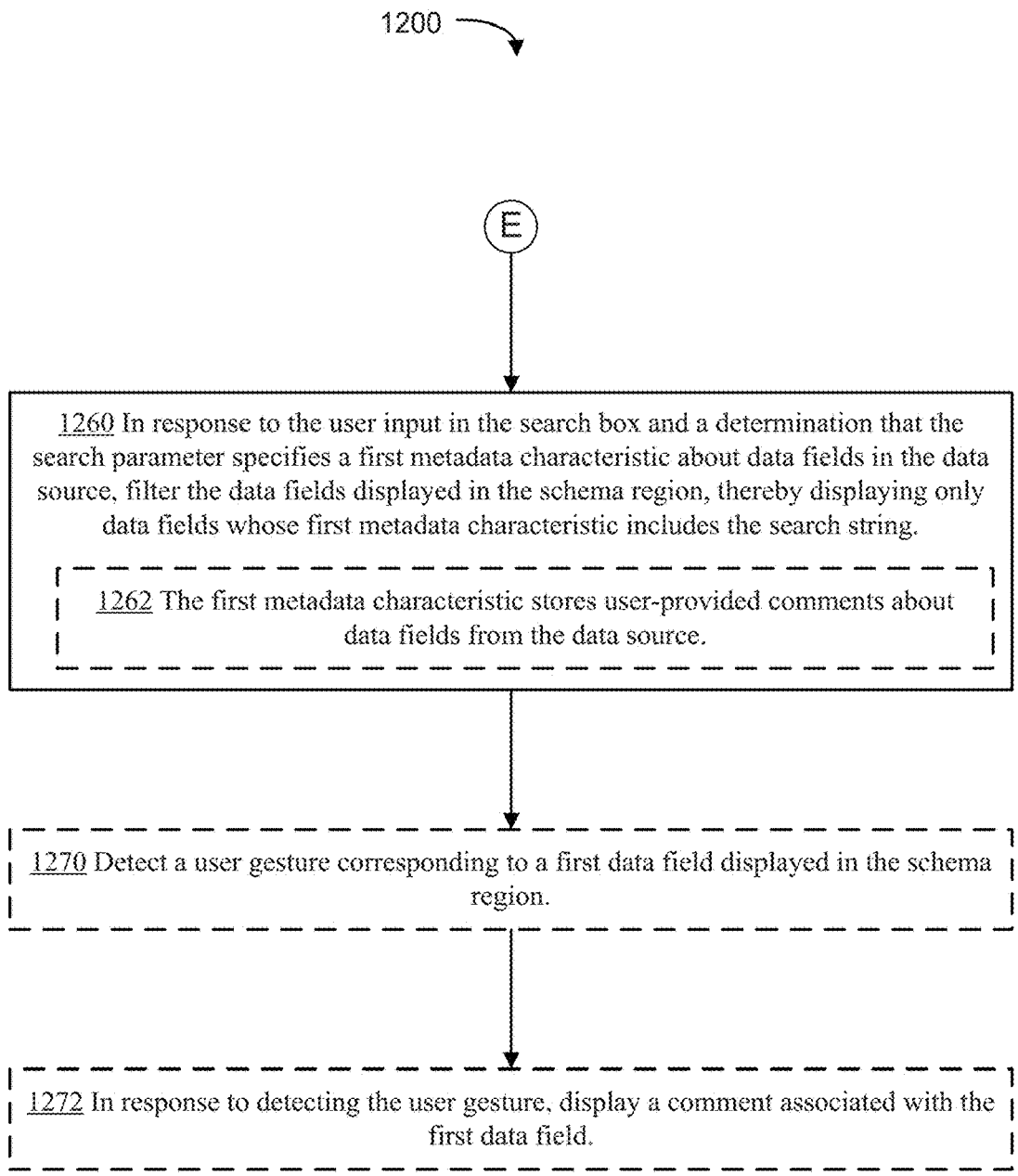

FIGS. 12A-12B provide a flow chart for a method of searching for data fields in a data visualization user interface in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1A:
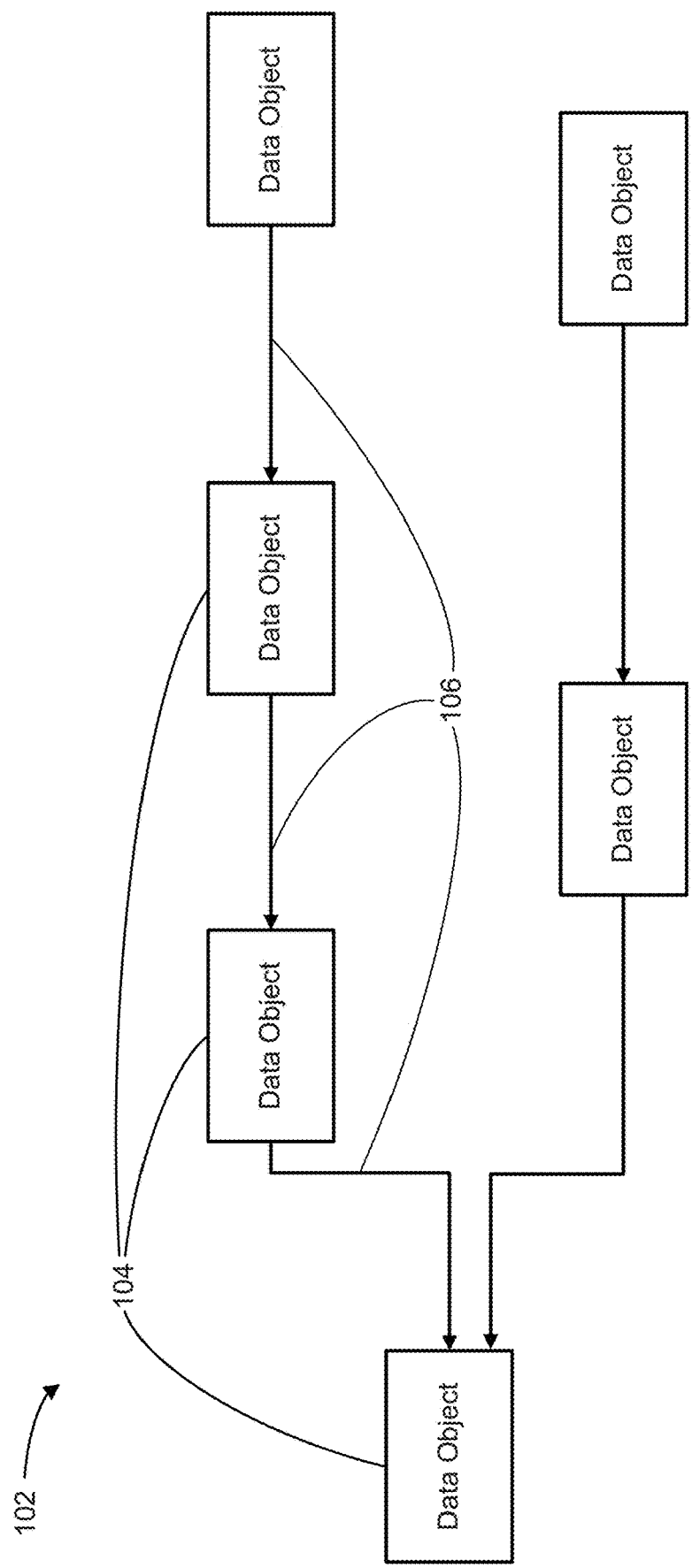
FIG. 1A illustrates example of an object model representation of a multi-object data source in accordance with some implementations.

Some implementations of an interactive data visualization application use an object model 102 to show relationships 106 between data objects 104, as shown in FIG. 1A. The data objects 104 that are part of the object model may be stored locally (e.g., on the same device that is displaying the user interface) or may be stored externally (e.g., on a database server or in the cloud). In this example, each relationship 106 is a many-to-one relationship between two data objects 104 in the object model. (The arrows point from the "one" side of each relationship to the "many" side of the relationship.) The hierarchical structure of the object model allows the relationships between the data objects 104 in the object model to be visualized. The object model 102 may also show characteristics or data fields that are present in each of the data objects 104 and link them to other data fields or characteristics in related data objects. The many-to-one relationships between the data objects 104 shows the organizational structure of the object model 102. In some instances, each data object corresponds to a database table or a distinct physical file.

Some implementations of an interactive data visualization application use an object model 102 to represent a multi-object data source. In some instances, an object model 102 applies to one database (e.g., one SQL database or one spreadsheet file), but an object model may encompass two or more databases. Typically, unrelated databases have distinct object models. In some instances, the object model 102 closely mimics the data model of the physical database (e.g., classes in the object model correspond to data sets or tables in a database). However, in some cases the object model 102 is more normalized (or less normalized) than the physical data sources. An object model 102 groups together attributes (e.g., data fields) that have a one-to-one relationship with each other to form classes (data objects 104), and identifies many-to-one relationships 106 among the classes. In the illustrations below, the many-to-one relationships are illustrated with arrows, with the arrows originating from the "one" side of the relationship and pointing towards the "many" side of each relationship. When an object model is constructed, it can facilitate analyzing data from the data source using data fields that are specified or selected by a user. In some implementations, the data fields correspond to columns in the data set (e.g., in a data table).

Figure 1B:
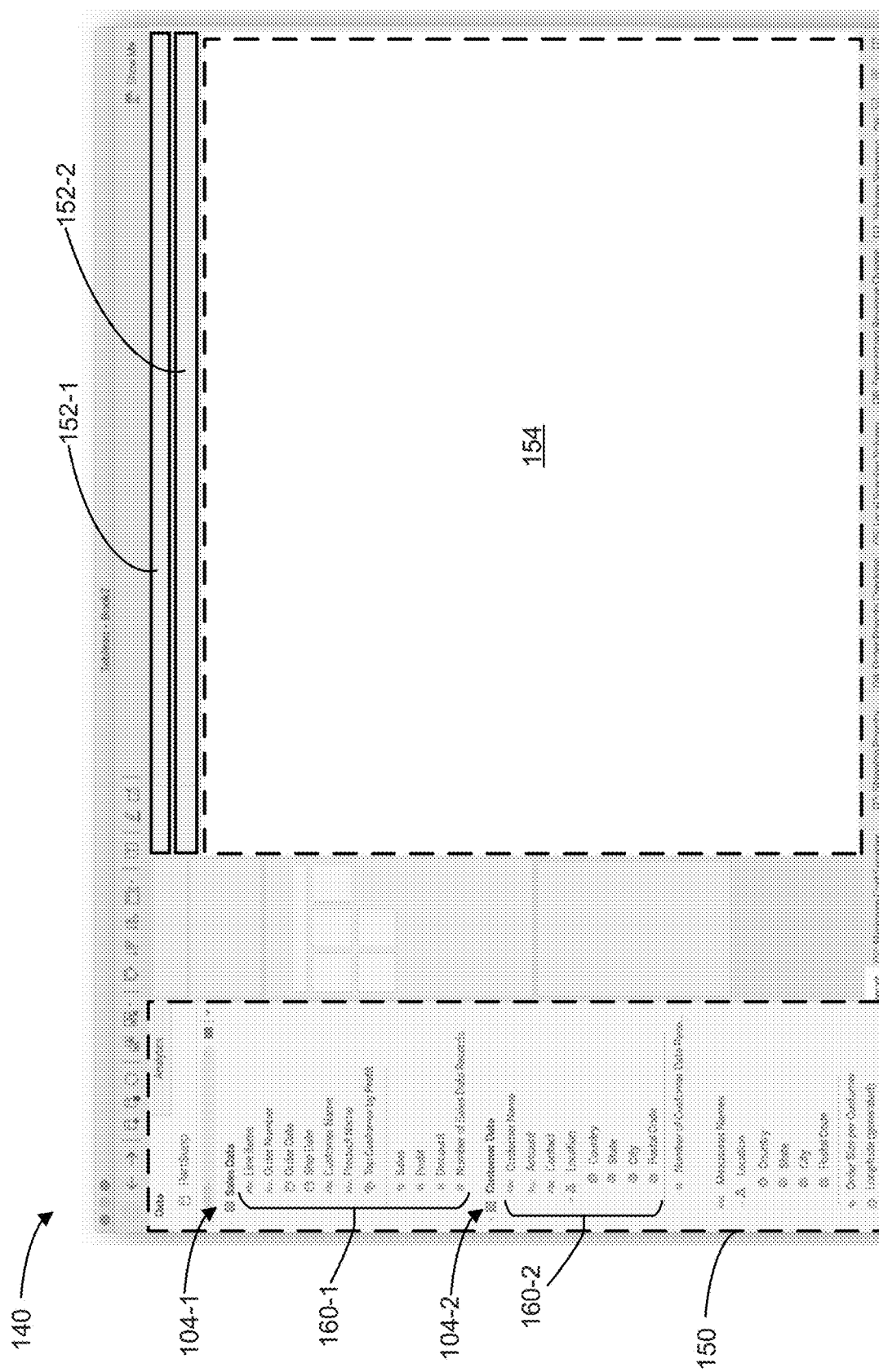
FIG. 1B illustrates an example of a data visualization interface in an object-based display mode in accordance with some implementations.
Figure 1C:
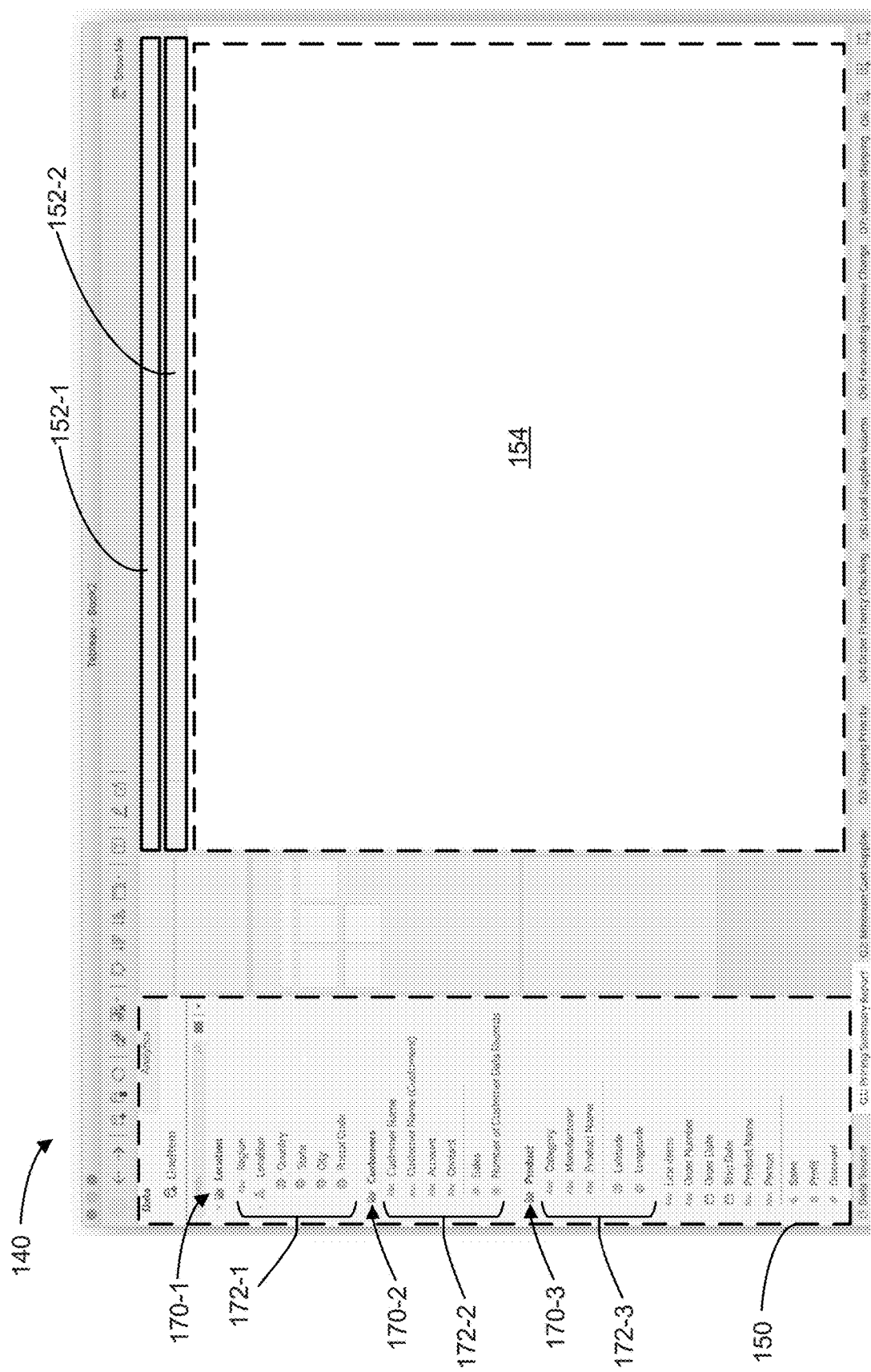
FIG. 1C illustrates an example of a data visualization interface in a folder-based display mode in accordance with some implementations.

In some instances, a user may select data fields from different data objects 104 in the object model 102 to be included for analysis. The data fields may be added to a graphical user interface that allows the user to work with the data, such as generating calculated fields and creating data visualizations. FIGS. 1B and 1C show examples of a graphical user interface for analyzing data in a data source.

FIGS. 1B and 1C show a graphical user interface 140 in an object-based display mode and a folder-based display mode, respectively, in accordance with some implementations. The graphical user interface 140 includes a schema region 150 (also sometimes referred to as a "schema viewer"), a plurality of shelf regions 152 (in this example, two shelf regions 152-1 and 152-2 are shown), and a data visualization region 154. Data fields are shown in the schema region 150. In some implementations, the schema region 150 shows data fields that are selected by the user. In some cases, the schema region 150 shows all data fields that are in object model 102 by default when no data fields are selected by the user. In some cases, the schema region 150 shows all data fields that are included in data objects 104 that are selected by the user. Each shelf region 152 is configured to define a respective characteristic of a displayed data visualization according to placement of data fields from the schema region 150 into the respective shelf region 152. The data visualization region 154 is configured to display data visualizations.

As shown in FIG. 1B, in the object-based display mode, each data field in the schema region 150 is associated with a respective data object 104 of the object model 102. In the object-based display mode, the schema region 150 displays each object 104 and the data fields 160 associated with the respective object 104 in a hierarchical manner. For example, the data fields "Line Items," "Order Number," and "Order date" are all included in the "Sales Data" data object 104-1 and thus, are shown in schema region 150 as belonging to the "Sales Data" data object 104-1 when the data visualization is in the object-based display mode.

For example, in the object-based display mode, the schema region shows two distinct data objects 104, a first data object 104-1 corresponding to a data set entitled "Sales Data", and a second data object 104-2 corresponding to a data set entitled "Customer Data." The data fields 160-1 are shown to be associated with (e.g., are included in, are part of, are nested under, belong to) the "Sales Data" object 104-1. Similarly, the data fields 160-2 are shown to be associated with (e.g., are included in, are part of, are nested under, belong to) the "Customer Data" object 104-2.

Referring to FIG. 1C, in the folder-based display mode, the schema region 150 displays the data fields 160 in a respective user-defined folder 170 in a hierarchical manner. Note that the data fields 160 displayed in FIGS. 1B and 1C correspond to the same data fields 160 from the same object model. For example, a user may select one or more data fields from a data object 104 to be included in a user-defined folder 170. A user-defined folder 170 (e.g., user-defined folders 170-1, 170-2, and 170-3) may include any number of data fields. In some cases, a user-defined folder 170 may include two or more data fields, each of which is associated with a different data object 104 in the object model 102. For example, the "Customers" user-defined folder 170-2 includes two data fields, "Customer Name" from the "Sales Data" object 104-1 and "Customer Name" from the "Customer Data" object 104-2. Thus, any data field can exist in any folder, allowing users to organize the data fields as they see fit.

As shown in FIG. 1C, in the folder-based display mode, the schema region 150 shows 3 distinct user-defined folders, a "Locations" user-defined folder 170-1, a "Customers" user-defined folder 170-2, and a "Product" user-defined folder 170-3. Data fields 172-1 are shown to be associated with (e.g., are included in, are part of, are nested under, belong to) the "Locations" user-defined folder 170-1, data fields 172-2 are shown to be associated with (e.g., are included in, are part of, are nested under, belong to) the "Customers" user-defined folder 170-2, and data fields 173-3 are shown to be associated with (e.g., are included in, are part of, are nested under, belong to) the "Product" user-defined folder 170-3. Note that despite the fact that the data field "Location" belongs to the "Customer Data" object 104-2 (as shown in the object-based display mode in FIG. 1B), in the folder-based display mode, the schema region 150 shows that the data field "Location" belongs to the "Locations" user-defined folder 170-1.

Figure 2A:
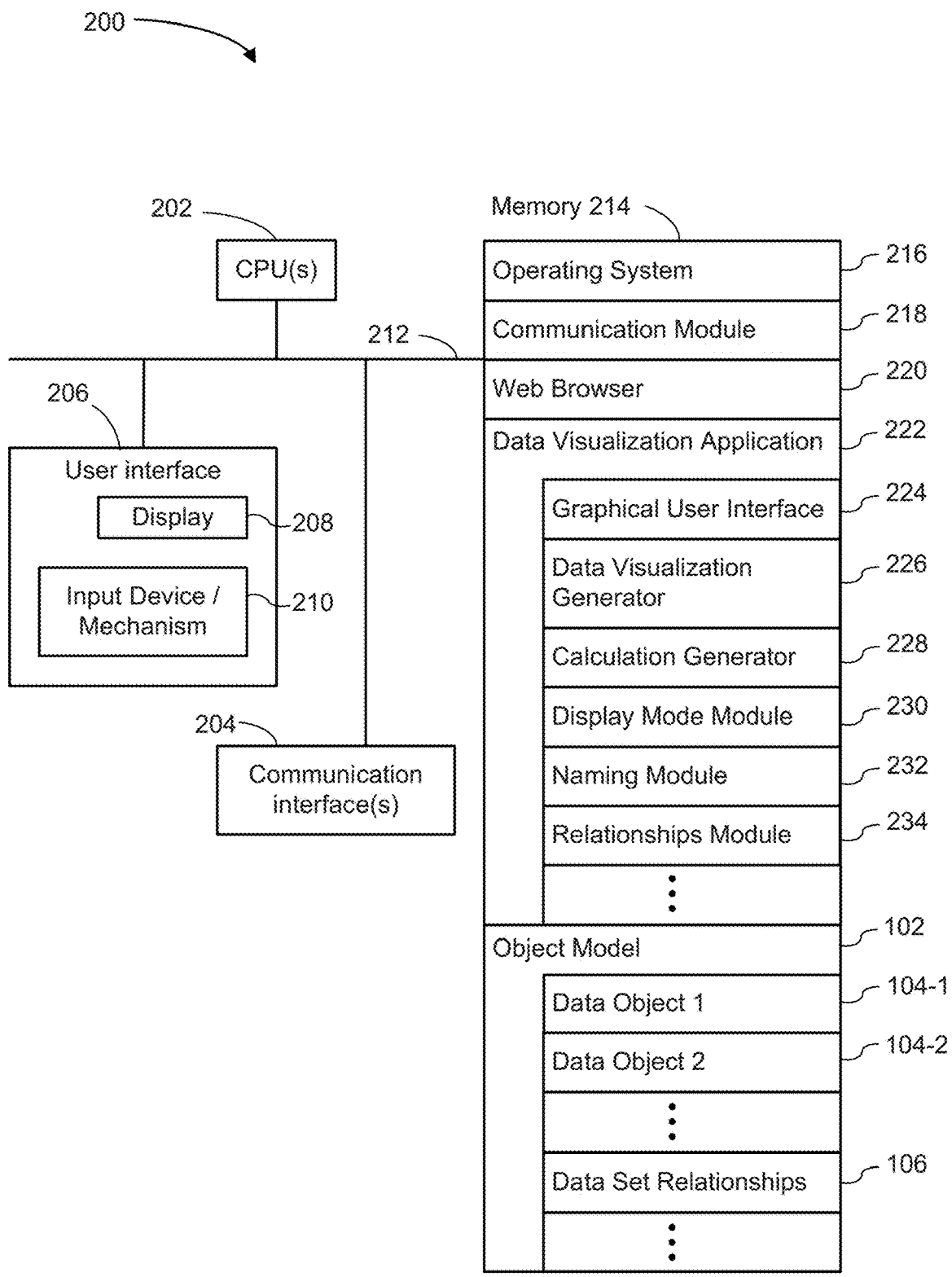
FIG. 2A is a block diagram of a computing device according to some implementations.

FIG. 2A is a block diagram illustrating a computing device 200 (e.g., a client device) that can execute a data visualization application 222 or a data visualization web application to display a data visualization. In some implementations, the computing device displays a graphical user interface 224 for the data visualization application. Computing devices 200 include desktop computers, laptop computers, tablet computers, and other computing devices with a display and a processor capable of running a data visualization application 222. The data visualization application 222 may include a data source generator for database organization (e.g., generating object models for databases) as well as generating new data sources using existing databases. A computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 224 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application);
- the data visualization application 222 includes a graphical user interface 224, which enables a user to build data visualizations by specifying elements visually, and also provides a graphical view to access or build object models and data sources;
- the data visualization application also includes a data visualization generator 226, which generates data visualizations according to user specification. In accordance with some implementations, the data visualization generator 226 generates a data visualization in accordance with user association (e.g., placement) of data fields with respective data shelf regions 152. In some implementations, the data visualization generator 226 generates a data visualization based on characteristics such as data type (e.g., data characteristics) of a data field that is selected by the user for inclusion the data visualization;
- the data visualization application also includes a calculation generator 228, which generates calculated fields based on user-defined mathematical expressions. For example, a user may include one or more data fields in a mathematical expression that defines a calculated field. Calculated fields can be treated in the same way as data fields. For example, calculated fields may be associated with one or more user-defined folders, calculated fields may also be associated with a data object 104 of the object model 102, and calculated fields may be used in generating data visualizations;
- the data visualization application also includes a display mode module 230 that is responsible for the organization and display of data fields in the object-based display mode and the folder-based display mode. In some implementations, the display mode module 230 allows for smooth transitioning between the two display modes and updates the schema region 150 based on which display mode is currently selected (e.g., active). The display mode module 230 also keeps track of user-defined folders 170 and associations between data fields and the user-defined folders in the folder-based display mode;

the data visualization application also includes a naming module 232 that is configured to update names for user-defined folders 170, data objects 104, and data fields. In accordance with some implementations, the naming module 232 is configured to keep track of naming conventions and naming changes implemented by the user. In some implementations, the naming module 232 is configured to automatically rename or generate a new name for a data field that has a same name as another data field such that a user can distinguish between, for example, two data fields entitled "Address," where the first data field includes delivery addresses from a first data object 104-1 and the second data field includes store addresses from a second data object 104-2 that is different from the first data object 104-1;

the data visualization application also includes a relationships module 234 that is responsible for keeping track of the relationships between data objects 104 of object model 102. In accordance with some implementations, the relationships module 234 uses the relationship between two or more data objects 104 of object model 102 in order to automatically determine (e.g., assign, categorize, discern) which data object 104 a generated data visualization or a calculated data field belongs to. In accordance with some implementations, the relationships module 234 uses the relationship between two or more data objects 104 of object model 102 in order to automatically form one or more joins that are specific to a user-defined calculation or a user-defined data visualization; and one or more object models 102, which identify the structure of one or more databases 112. Each object model 102 includes a plurality of data objects (classes), such as a first data object 104-1 and a second data object. Each object model 102 also includes many-to-one relationships 106 between the data objects 104. In some instances, an object model 102 maps each data set or table within a database to a data object 104, with many-to-one relationships 106 between data objects 104 corresponding to foreign key relationships between the data sets. In some instances, the model of an underlying database does not cleanly map to an object model 102 in this simple way, so the object model 102 includes information that specifies how to transform the raw data into appropriate data objects 104. In some instances, the raw data source is a simple file (e.g., a spreadsheet), which is transformed into multiple data sets objects (e.g., one data set per worksheet tab). In some implementations, the object model also includes one or more many-to-many relationships between objects. Because many-to-many relationships provide less information about how the objects are related, some implementations replace each many-to-many relationship with an additional object (e.g., an associative table) and many-to-one relationships to the additional object. This is particularly useful when the associative table corresponds to a meaningful concept. For example, there is a many-to-many relationship between Customers and Products for a store. These two objects are related by transactions in which a customer buys a specific product, and a transaction is an important concept on its own, with a sales date, purchase price, quantity sold, computed sales tax, and other attributes. Creating a Transactions object and/or a LineItems object can replace the many-to-many relationship with many-to-one relationships.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
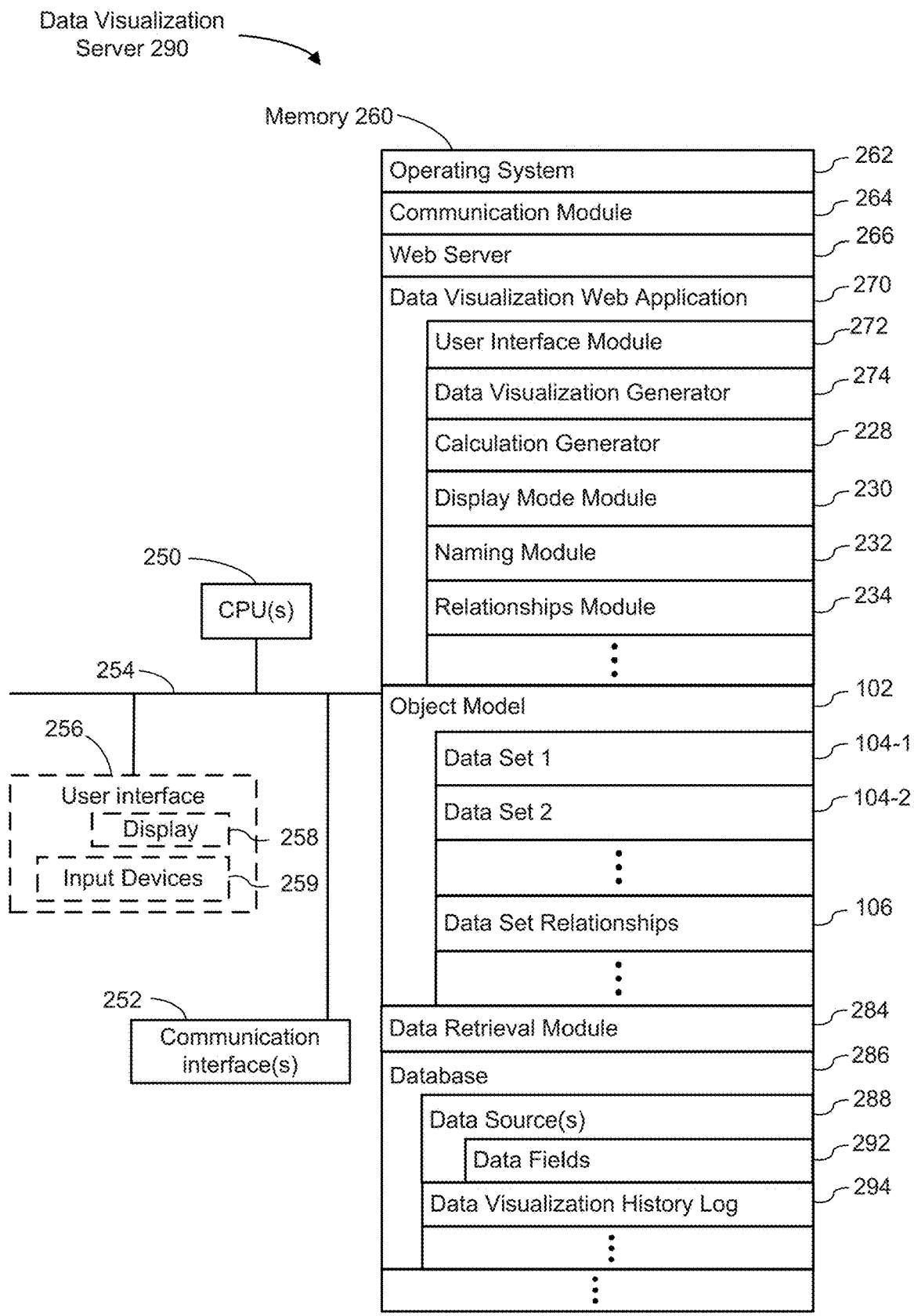
FIG. 2B is a block diagram of a data visualization server according to some implementations.

FIG. 2B is a block diagram of a data visualization server 290 in accordance with some implementations. A data visualization server 290 may host one or more databases 286 or may provide various executable applications or modules. A server 290 typically includes one or more processing units/cores (CPUs) 250, one or more network interfaces 252, memory 260, and one or more communication buses 254 for interconnecting these components. In some implementations, the server 290 includes a user interface 256, which includes a display 258 and one or more input devices 259, such as a keyboard and a mouse. In some implementations, the communication buses 254 include circuitry (sometimes called a chipset) that interconnects and controls communications between system components.

In some implementations, the memory 260 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 260 includes one or more storage devices remotely located from the CPU(s) 250. The memory 260, or alternatively the non-volatile memory devices within the memory 260, comprise a non-transitory computer readable storage medium.

In some implementations, the memory 260, or the computer readable storage medium of the memory 260, stores the following programs, modules, and data structures, or a subset thereof:

an operating system 262, which includes procedures for handling various basic system services and for performing hardware dependent tasks;

a network communication module 264, which is used for connecting the server 290 to other computers via the one or more communication network interfaces 252 (wired or wireless) and one or more communication networks, such as the Internet, other wide area networks, local area networks, metropolitan area networks, and so on;

a web server 266 (such as an HTTP server), which receives web requests from users and responds by providing responsive web pages or other resources;

a data visualization web application 270, which may be downloaded and executed by a web browser 220 on a user's computing device 200. In general, a data visualization web application 270 has the same functionality as a desktop data visualization application 222, but provides the flexibility of access from any device at any location with network connectivity, and does not require installation and maintenance. In some implementations, the data visualization web application 270 includes various software modules to perform certain tasks. In some implementations, the data visualization web application 270 includes a user interface module 272, which provides the user interface for all aspects of the data visualization web application 270;

in some implementations, the data visualization web application includes a data visualization generator 274, which generates and displays data visualizations according to user-selected data sources and data fields, as well as one or more object models 102;

in some implementations, the data visualization web application includes a calculation generator 228, a display mode module 230, a naming module 232, and a relationships module 234, each of which is described above for a computing device 200;

one or more object models 102, as described above for a computing device 200;

a data retrieval module 284, which builds and executes queries to retrieve data from one or more databases 286. The databases 286 may be stored locally on the server 290 or stored at an external database system. In some implementations, data from two or more different data sources (e.g., databases) may be blended. In some implementations, the data retrieval module 284 uses a visual specification to build the queries;

one or more databases 286, which store data used or created by the data visualization web application 270 or data visualization application 222. The databases 286 may store data sources 288, which provide the data used in the generated data visualizations. Each data source 288 includes one or more data fields 292. In some implementations, the database 286 stores user preferences. In some implementations, the database 286 includes a data visualization history log 294. In some implementations, the data visualization history log 294 tracks each time the data visualization web application 270 or data visualization application 222 renders a data visualization.

The databases 286 may store data in many different formats, and commonly includes many distinct tables, each with a plurality of data fields 292. Some databases 286 comprise a single table. The data fields 292 include both raw fields from the database (e.g., a column from a database table or a column from a spreadsheet) as well as derived data fields, which may be computed or constructed from one or more other data fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 292 are stored separately from the data source 288. In some implementations, the database 286 stores a set of user preferences for each user. The user preferences may be used when the data visualization web application 270 (or desktop data visualization application 222) makes recommendations about how to view a set of data fields 292. In some implementations, the database 286 stores a data visualization history log 294, which stores information about each data visualization generated. In some implementations, the database 286 stores other information, including other information used by the data visualization application 222 or data visualization web application 270. The databases 286 may be separate from the data visualization server 290, or may be included with the data visualization server (or both).

In some implementations, the data visualization history log 294 stores visual specifications selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), and the data relationships selected. In some implementations, one or more thumbnail images of each data visualization are also stored. Some implementations store additional information about created data visualizations, such as the name and location of the data source 288, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 260 stores a subset of the modules and data structures identified above. In some implementations, the memory 260 stores additional modules or data structures not described above.

Although FIG. 2B shows a data visualization server 290, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 290 may be stored or executed on a computing device 200. In some implementations, the functionality and/or data may be allocated between a computing device 200 and one or more servers 290. Furthermore, one of skill in the art recognizes that FIG. 2B need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

FIGS. 3A-3E are block diagrams of object model schemas according to some implementations. An object model can be depicted as a graph or block diagram, as shown in FIGS. 3A-3E. FIGS. 3A-3E illustrates different types of object models, all of which are supported by the data analysis methods described herein.

Figure 3A:
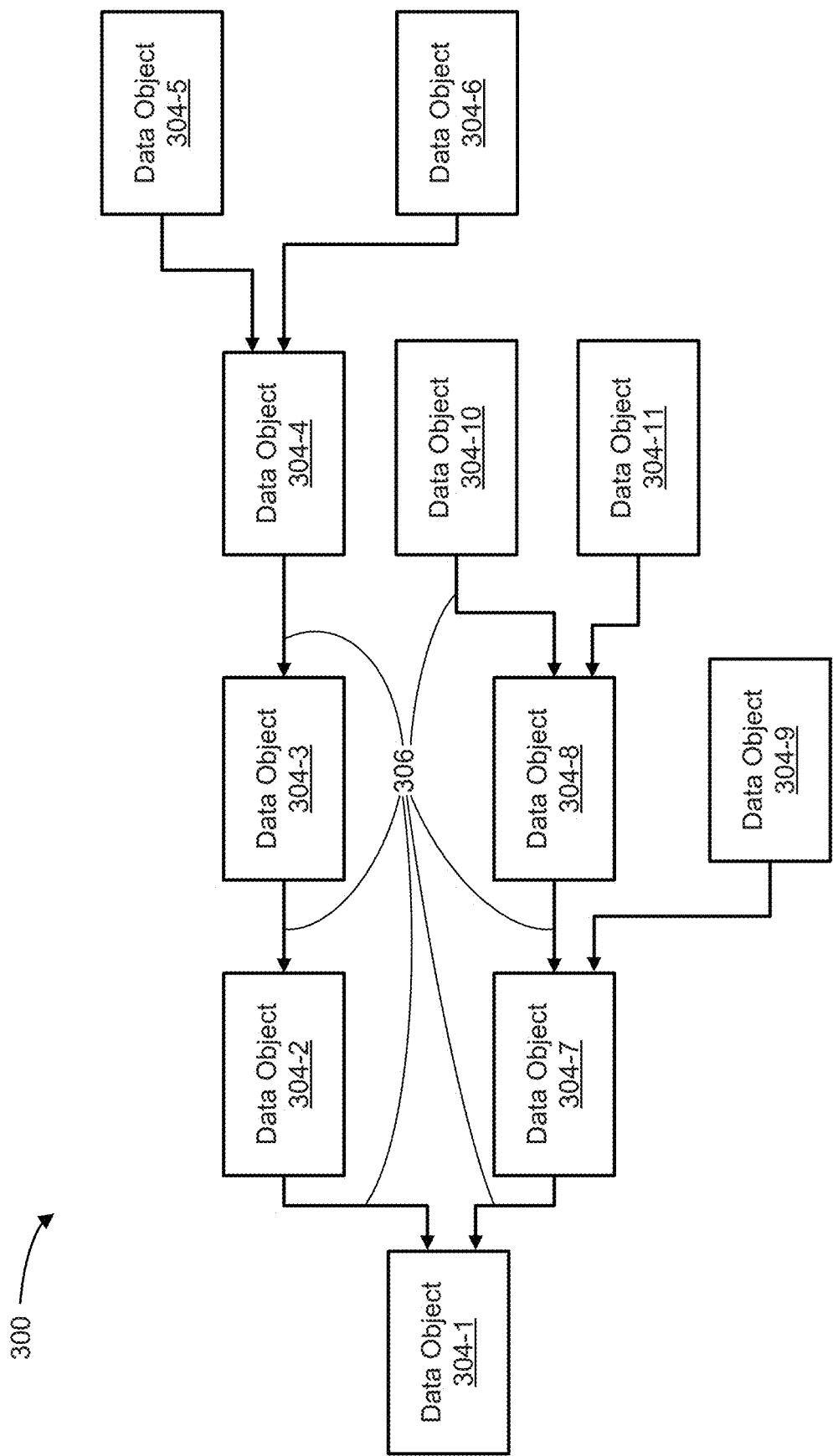
FIGS. 3A-3E are block diagrams of object model schemas according to some implementations.

FIG. 3A shows an example of a hierarchical object model 300 that is arranged so that the "many" side of each relationship is always to the left of the "one" side. The many-to-one relationships 306 in the object model 300 are illustrated by arrows, with the arrows originating from the "one" side of the relationship and pointing towards the "many" side of each relationship. The object model 300 includes multiple data objects 104, which are referred to individually as a data object 304-n with n as a placeholder for a data set identifier (e.g., data object 304-1 is distinct from data object 304-2). The data objects 304 in the object model 300 have many-to-one relationships 106, connecting each data object 304-n with at least one other data object and forming a tree. Thus, the tree structure illustrates different classes (data objects) in the object model 300, as well as the many-to-one relationships 306 between the data objects 304.

For example, the data objects 304-5 and 304-6 each has a direct many-to-one relationship to the data object 304-4. Each of the data objects 304-5 and 304-6 can be described as being "upstream" from the data object 304-4.

In a second example, the data object 304-3 is related to each of the data objects 304-5 and 304-6 via sequences of two many-to-one relationships. Thus, the data object 304-3 can be described as being "downstream" from each of the data objects 304-5 and 304-6. Referring to the relationship between the data objects 304-3 and 304-7, the data object 304-7 is not related to the data object 304-3 via a sequence of many-to-one relationships or via a sequence of one-to-many relationships. Thus the data object 304-7 is not considered to be "upstream" or "downstream" from the data object 304-3. The data object 304-7 can be considered to be on a different "branch" of the tree. In the same way, the data objects 304-8, 304-9, 304-10, and 304-11, which are part of the same "branch," are neither "upstream" nor "downstream" from any of the data objects 304-2, 304-3, 304-4, 304-5, and 304-6, which form a different "branch" on the tree.

Figure 3B:
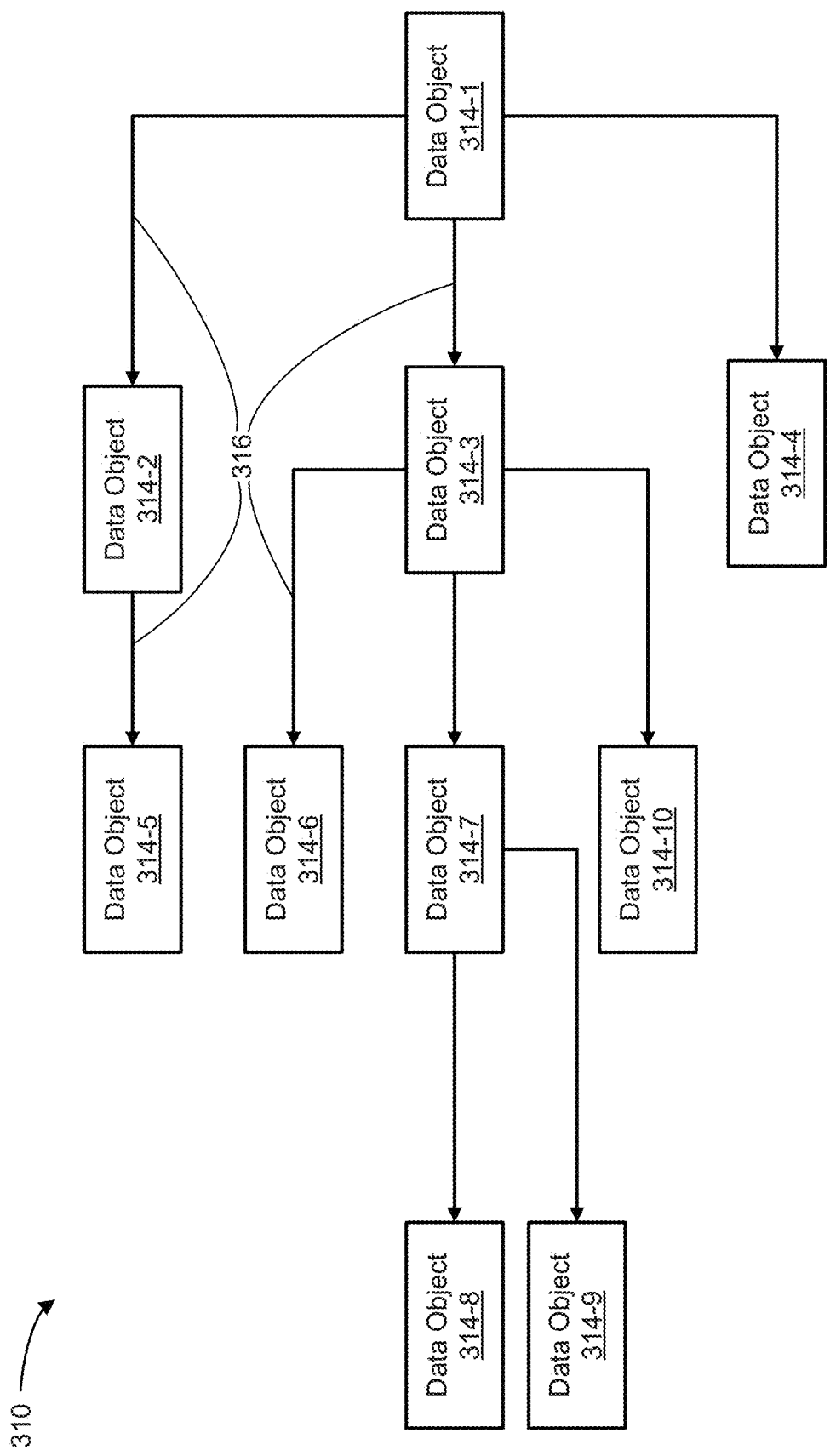

FIG. 3B shows an example of a hierarchical object model 310 that is arranged so that the "many" side of each relationship is always to the left of the "one" side. The many-to-one relationships 316 in the object model 310 are illustrated by arrows, with the arrows originating from the "one" side of the relationship and pointing towards the "many" side of each relationship. The object model 312 includes multiple data objects 314 that have many-to-one relationships 316, connecting each data object 314-n with at least one other data object and forming a tree.

For example, the data object 314-1 has a direct many-to-one relationship to each of the data objects 314-2, 314-3, and 314-4. Thus, data object 314-1 can be described as being "upstream" from each of the data objects 314-2, 314-3, and 314-4.

In a second example, the data object 314-8 is related to each of the data objects 314-3 and 314-1 via sequences of two many-to-one relationships. Thus, the data object 314-8 can be described as being "downstream" from each of the data objects 314-3 and 314-1. Additionally, when looking at two or more data objects 314, it is possible that two or more data objects 314 may share one or more common ancestors. For example, data objects 314-1 and 314-3 are common ancestors to the data objects 314-6, 314-8, and 314-10. A least common ancestor is a common ancestor that is separated by the fewest number of many-to-one relationships to each of the "descendant" data objects 314. In this example, data object 314-3 is the least common ancestor of data objects 314-6, 314-8, and 314-10. In a second example, a least common ancestor of data objects 314-9 and 314-8 is data object 314-7.

Figure 3C:
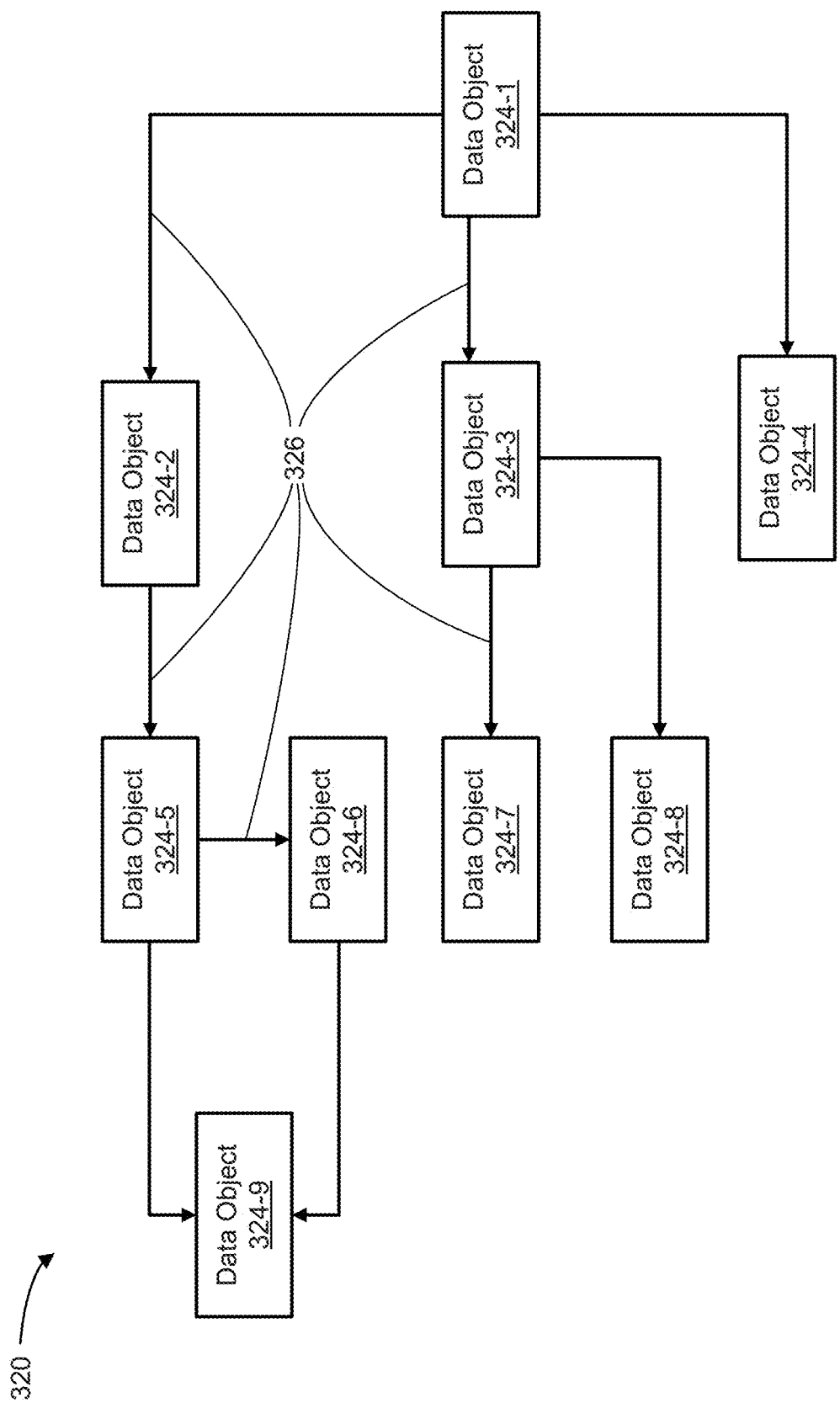

FIG. 3C shows an example of a hierarchical object model 320 that include data objects 324 that have many-to-one relationships 326, connecting each data object 324-n with at least one other data object and forming a tree, similar to object model 310 shown in FIG. 3B. However, object model 320 includes a loop formed by data objects 324-5, 324-6, and 324-9. As shown, each of the data objects 324-5 and 324-6 has a direct many-to-one-relationship to data object 324-9. Additionally, data object 324-5 also has a direct many-to-one-relationship to data object 324-6.

Figure 3D:
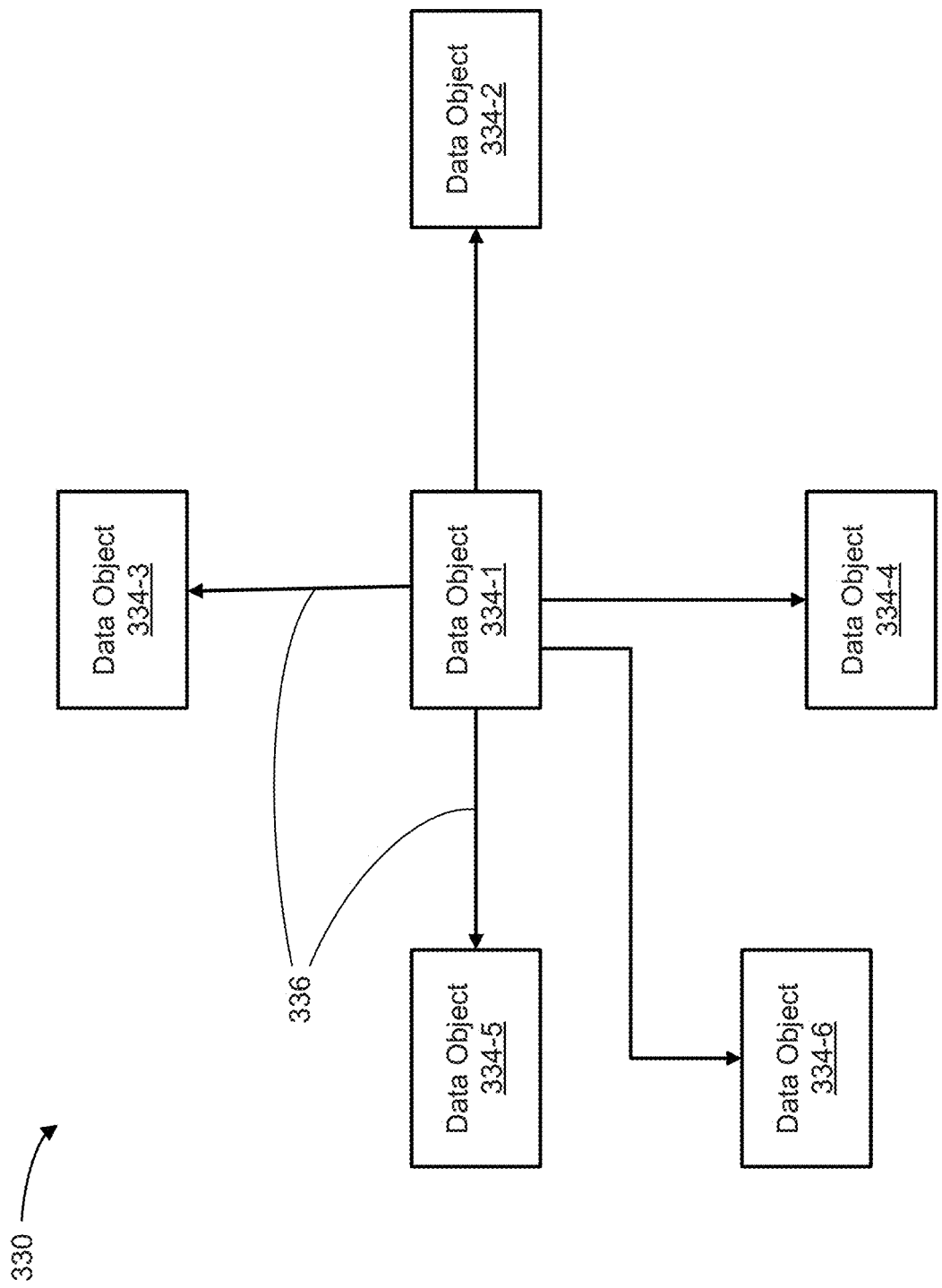

FIG. 3D shows an example of a star schema object model 330. As shown, object model 330 includes data objects 334 that have many-to-one relationships 336, connecting each data object 334-n with at least one other data object. As shown, data object 336-1 has a direct many-to-one-relationship to each of the data objects 334-2, 334-3, 334-4, 334-5, and 334-6.

Figure 3E:
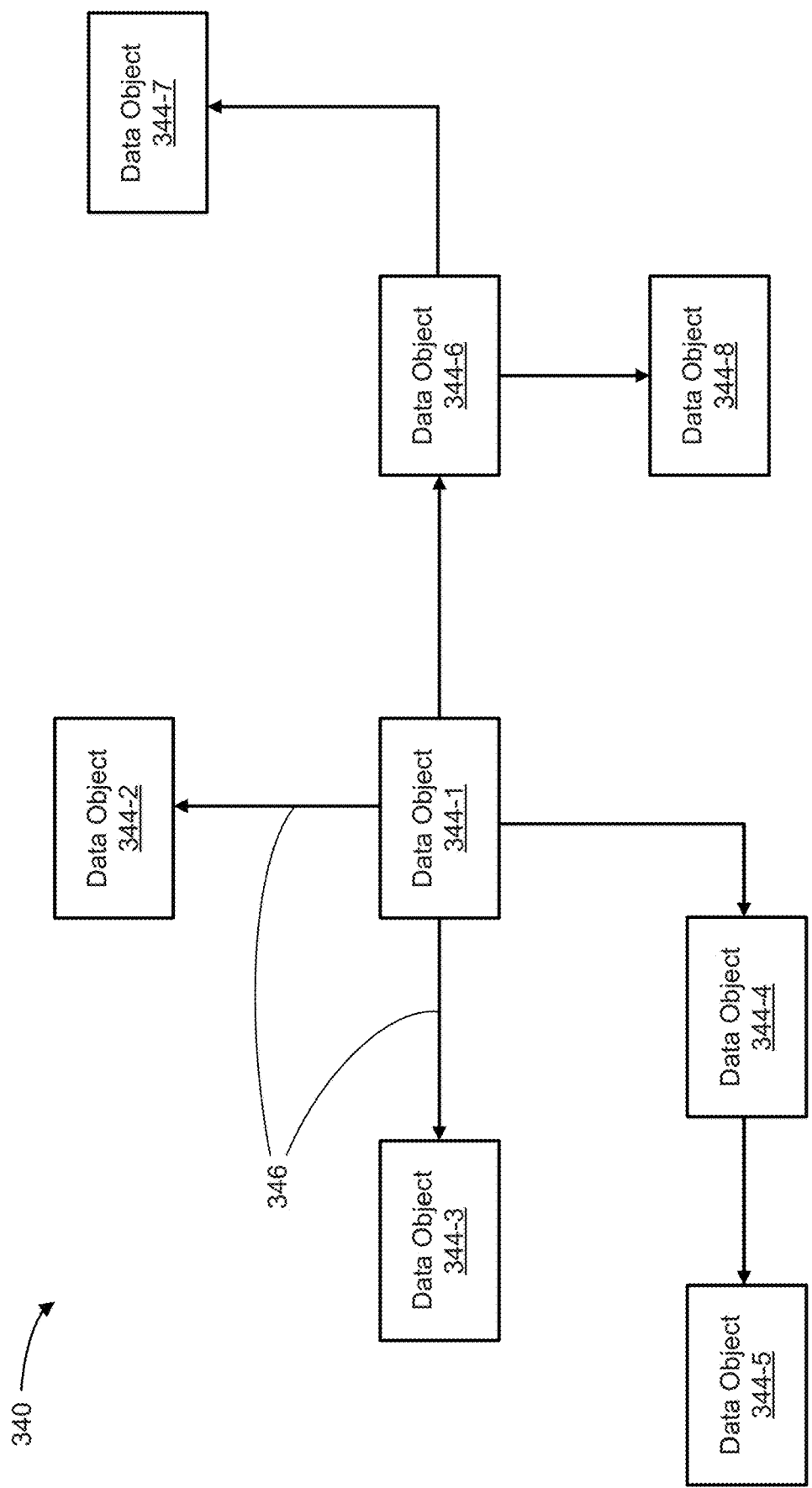

FIG. 3E shows an example of a snowflake schema object model 340. As shown, object model 340 includes data objects 344 that have many-to-one relationships 346, connecting each data object 344-n with at least one other data object. As shown, data object 346-1 has a direct many-to-one-relationship to each of the data objects 334-2, 334-3, 334-4, and 334-6. Additionally, the data object 344-4 has a direct many-to-one-relationship to the data object 344-5. Similarly, the data object 344-6 has a direct many-to-one-relationship to each of the data objects 344-7 and 344-8.

FIGS. 4A-4F show examples a schema region 150 when a graphical user interface 140 is in an object-based display mode according to some implementations.

Figure 4A:
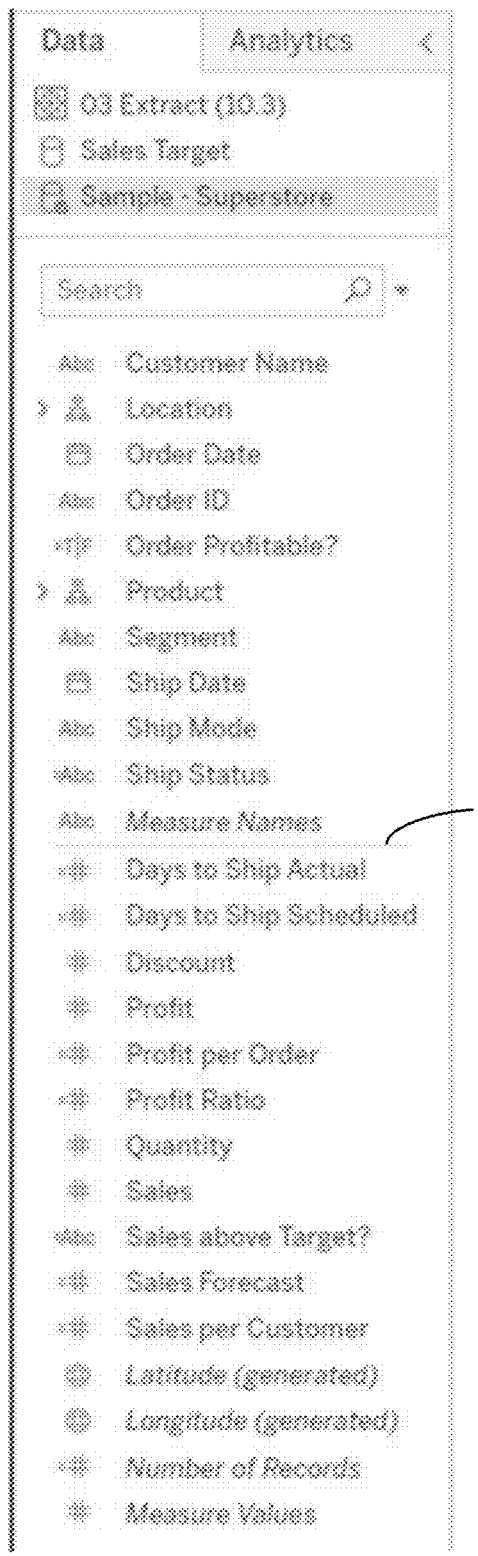
FIGS. 4A-4F illustrate a graphical user interface in an object-based display mode according to some implementations.

Referring to FIG. 4A, when the object model includes a single data object (e.g., an object model that has one data object) and the data object includes a single table (e.g., the data object has one table), the schema region 150 shows data fields that are in the data object. Since there is only one data object and only one table in the data object, the schema region 150 may, in some cases, not display the data object name or a heading (e.g., name, title) for the table. Additionally, the data fields are grouped by whether the data field is a Dimension or a Measure. In general, Dimensions are data fields that generally cannot be aggregated (other than by counting). Dimensions are typically categorical fields, storing data such as names, products, regions, or stores. In contrast, Measures are data fields that can be measured, aggregated, or used in mathematical operations (e.g., computing sums). For example, as shown, the schema region 150 displays (e.g., shows, lists) the data fields grouped based on whether the data field is a Dimension or a Measure. Data fields that are Dimensions are shown above a line 410 (shown in FIG. 4A as a solid gray line) and data fields that are measures are shown below the line 410.

Additionally, data fields from different data sets may be used to form calculations (also referred to as calculated field) or to generate a data visualization. In addition to any user-defined parameters, such as a mathematical expression defining a calculation or a user association of data fields to respective shelf regions, the relationships represented in the object model can be used to automatically associate the calculated fields or generated data visualizations to a particular data object in the object model.

The schema region 150 also includes one or more data fields that are automatically generated by the data visualization application. In this example, the "Number of Records" data field is an automatically generated field.

In some implementations, a generated field (e.g., a user-generated field such as a calculated field, or an application-generated field such as a number of records field) is shown below a data field with which the generated field is associated. Additionally, in some implementations, the schema region 150 displays generated fields using a text style (e.g., font characteristic) that is different from a text style used to display data fields from the data object. For example, as shown, generated data fields are shown in italicized font and data fields from the data object are shown in non-italicized font.

Figure 4B:
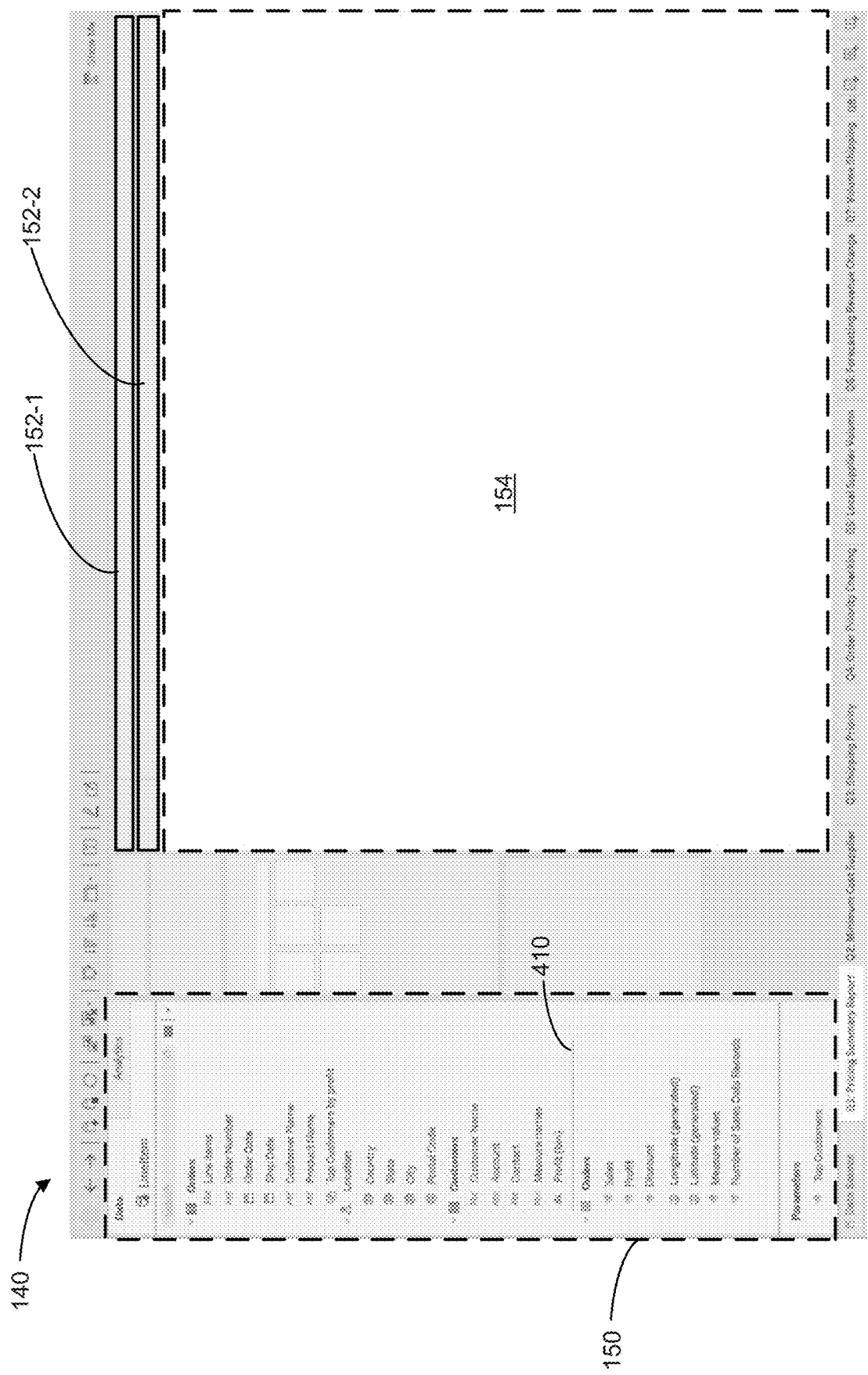

Referring to FIG. 4B, when the object model includes a single data object and the data object includes multiple tables (e.g., the object model has one data object and the data object corresponds to a plurality of unionized tables), the schema region 150 shows the data fields in the data object grouped by the table to which the data field belongs (e.g., is associated with). Since there is only one data object, the schema region 150 may, in some cases, not display the data object name. Additionally, the data fields are grouped by whether the data field is a Dimension or a Measure. In this example, the data object has two tables, "Orders" and "Customers," and a list of data fields associated with each table is displayed (e.g. shown, listed) underneath the table heading. Data fields shown above line 410 are Dimensions and data fields shown below the line 410 are Measures. As shown, the "Orders" table includes both Dimensions and Measures. Thus, the "Orders" table is shown once above the line 410 with Dimensions listed under the "Orders" heading, and once below the line 410 with Measures listed under the "Orders" heading. For example, the data fields "Line Items" and "Order Number" (among others) are data fields that are Dimensions and belong to the "Orders" table and "Sales" and "Profit" (among others) are data fields that are Measures and belong to the "Orders" table.

Figure 4C:
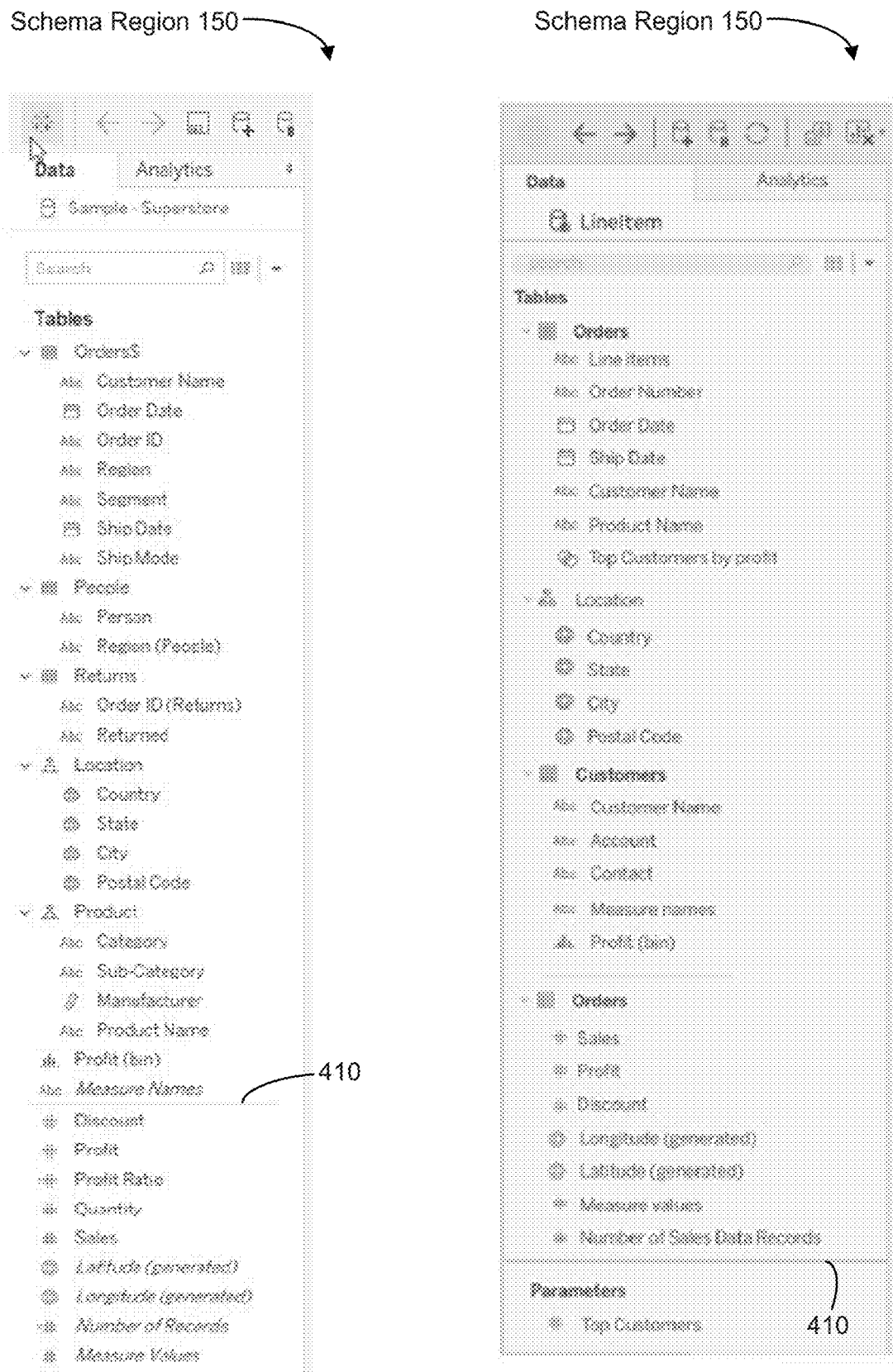

FIG. 4C provides additional examples of how a schema region 150 may display data fields when the object model includes a single data object (e.g., an object model that has one data object) and the data object includes multiple tables. When an object model includes a plurality of data objects (e.g., two or more data objects) and each data object includes one table (e.g., a single table, only one table), the schema region 150 displays the data fields grouped by the data object to which the data field belongs. In some implementations, the schema region 150 displays the data object names. In some implementations, the schema region 150 may optionally display the table headings (e.g., names). Additionally, the data fields are grouped by whether the data field is a Dimension or a Measure. In this example, there are three data objects (e.g., three tables), "Actor," "Appearance," and "Character." The "Actor" data object includes two data fields, "Actor" and "Height." A user viewing the schema region 150 is able to quickly determine that the data field "Actor" is a Dimension and the data field "Height" is a Measure based on the separation between the two data fields by the line 410.

Figure 4D:
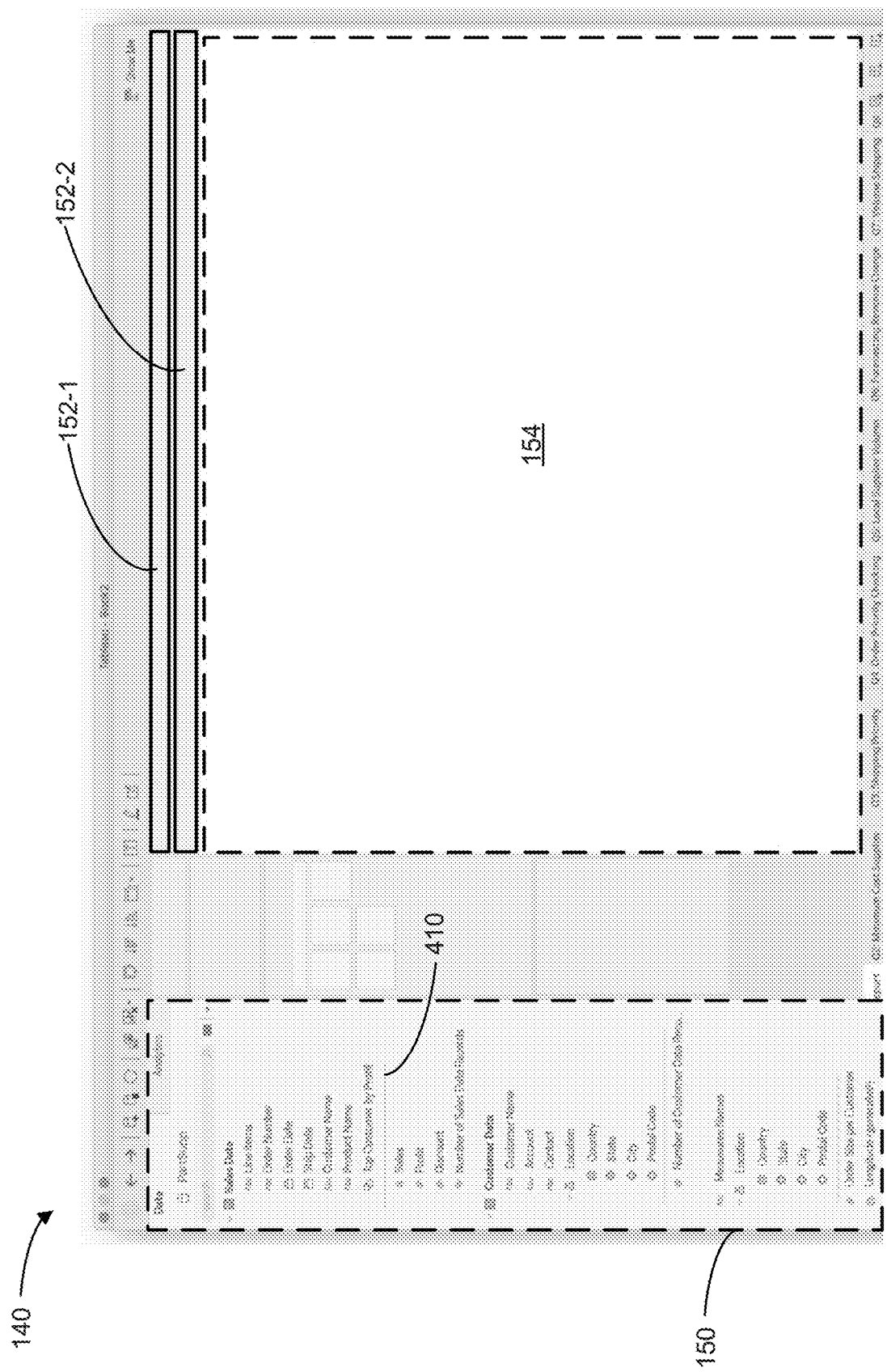

FIG. 4D provides additional examples of how a schema region 150 may display data fields when an object model includes a plurality of data objects (e.g., two or more data objects) and at least one of the data objects includes multiple tables (e.g., a plurality of tables, two or more tables), the schema region 150 displays the data fields grouped by the data object (or table) to which the data field belongs. In some implementations, the schema region 150 displays the data object names. In some implementations, the schema region 150 may optionally display the table headings (e.g., names). Additionally, the data fields are grouped by whether the data field is a Dimension or a Measure.

For example, under the "Sales Data" data object, the line 410 separates the Dimensions and Measures that belong to the "Sales Data" data object. Thus, data fields that belong to the "Sales Data" data object and are Dimensions (such as "Line Items," "Order Number," "Order Date," "Ship Date," "Customer Name," "Product Name," and "Top Customer by Profit") are shown above the line 410, and data fields that belong to the "Sales Data" data object and are Measures (such as "Sales," "Profit," "Discount," and "Number of Sales Data Records") are shown below the line 410.

In some implementations, data fields that are not part of a table (e.g., does not belong to a table) are shown below all the tables (e.g., below all the tables and the data fields that belong to a table). Examples of data fields that may not be associated with a table include generated data fields, calculated data fields, and number of records data fields. An example is shown in FIG. 4D, where data fields "Measure Names," "Number of Records," and "Measure Values" are at the bottom of the schema region 150 and are not shown to belong to or be associated with any data objects or tables. However, a user is able to quickly discern that the data field "Measure Names" is a Dimension and the data fields "Number of Records" and "Measure Values" are Measures since they are separated by the line 410. Another example is shown in FIG. 4D, where data fields "Measure Names," "Order Size per Customer," and "Longitude (generated)" are at the bottom of the schema region 150 and are shown as not belonging to or being associated with any data objects or tables.

Figure 4E:
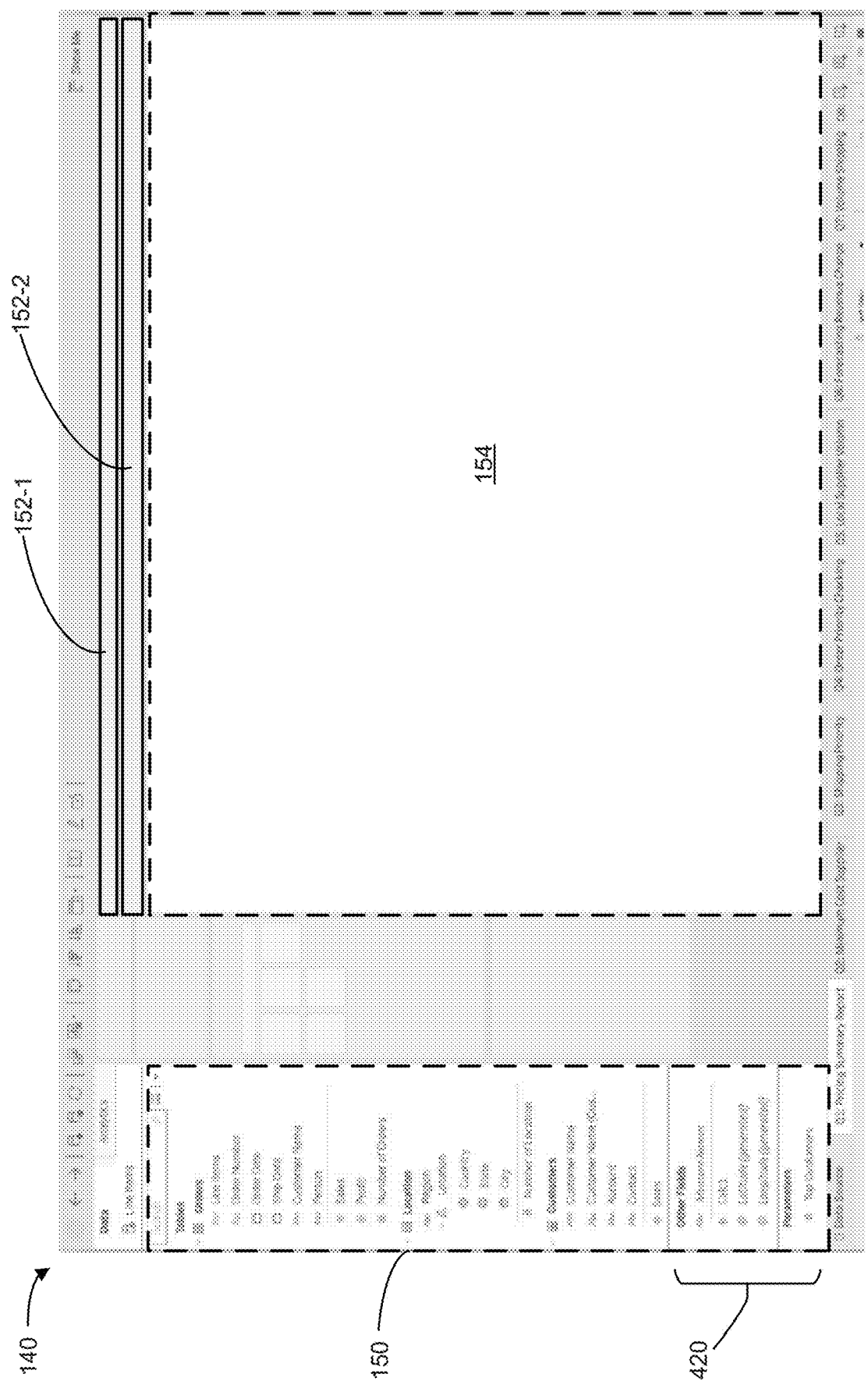

In some implementations, as shown in FIG. 4E, data fields that are not associated with a data object in the object model are listed under a 'No Object' section 420 (e.g., a "common area"). In some implementations, data fields that are associated with multiple data objects in the object model (such as complex calculations) are also listed under the 'No Object' section 420. As shown, the data fields in the 'No Object' section 420 are listed hierarchically and grouped based on whether the data field is a Dimension or Measure. For example, when a user generates a new data field (such as a calculated data field) that uses information from two or more data fields belonging to different data objects in the object model, the new data field may be listed under the 'No Object' section 420.

Figure 4F:
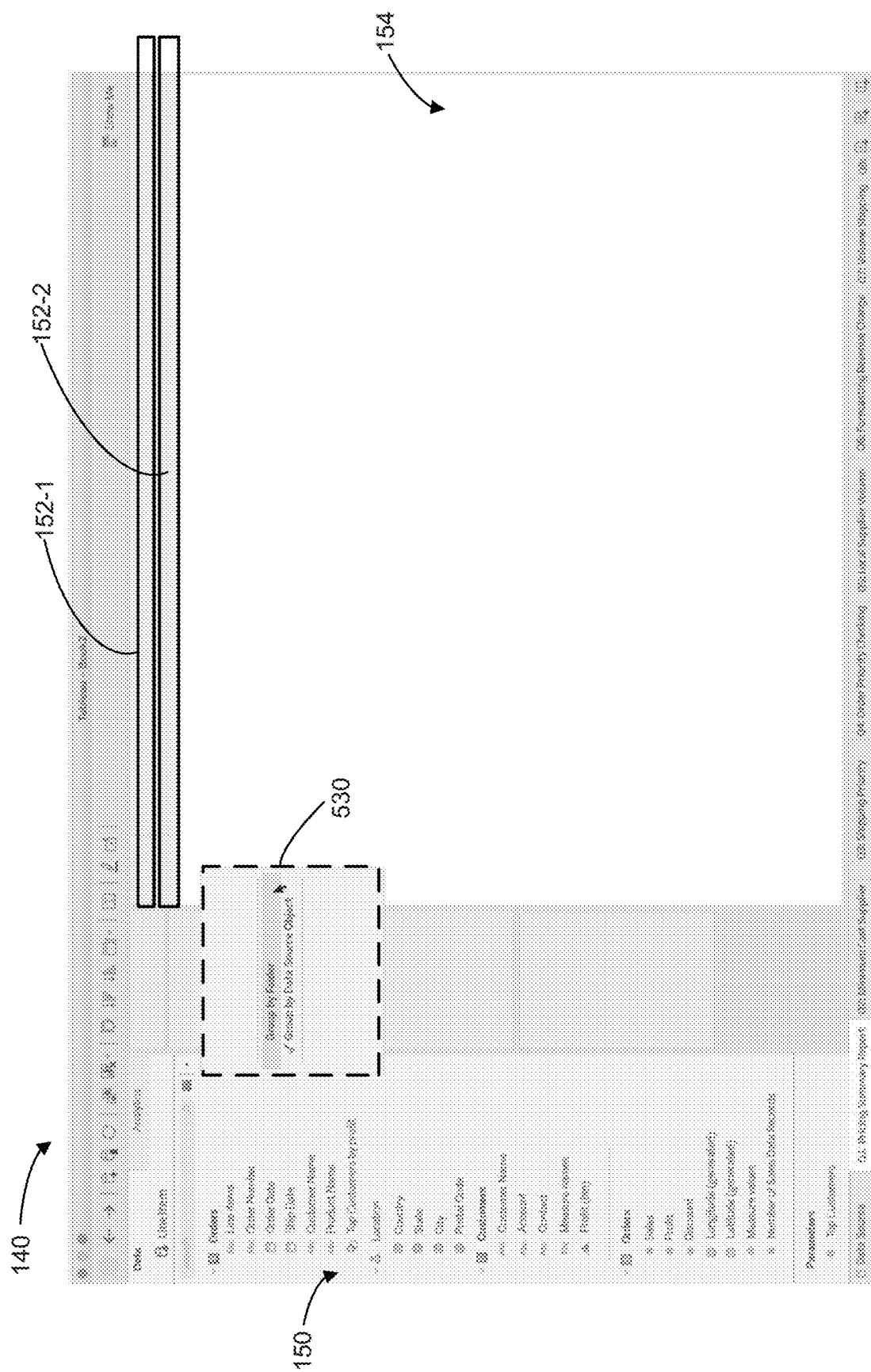

Referring to FIG. 4F, a user may switch between the object-based display mode and the folder based display mode. In some implementations, as shown, the graphical user interface 140 displays an indication (e.g., check mark) of the active display mode. In this example, a drop down menu 530 shows that the user is currently in the object-based mode (e.g., "Group by Data Source Object"). The drop down menu 530 also provides the user with an option to select either the object-based display mode (e.g., "Group by Data Source Object" option) or the folder-based display mode (e.g., "Group by Folder" option), thereby allowing the user to seamlessly switch between the two display modes. Alternatively, an indication of the active display mode as well as options to switch between display modes may be shown as a pop-up. Additionally, the options to switch between display modes may be available via an icon or affordance that is part of the graphical user interface 140. Alternatively, the options to switch between display modes may be accessible via one or more user gestures (e.g., a user right click on a portion of the schema region 150).

FIGS. 5A-5E show the schema region 150 when the graphical user interface 140 is in a folder-based display mode according to some implementations.

Figure 5A:
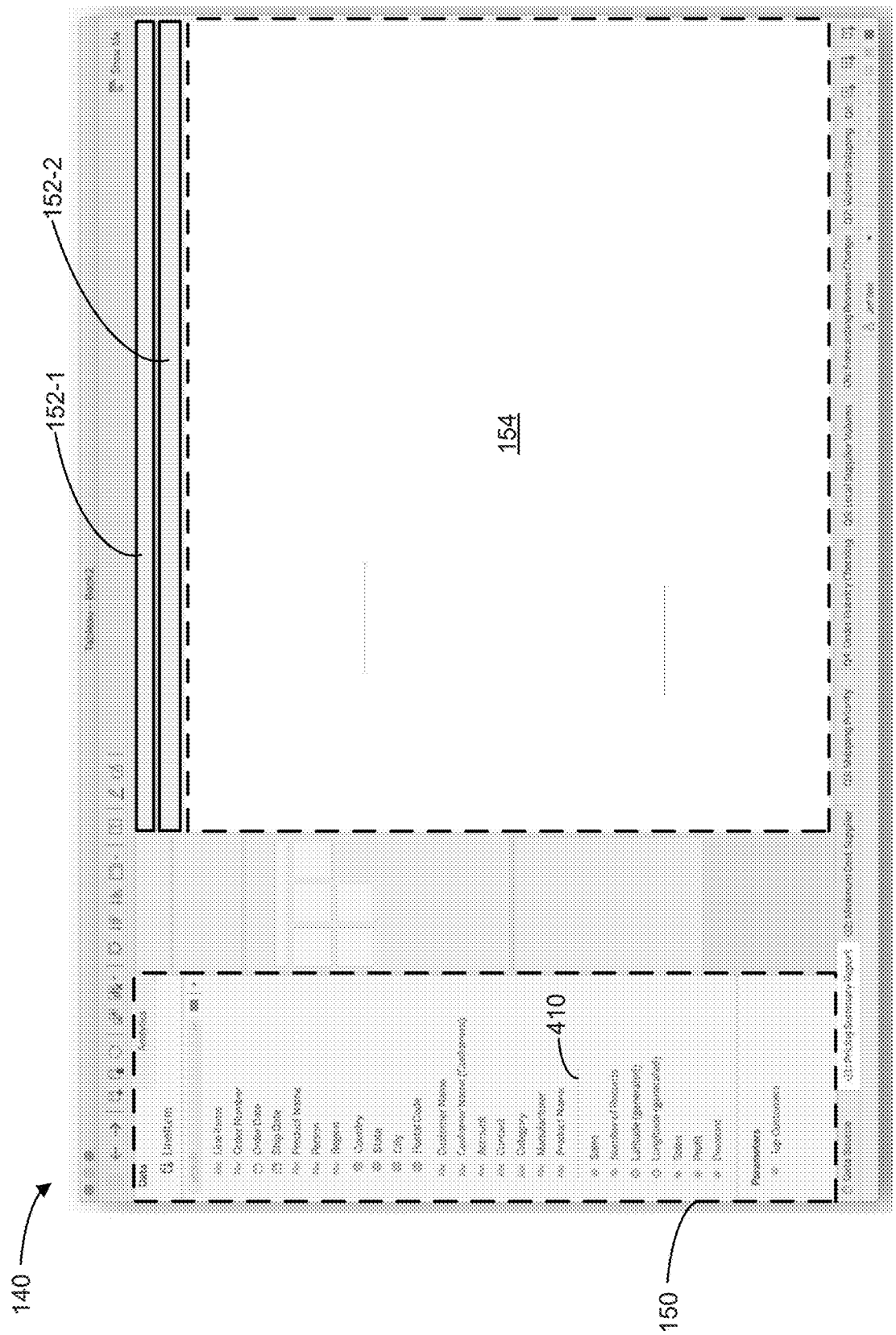
FIGS. 5A-5E illustrate a graphical user interface in a folder-based display mode according to some implementations.

When the graphical user interface 140 is first launched and before any custom (e.g., user-defined) folders are created, the schema region 150 simply lists the data fields in the object model. In some implementations, the schema region 150 may have one folder that s automatically generated as a default folder. In some implementations, the default folder is named the same as the data source. In such cases, as shown in FIG. 5A, the data fields are grouped based on whether the data field is a Dimension or Measure. In some implementations, as shown, the line 410 separates the Dimensions from the Measures.

Figure 5B:
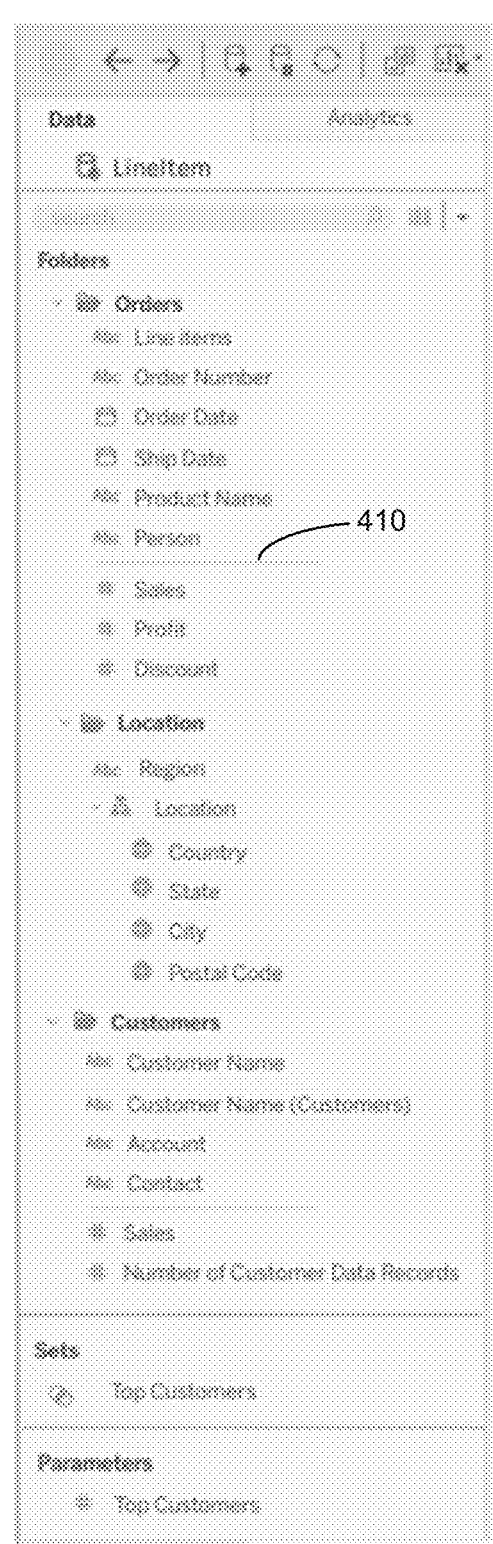

Referring to FIG. 5B, once one or more user-defined folders are created, the schema region 150 shows the user-defined folders and displays the data fields that are associated with each user-defined folder. In some implementations, a user may indicate (e.g., assign, determine) which data fields are associated with a specific user-defined folder by dragging and dropping a data field into a desired user-defined folder. In this example, there are three folders, an "Orders" folder, a "Location" folder, and a "Customers" folder. A user has identified that the data fields "Line Items," "Order Number," "Profit," and "Discount" (among others) belong to the "Orders" folder and thus, the data fields are listed underneath the "Orders" folder heading. Additionally, within a given user-defined folder, the data fields are separated by line 410 based on whether the data field is a Dimension or Measure. The schema region 150 displays the information so that a user can quickly ascertain information regarding this data source. In this example, a user can quickly determine that the data field "Person" is a Dimension that belongs to the "Orders" folder, and the "Sales" data field is Measure that belongs to the "Orders" folder.

The data visualization application 222 allows a user to organize the user-defined folders and data fields in any manner that he/she sees fit. Thus, any data field can belong to (e.g., be associated with) any folder.

Figure 5C:
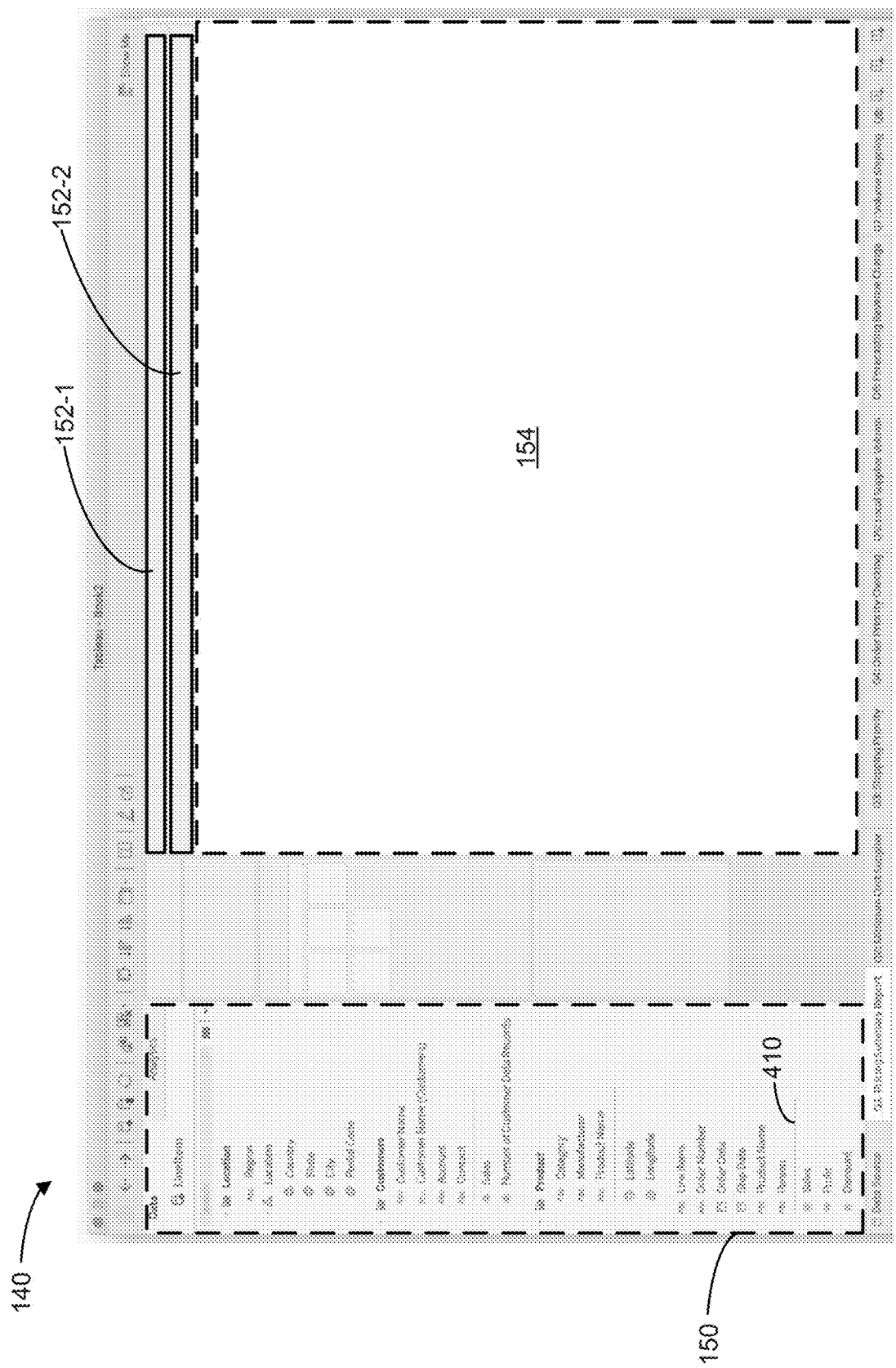

In some implementations, there may be one or more data fields that are not associated with any folder. In such cases, as shown in FIG. 5C, the schema region 150 may display unassociated data fields at the bottom of the schema region 150. In this example, the data fields "Line Items," "Person," and "Sales," (among others) are displayed at the bottom of the schema region 150, indicating that these data fields do not belong to a user-defined folder. Additionally, the schema region 150 separates the unassociated data fields using line 410 based on whether the unassociated data field is a Dimension or Measure.

Figure 5D:
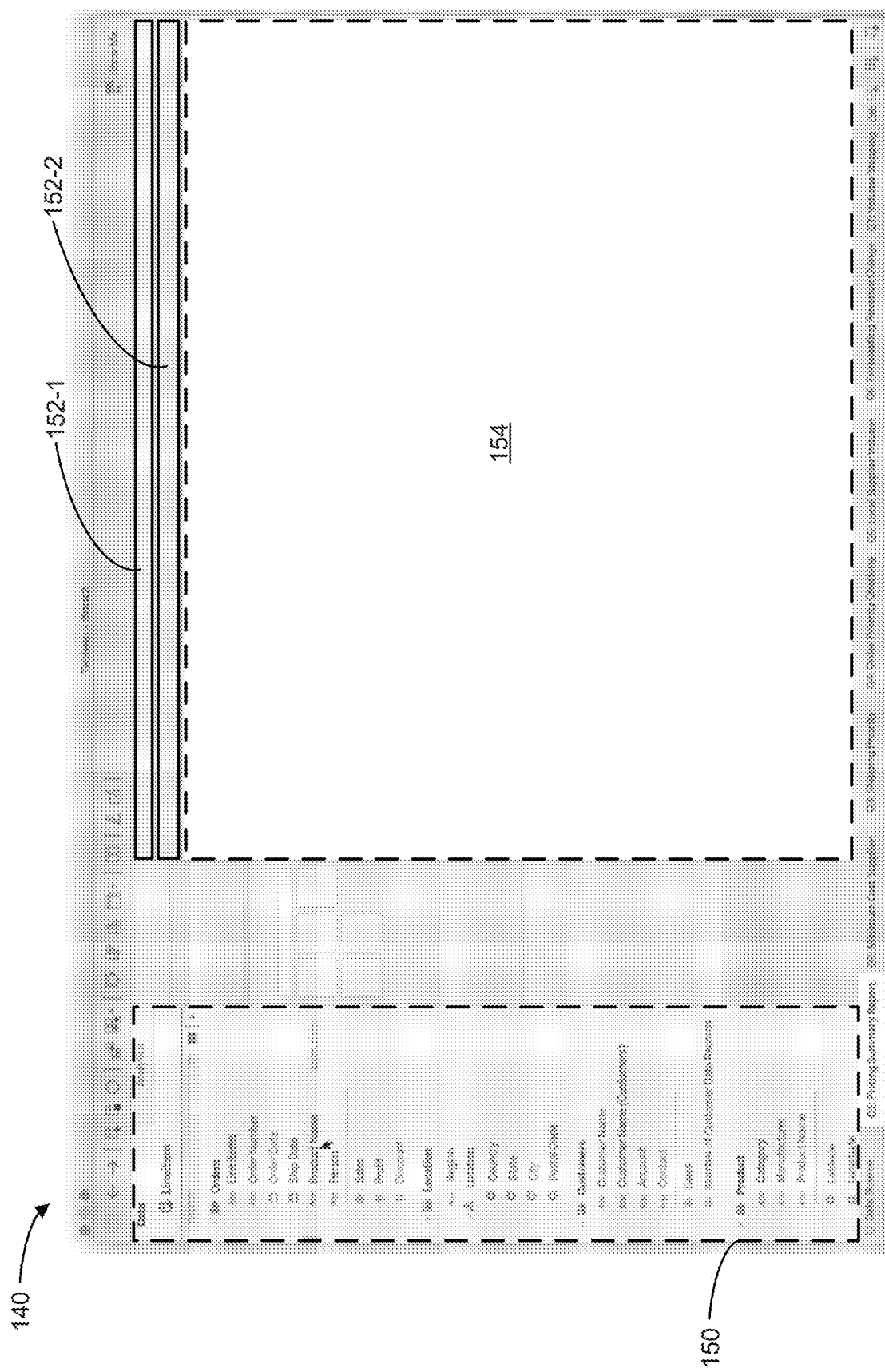
Figure 5E:
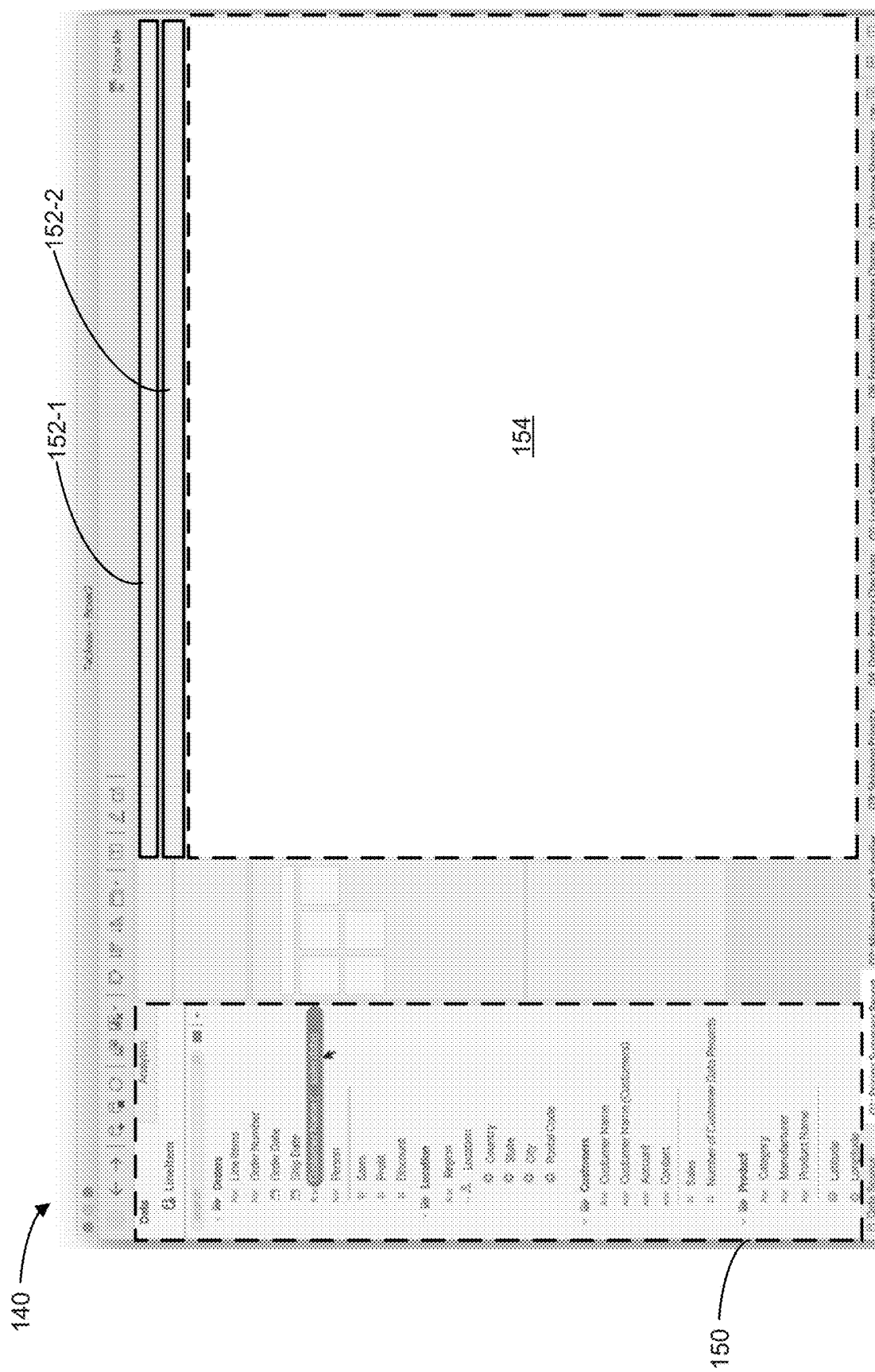

In some implementations, in response to a user gesture regarding a data field, the schema region 150 may show the data object that the data field is associated with. For example, FIG. 5D shows an example of displaying the data object that a data field is associated with when a user hovers over the data field. In this example, the user hovers over the "Product Name" data field that is part of the "Orders" folder. In response to the user hovering a mouse over the "Product Name" data field, the schema region 150 displays the data object to which the "Product Name" data field is associated (e.g., the "sales data" data object, shown in light grey). In another example, FIG. 5E shows that the schema region 150 displays the data object to which the "Customer Name" data field is associated (e.g., the "sales data" data object) in response to a user clicking on the "Customer Name" data field.

Thus, when the graphical user interface 140 is in the folder-based display mode, the schema region 150 allows the user flexibility to organize data fields into user-defined folders as they see fit. Additionally, the data fields are still connected to the underlying object model of the data source and users can quickly and easily determine the relationship of data fields to data objects in the object model (e.g., which data object the data field is associated with) without having to switch back to the object-based display mode.

Figure 5F:
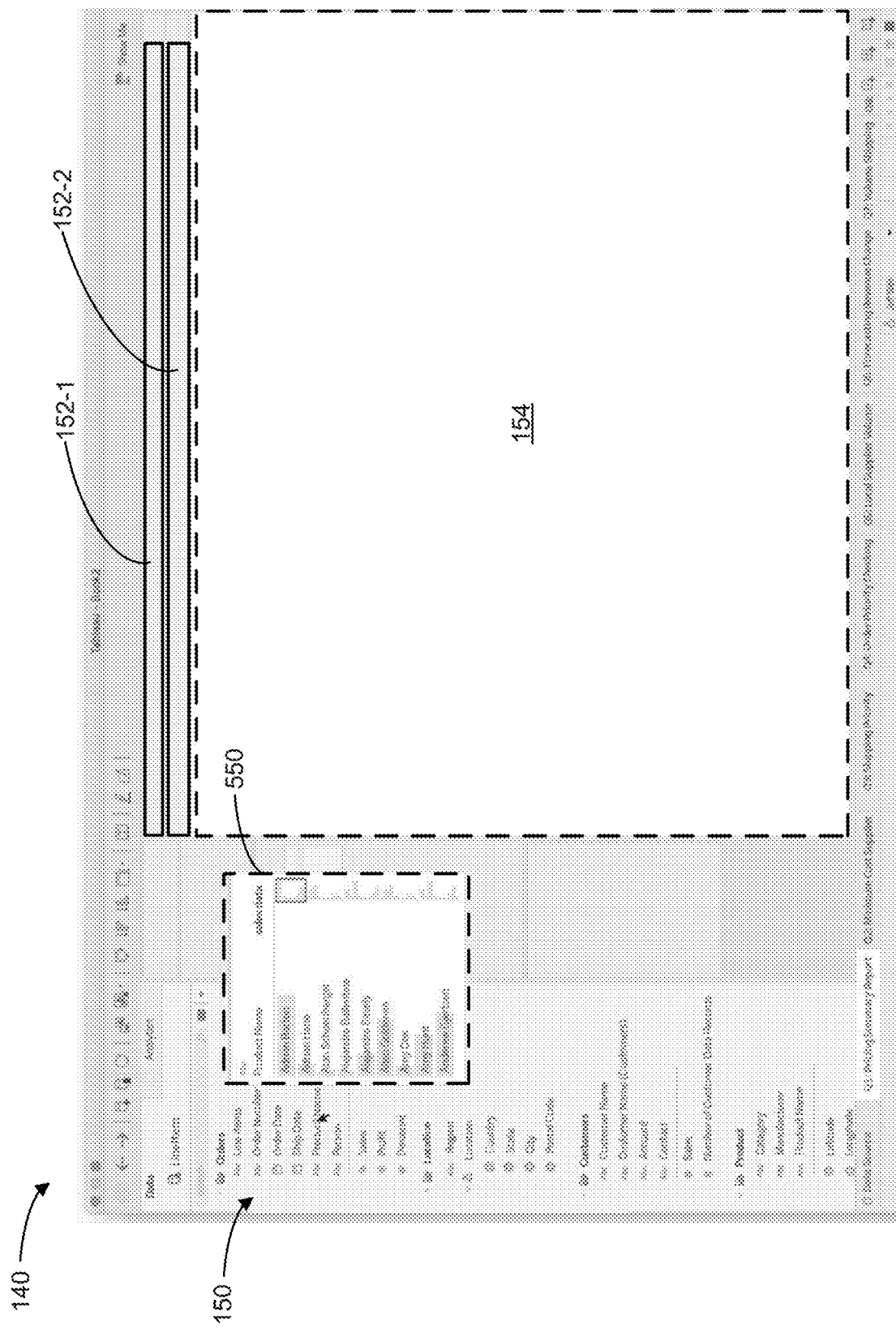
FIG. 5F illustrates providing additional information regarding a data field via a graphical user interface according to some implementations.

Referring to FIG. 5F, in some implementations, the schema region 150 is configured to display additional information 550 regarding a specific data field in response to a user gesture regarding (e.g., selecting, indicating) the data field. The user gesture may be, for example, any of a hover, left-click, right click, or press and hold (in the case of touch sensitive displays). In some implementations, as shown, the additional information 550 is displayed in the form of a drop down menu. The additional information 550 may include any of: a summary or preview of the information stored in the data field, a number of records in the data field that are currently used in an data analysis (e.g., a calculation or data visualization), a number of records that are currently not used in data analysis (e.g., not used in a calculation or data visualization), and the names of calculations and/or data visualizations that utilize information from the selected data field. This functionality of providing additional information 550 regarding a selected (e.g., indicated) data field can be accessed from any of (e.g., both) the object-based display mode and the folder-based display mode.

FIGS. 6A-6J show features of the graphical user interface according to some implementations. Once a user selects a data source, the user can add any data fields or tables from the data source to a workspace or workbook via the graphical user interface 140 at any point in time. Additionally, the user may generate data visualizations and calculations in the workspace. The name of a table or data field in the data source are referred to herein as "field names" and the name of the table as shown in the graphical user interface 140 and in the user's workspace is referred to herein as the "remote name" or "local name." The user may, via graphical user interface 140, change the field name of a table or data field (including both data fields from the data source and user-generated data fields). In some implementations, as a default, the remote name of a table or a data field is the same as the field name. However, in some implementations, a data source may include tables or data fields that have a same name, or a user may add a table after having started performing some analysis (e.g., creating some calculated fields or data visualizations). Such instances may lead to naming conflicts, which can be automatically handled (e.g., independently of user input, without additional user input or intervention) by the data visualization application 222, described in detail below.

Figure 6A:
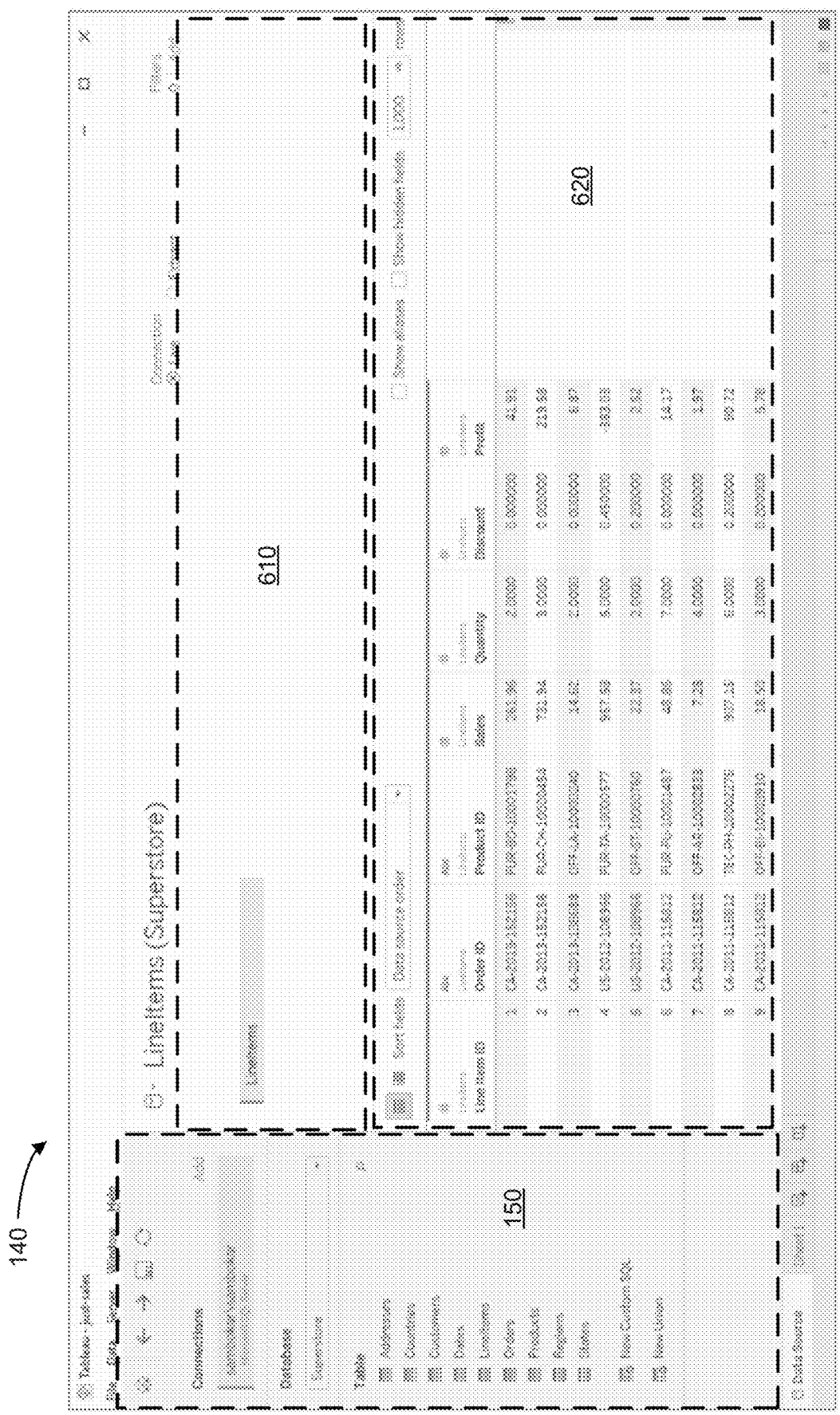
FIGS. 6A-6J illustrate features of a graphical user interface according to some implementations.

Referring to FIG. 6A, the graphical user interface 14 shows a data preparation screen for editing (e.g., adding, removing, editing) tables to a workspace. In this screen, the schema region 150 of displays (e.g., lists) tables that are included in the data source. In this example, the user has added (e.g., clicked, double clicked) the "LineItems" table to the user's workspace. In response to the user selection to add the "LineItems" table to the workspace, a list of data fields from the "LineItems" table is shown in panel 620.

Figure 6B:
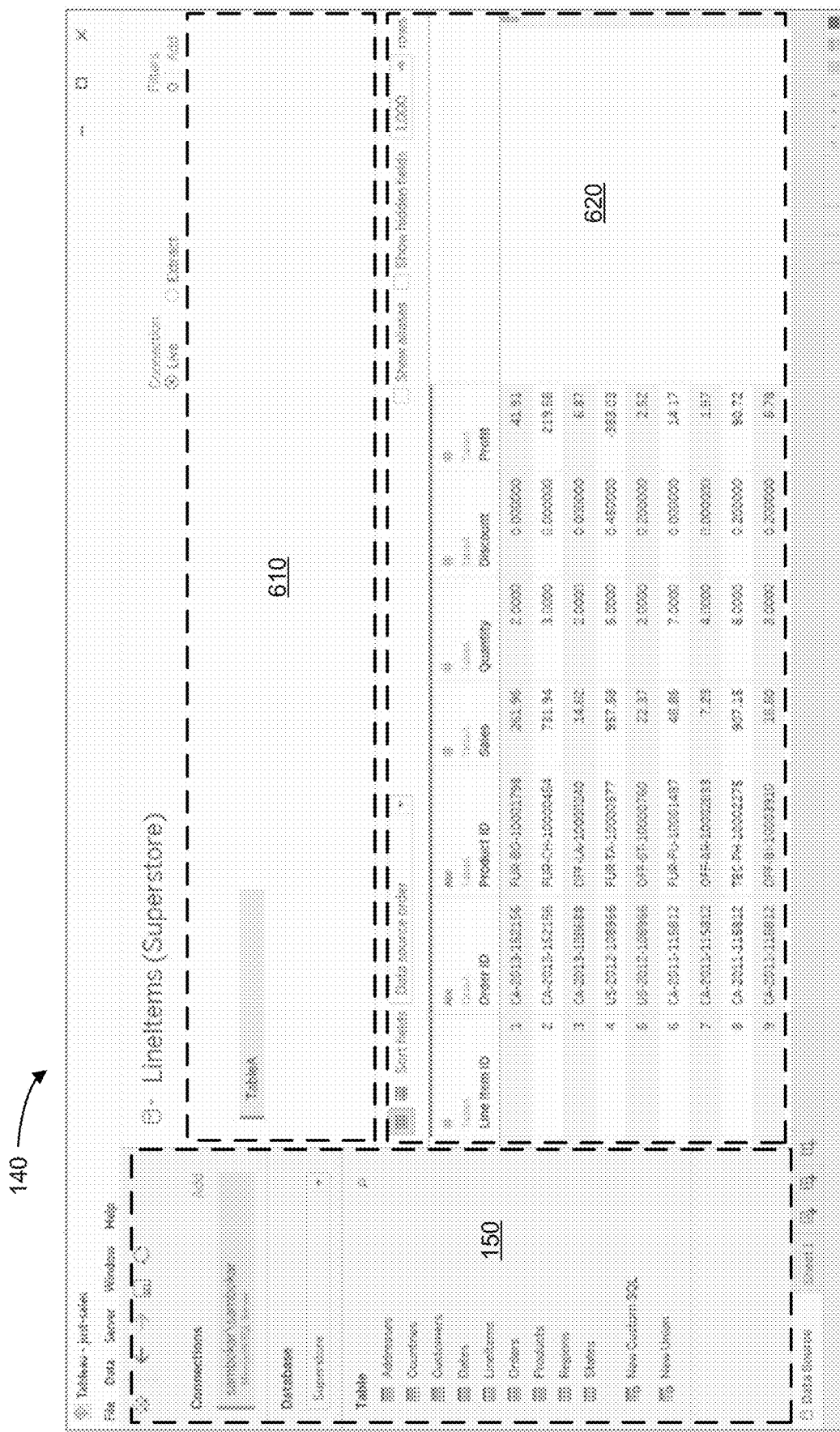

As mentioned above, the user may also change the remote name of a table once the table has been added to the workspace. Following the example provided above in FIG. 6A, FIG. 6B shows an example where the user has decided to rename the "LineItems" table to "Table A." In response to the user changing the remote name of the "LineItems" table to "Table A," the remote name of the table is automatically updated in the table section 610, and data fields shown in the panel 620 are updated to reference "Table A" instead of "LineItems." However, the schema region 150 shows "LineItems" and not "Table A" since the schema region 150 displays the field names of tables as they occur in the data source in the data preparation screen.

Figure 6C:
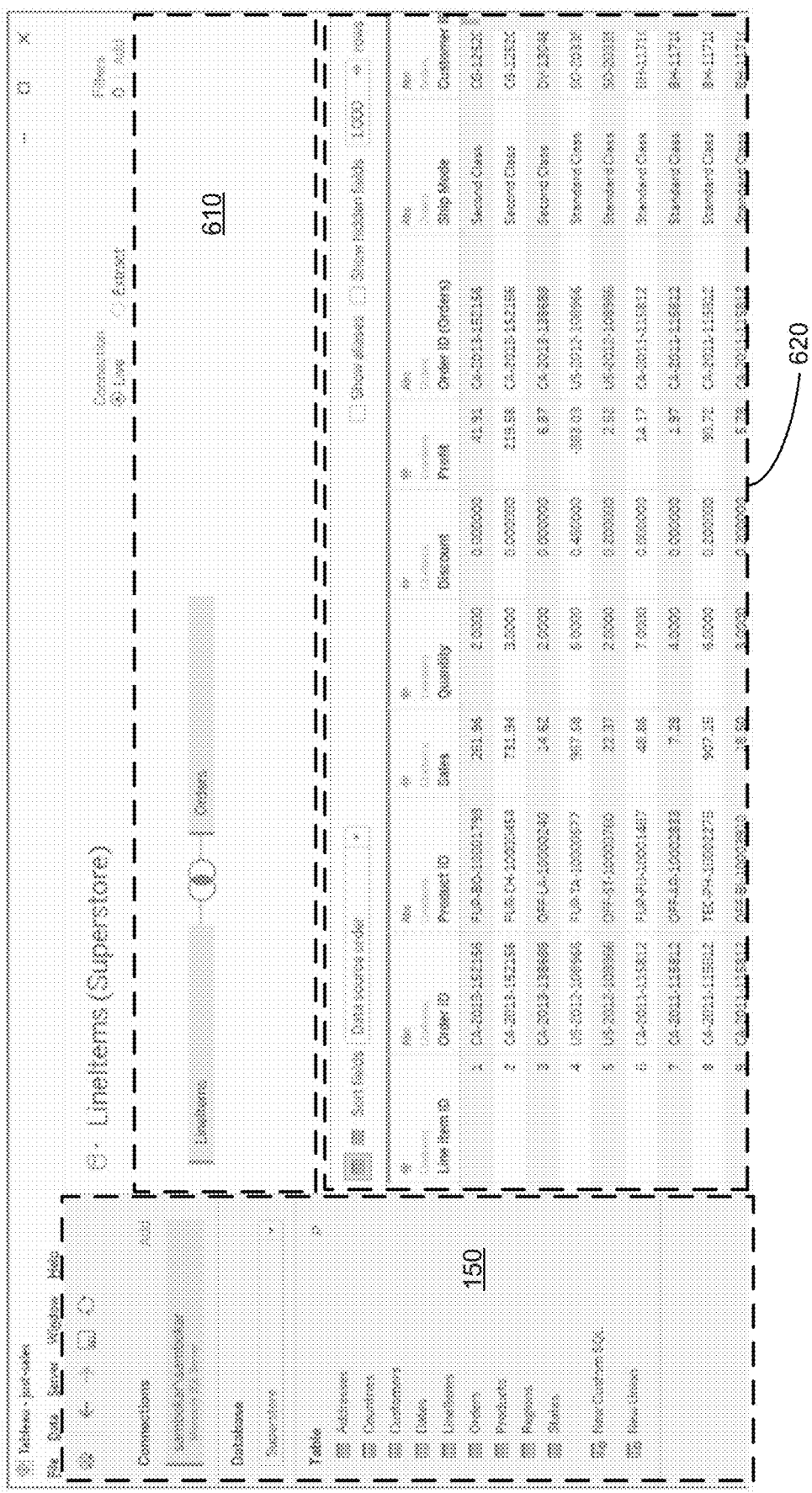

Following the example provided above in FIG. 6A, FIG. 6C shows an example where the user adds a second table, "Orders," to the workspace. In response to the user selection to add the "Orders" table, the data visualization application automatically performs a join between the "LineItems" table and the "Orders" table. Additionally, the panel 620 is updated to show data fields from both the "LineItems" table and the "Orders" table.

Figure 6D:
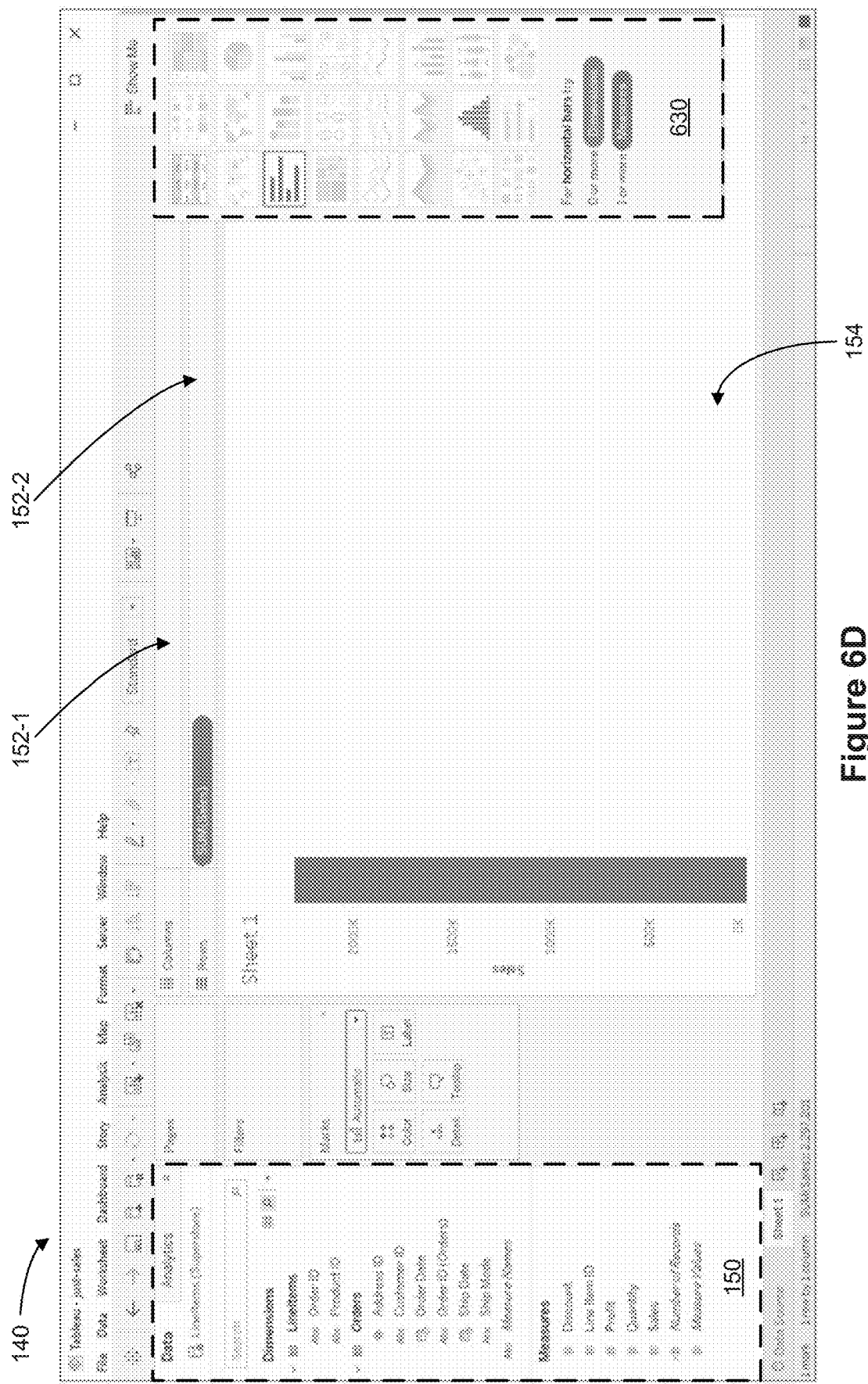

In some implementations, two or more tables that are added to the workspace may include data fields having a same name (e.g., a same field name, a same name in the data source). For example, the two tables, "LineItems" and "Orders," may both include a data field with the field name "order ID." FIG. 6D illustrates how the data visualization application 222 handles such situations. In FIG. 6D, the graphical user interface 140 shows a workspace screen that includes the schema region 150, the data visualization region, 154, and the plurality of shelf regions 152-1 and 152-2. Additionally, the graphical user interface is currently in the object-based display mode, evidenced by the grouping of data fields based on their association with tables in the object model in the schema region 150. The schema region 150 shows that the "LineItems" table includes two data fields, "Order ID" and "Product ID," and that the "Orders" table includes six data fields. One of the six data fields in the "Orders" table is "Order ID." In order to differentiate between the two "Order ID" data fields, the data visualization application 222 automatically generates a new remote name (e.g., renames) the "Order ID" data field that is associated with the "Orders" table to "Order ID (Orders)" to differentiate it from the "Order ID" data field that is associated with the "LineItems" table, which is labeled as "Order ID." In other words, the data visualization application 222 automatically adds a caption to the remote name of the data field so that the remote name of the data field is changed from "Order ID" to "Order ID (Orders)." In some implementations, the caption is automatically generated based on the table to which the data field belongs. In this example, the "Order ID" data field that is associated with the "Orders" table is renamed (e.g., the remote name is changed) since the "Orders" table was added after the "LineItems" table. Although FIG. 6D shows the automatic renaming of the "Order ID" data field when the graphical user interface 140 is in the object-based display mode, the automatic renaming may also occur when the graphical user interface 140 is in the folder-based display mode. In some implementations, a change in the remote name (e.g., automatic renaming, a user-initiated name change, user-defined name change) is carried over when switching between the display modes.

FIG. 6D also shows an example of a generated data visualization. In this example, the data visualization application 222 has generated a data visualization that is a bar chart showing a sum of the information in the "Sales" data field. The shelf region 152-2 shows that a sum of the "Sales" data field is associated with the shelf region 152-2. The graphical user interface 140 also shows an expanded window 630 (e.g., a pop-up window or drop down window) that allows a user to select from different data visualization types (e.g., data visualization options, chart types, graph types). In some implementations, window 630 shows data visualization types that are suggested or recommended by the data visualization application 222. In some implementations, the data visualization types may be suggested based on any of: characteristics of the data field used in the data visualization (e.g., based on data type of the "Sales" data field), most popular data visualization types, and user preference of data visualization types.

Figure 6E:
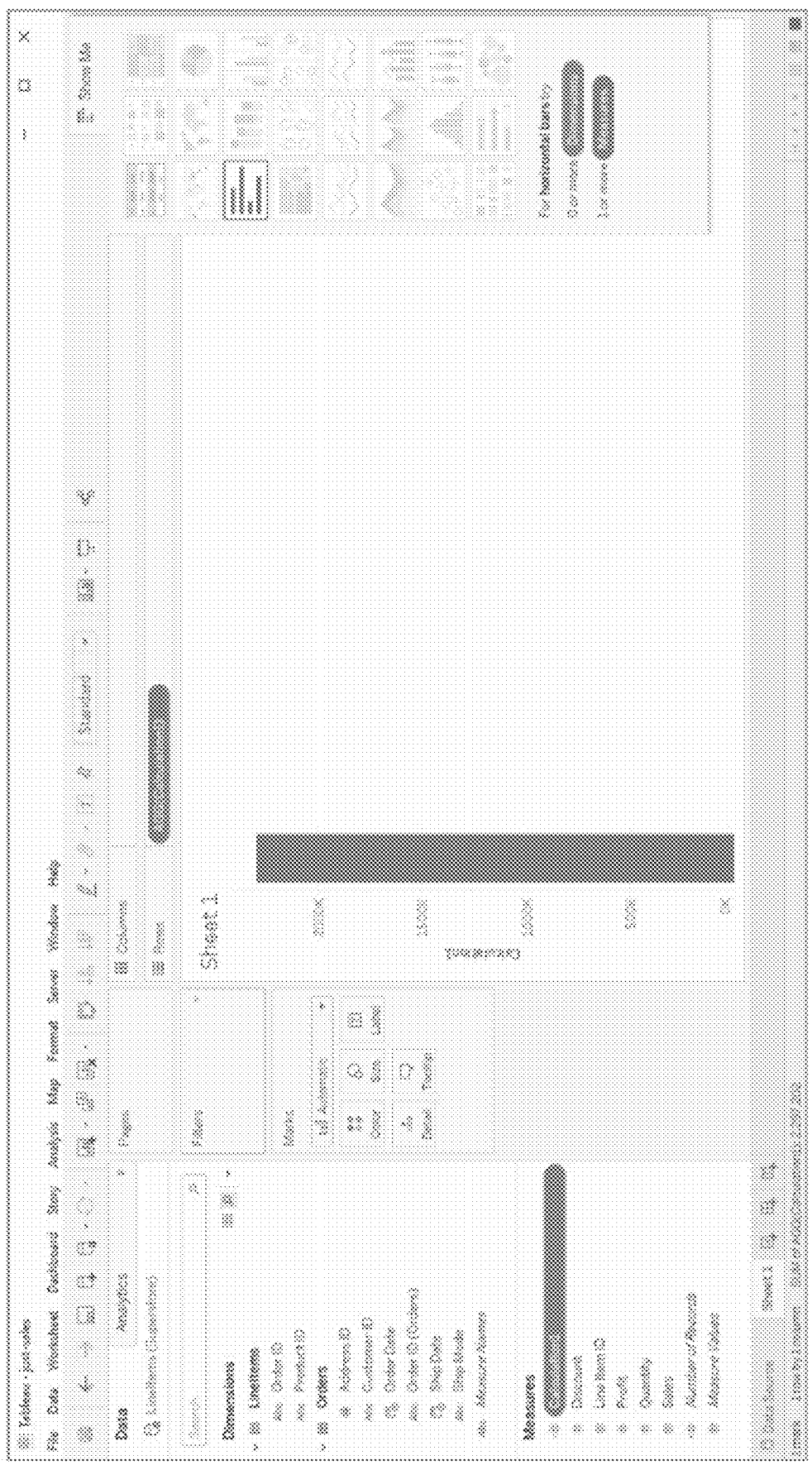

FIG. 6E shows an example of generating a calculation (e.g., calculated data field, user-generated field) that uses data in a data field from the data source. In this example, the calculation references the "Sales" data field (e.g., uses information or data from the "Sales" data field). The data visualization application 222 automatically generates a remote name and caption for the calculated data field, in this example "Calculation1." The calculation refers to the remote names and not the field names that are in the data source. Thus, if the user updates the remote name of the "Sales" data field to, for example, "New Sales Name," the "Calculation1" calculated field will show that it references the "New Sales Name" data field.

After the first calculated field is generated and automatically named, the user may choose to rename the calculated field. For example, the user may rename the "Calculation1" calculated field to "NewCalc." In such cases, as shown in FIG. 6F, all instances of "Calculation1" are updated (e.g., changed) to "NewCalc."

Figure 6F:
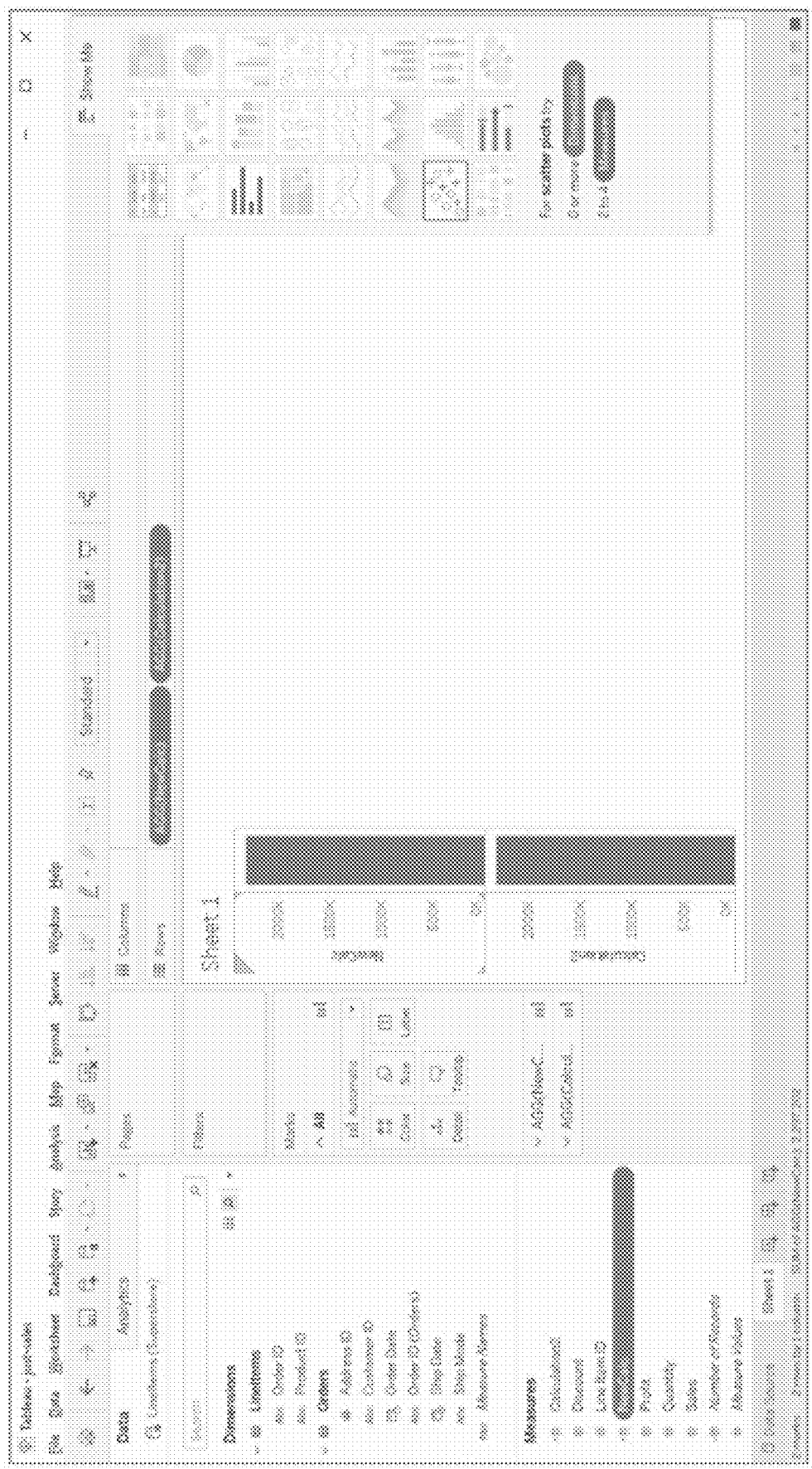

FIG. 6F also shows an example of generating a calculation that references a calculated field (e.g., references another calculation). In this example, the user generates another calculation that references (e.g., uses information from) the "NewCalc" calculated field. As shown, the data visualization application 222 automatically generates a name and caption for the new calculated field "Calculation2." In this example, if the "Calculation2" calculated field were generated before the name change of the "Calculation1" calculated field, the "Calculation2" calculated field would initially reference the "Calculation1" calculated field, and in response to the name change of the "Calculation1" calculated field to "NewCalc," the "Calculation2" calculated field would be updated to show that it references the "NewCalc" calculated field.

Figure 6G:
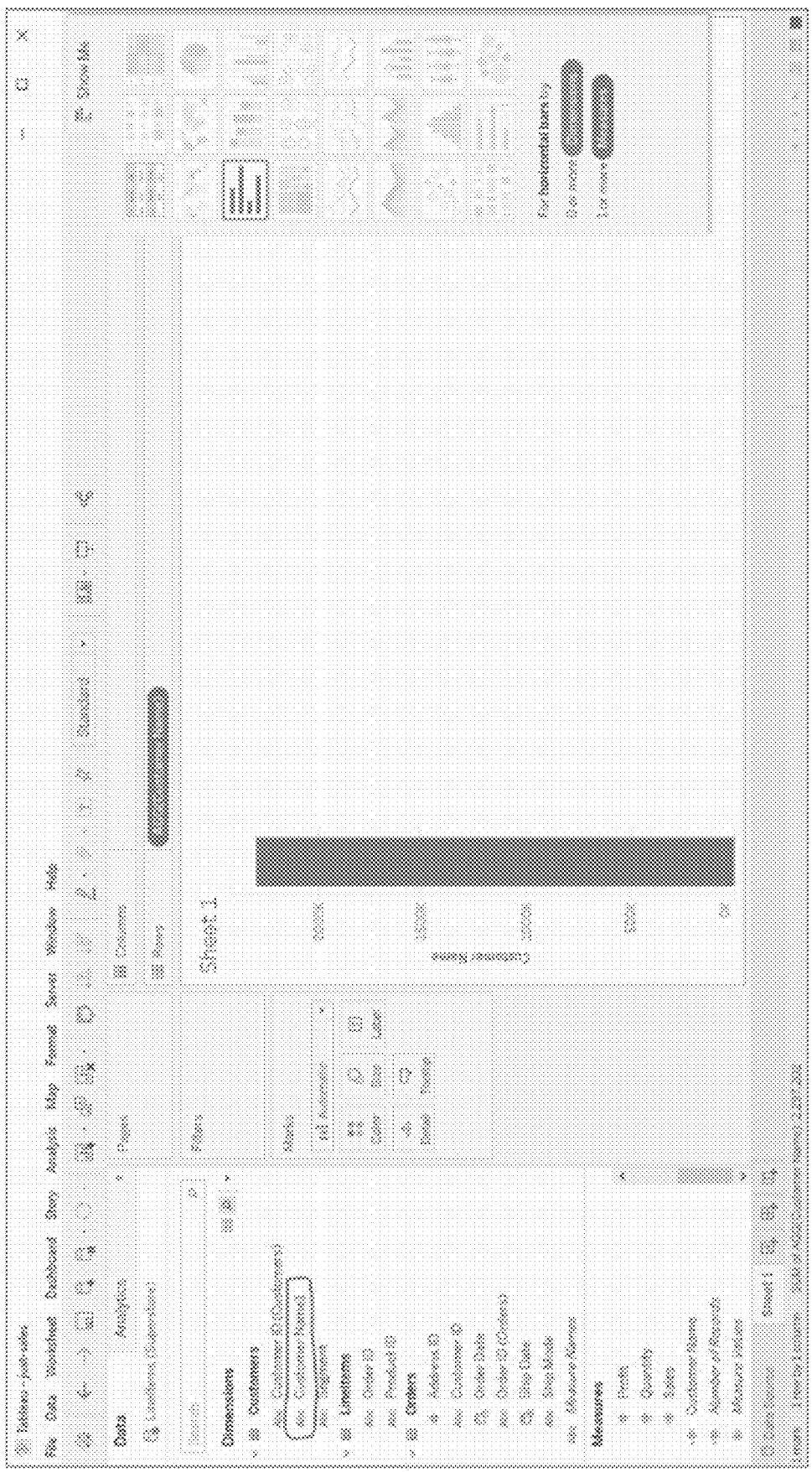

As described above, the user may add new tables to the workspace at any point in time. FIG. 6G illustrates an example where the user adds a new table to the workspace after having started some data analysis. In this example, the user has already generated a few calculated fields, "Customer Name," "Number of Records," and "Measure of Values" (shown at the bottom of the schema region 150). After having generated the calculated fields, the user adds a data field from the data source to the workspace. The data field has the field name the "Customer Name" in the data source and thus, the default setting would be for the remote name of the data field to also be "Customer Name." However, a calculated field with the remote name "Customer Name" already exists in the workspace. In order to resolve this naming conflict and clearly distinguish (e.g., disambiguate) between the two data fields, the data visualization application 222 automatically adds a caption to the remote name and provides disambiguation logic in order to assign a unique remote name to the data field being added. In this example, the data field being added is automatically assigned the remote name "Customer Name1." Note that unlike the previous example provided in FIG. 6D, the added data field is name given the remote name "Customer Name 1" and not "Customer Name (Customer)," which requires the caption to refer to the field name of the table or data object to which the data field is associated. This is because generated field (e.g., user-generated fields), including calculated fields, do not affect any field name to remote name disambiguation and thus, renaming of generated fields and automatic naming of generated fields do not reference or affect the field names of data tables or data fields in the data source.

Figure 6H:
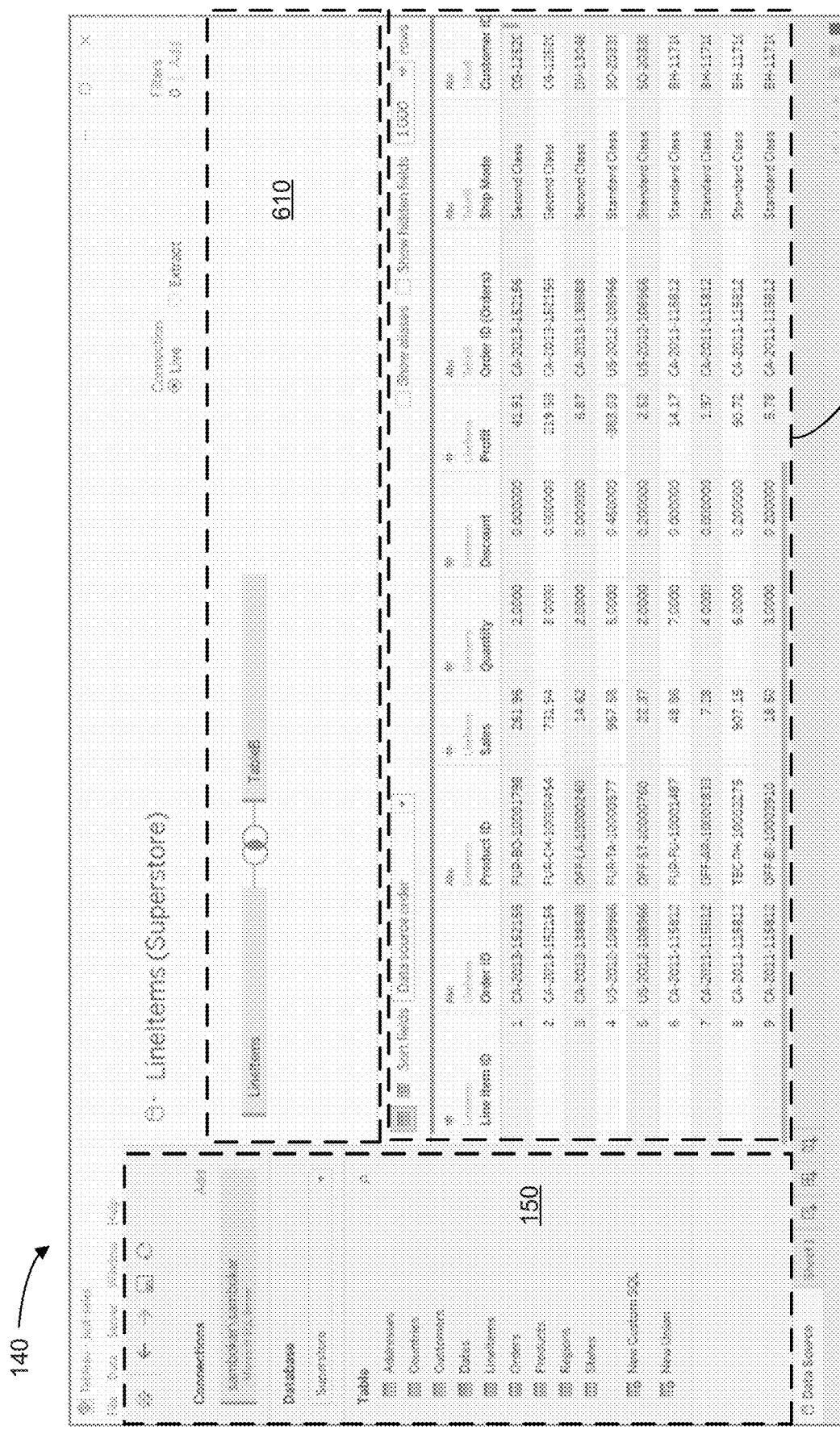
Figure 6I:
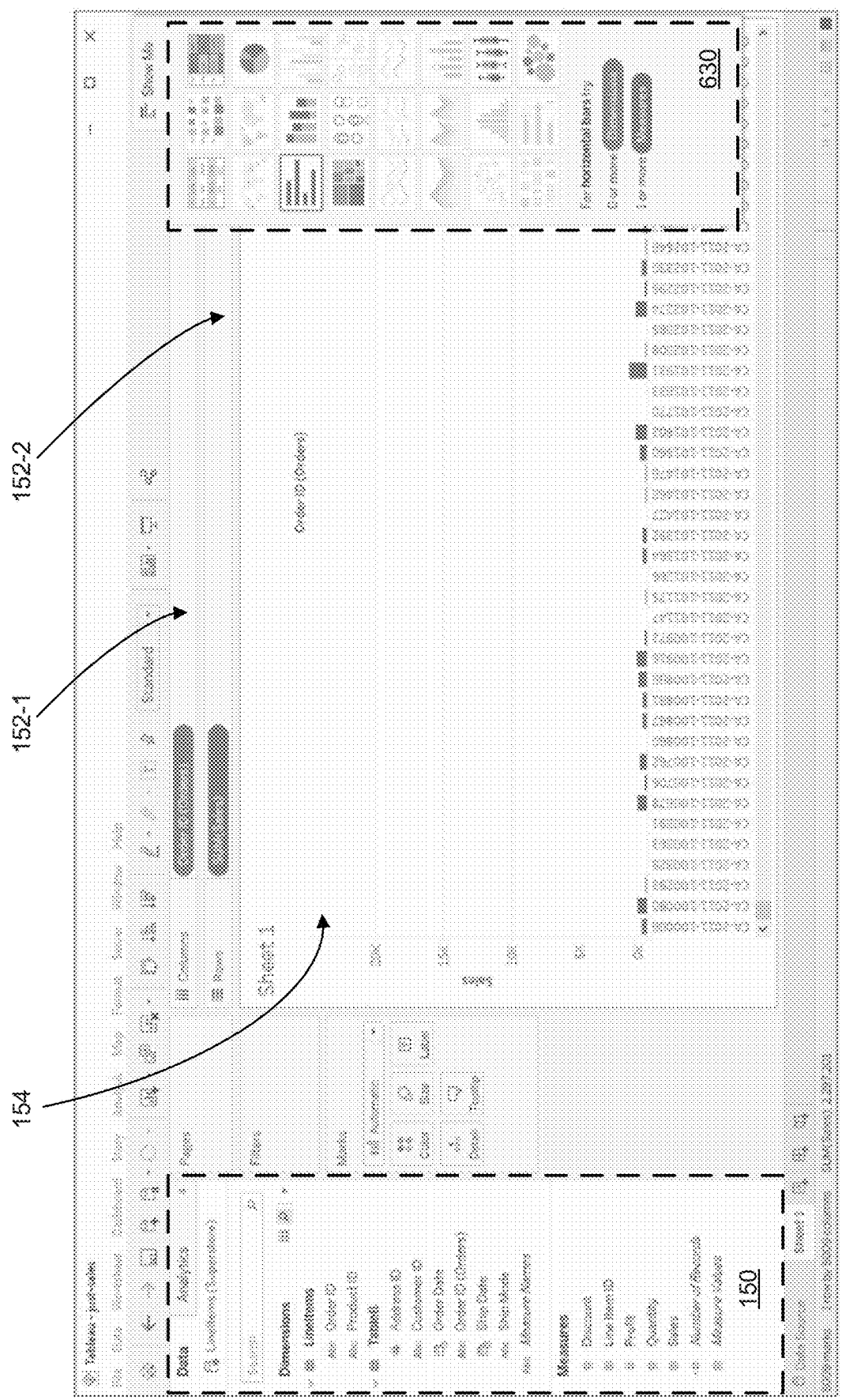

As described above, in some implementations, the user may change the remote name of a table once the table has been added to the workspace. Following the example provided above in FIG. 6C, FIGS. 6H and 6I show an example where the user has decided to rename the remote name of the "Orders" table to "Table B." FIG. 6H illustrates the data preparation screen of the graphical user interface 140. In response to the user changing the remote name of the "Orders" table to "Table B," the remote name of the table is automatically updated in the table section 610, and data fields shown in the panel 620 are updated to reference "Table B" instead of "Orders." However, the schema region 150 shows "Orders" and not "Table B" since the schema region 150 of the data preparation screen displays the field names of tables as they occur in the data source.

FIG. 6I illustrates the workspace screen of the graphical user interface 140. After the remote name of the "Orders" table has been changed to "Table B," the schema region 150 is updated to reflect the remote name change. The schema region shows two tables "LineItems" and "Table B" (compared to FIG. 6D, before the remote name is changed, which shows "Orders" instead of "Table B"). Following from the example in FIG. 6D, where the remote name of the "Order ID" data field in the "Orders" table was automatically renamed to "Order ID (Orders)", the field name of the data field remains unchanged and is not updated to "Order ID (Table B)." This is because the data visualization application 222 updates all remote names in the user workspace to the new name (e.g., "Table B"). However, references to tables use the field names as they occur in the data source. This allows a user to be able to quickly identify which data fields belong to which tables when there are duplicate field names in the data source. Similarly, when the graphical user interface 140 is in the folder-based display mode, in response to a user gesture (e.g., hover or click) regarding a data field that is associated with the "Orders" table, the graphical user interface 140 will show text indicating that the data field is associated with the "Orders" table, not "Table B" (e.g., the captions refer to the field names and not the remote names). FIG. 6I also illustrates an example of a data visualization that utilizes information (e.g., data) from two data fields. As shown, the data visualization uses information from the "Order ID (Orders)" data field, which belongs to the "Orders" table (renamed "Table B"), and the "Sales" data field, which does not belong to any specific table in the object model (a user can derive this information from the schema region 150, which lists the "Sales" data field in an area (e.g., a 'No Object' region) to indicate that the "Sales" data field is not associated with any tables or data objects in the object model.

Figure 6J:
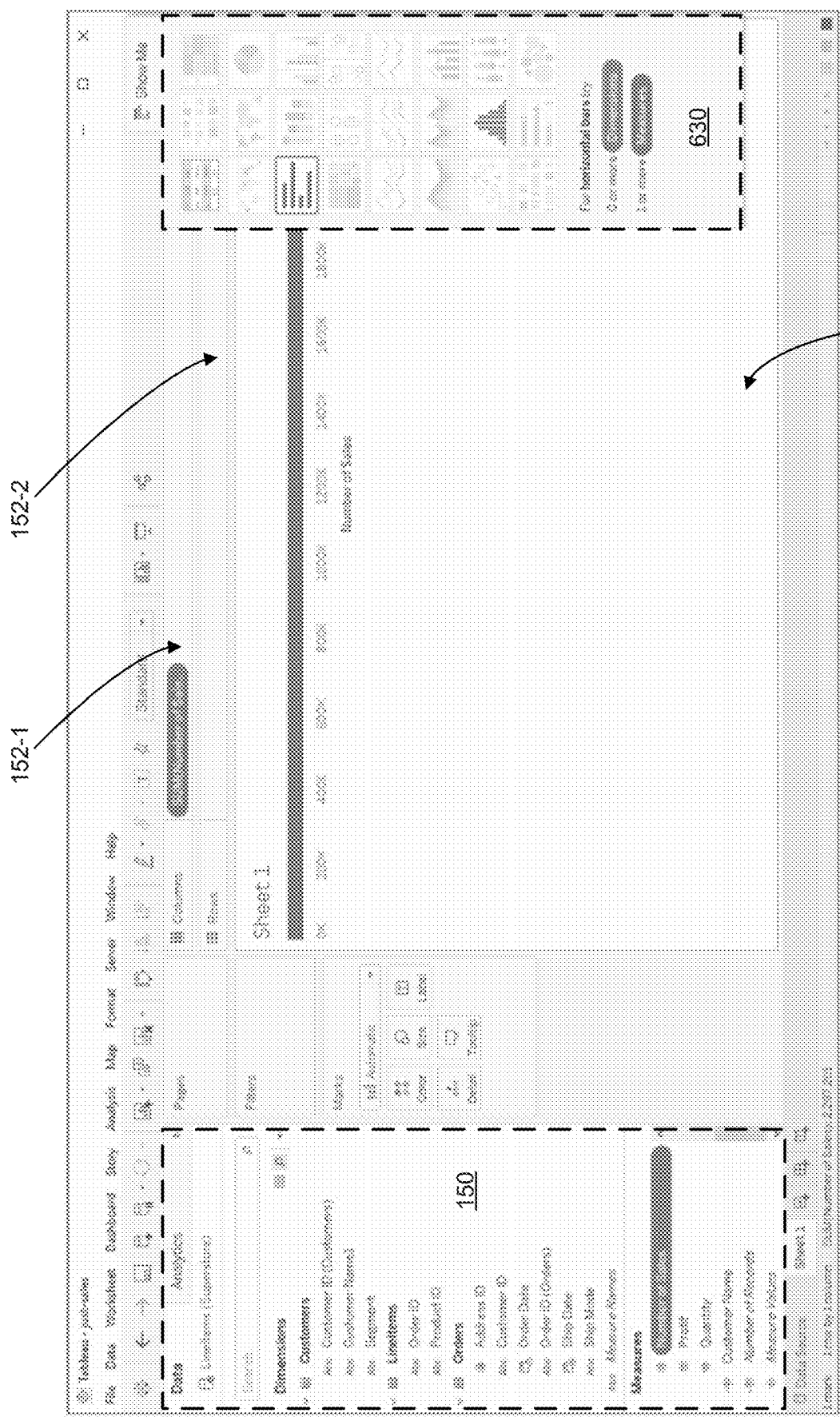

In some implementations, the user may change the name of data field once the data field has been added to the workspace. FIG. 6J illustrates an example changing the name of a data field. In this example, the user has renamed the "Sales" data field to "Number of Sales." The schema region 150 is updated according and now displays "Number of Sales" as a data field under the heading "Measures" instead of "Sales" (see FIG. 6I, which shows "Sales" before the name of the data field was changed). Accordingly, the remote name of the data field in the shelf region 152-1 is also updated to reflect the remote name change. From a user's perspective, everything that references the data field "Sales" is updated to reflect the remote name change so that all previous instances of the "Sales" data field shown on workspace screen is updated to show "Number of Sales" instead. For example, a calculated field that utilizes the "Sales" data field would be updated to use the new remote name (e.g., to show that the calculated field utilizes the "Number of Sales" data field). As described above, in some implementations, window 630 shows data visualization types that are suggested or recommended by the data visualization application 222. FIG. 6J shows an example where the 'horizontal bars' data visualization type is suggested to the user in window 630. The data visualization type is recommended based on the "1 or more measures" included in shelf region 152-1. The window 630 also shows that the 'horizontal bars data' visualization type is currently selected. This is further evidenced by the horizontal bar chart shown in the data visualization region 154.

Figure 7A:
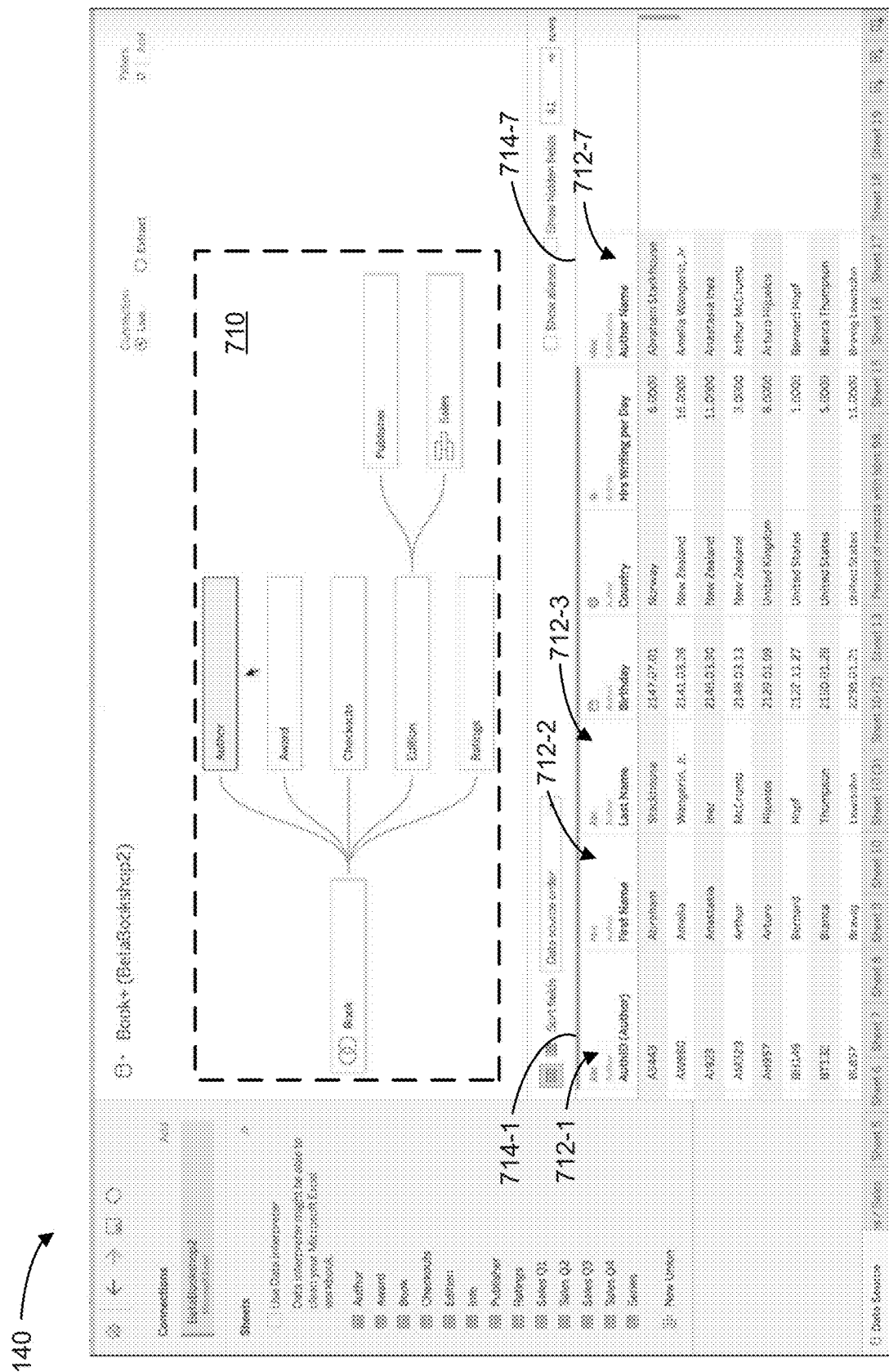
FIGS. 7A-7C illustrate a data object screen according to some implementations.
Figure 7B:
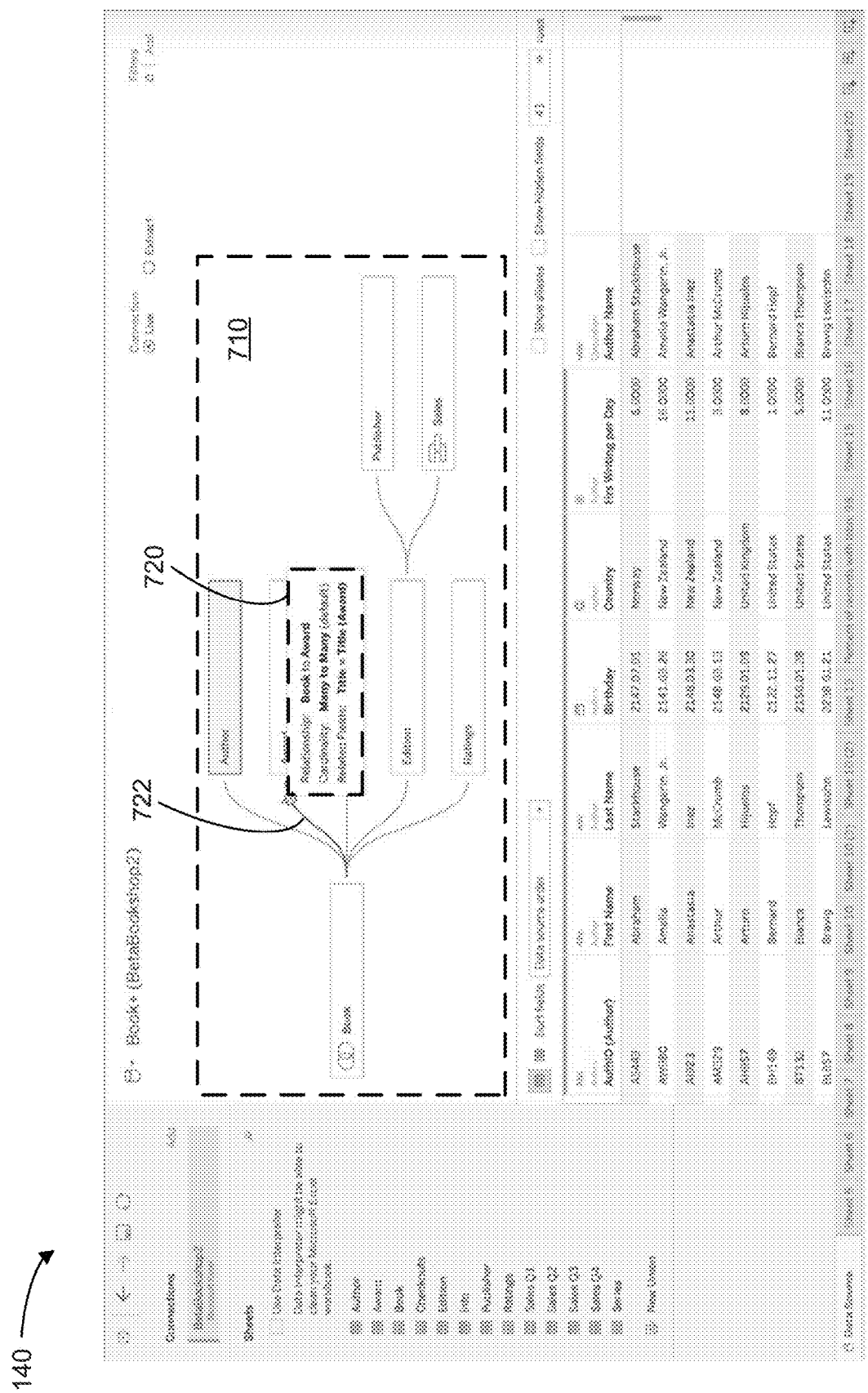
Figure 7C:
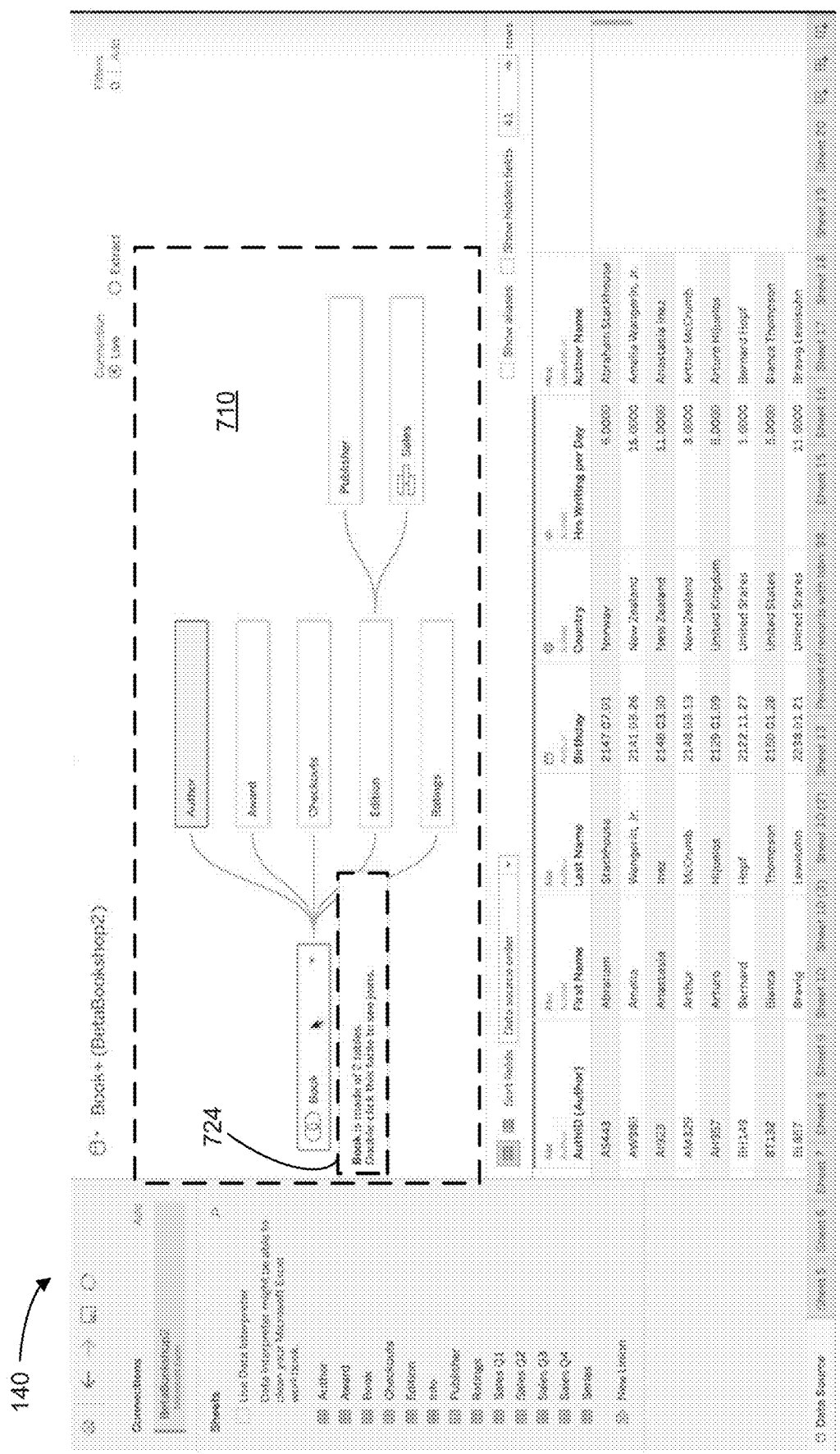
Figure 8A:
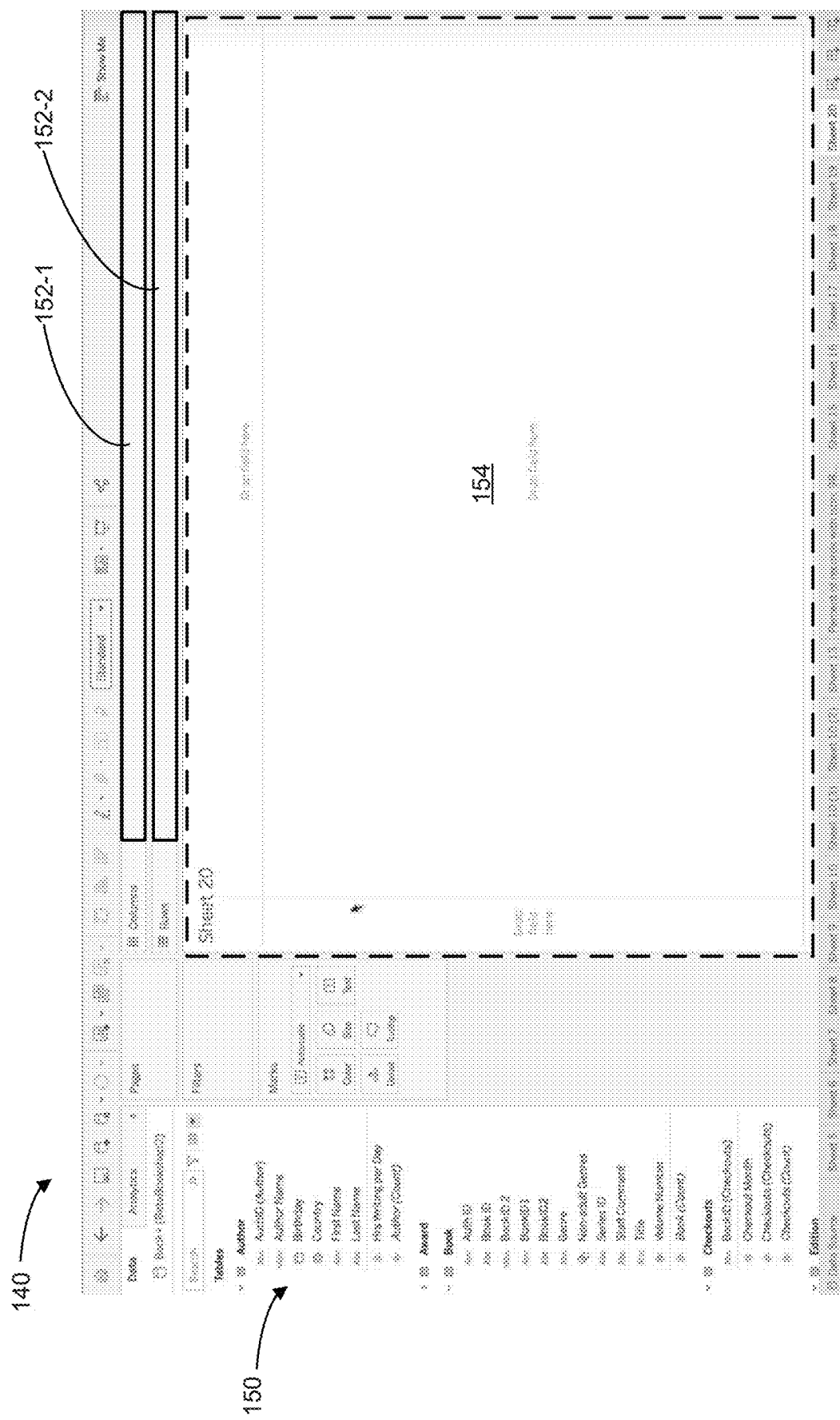
FIGS. 8A-8P illustrate analyzing data in a data visualization application according to some implementations.
Figure 8B:
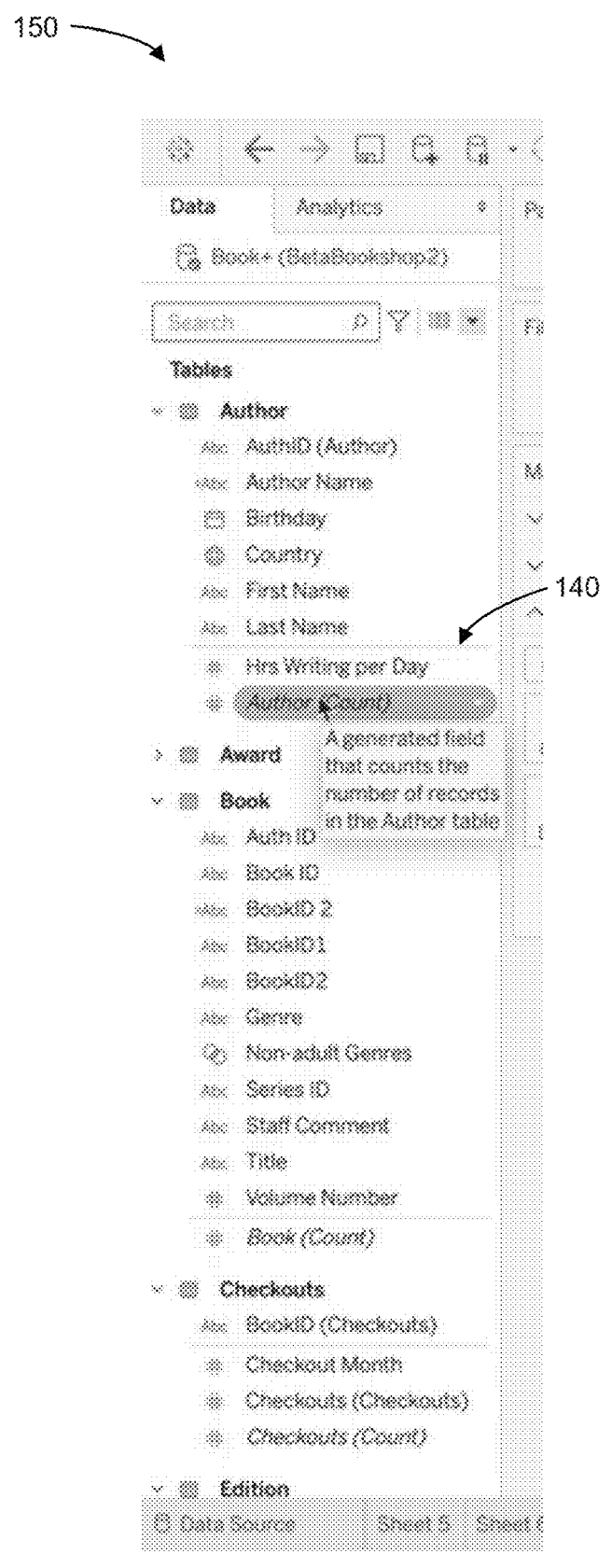
Figure 8C:
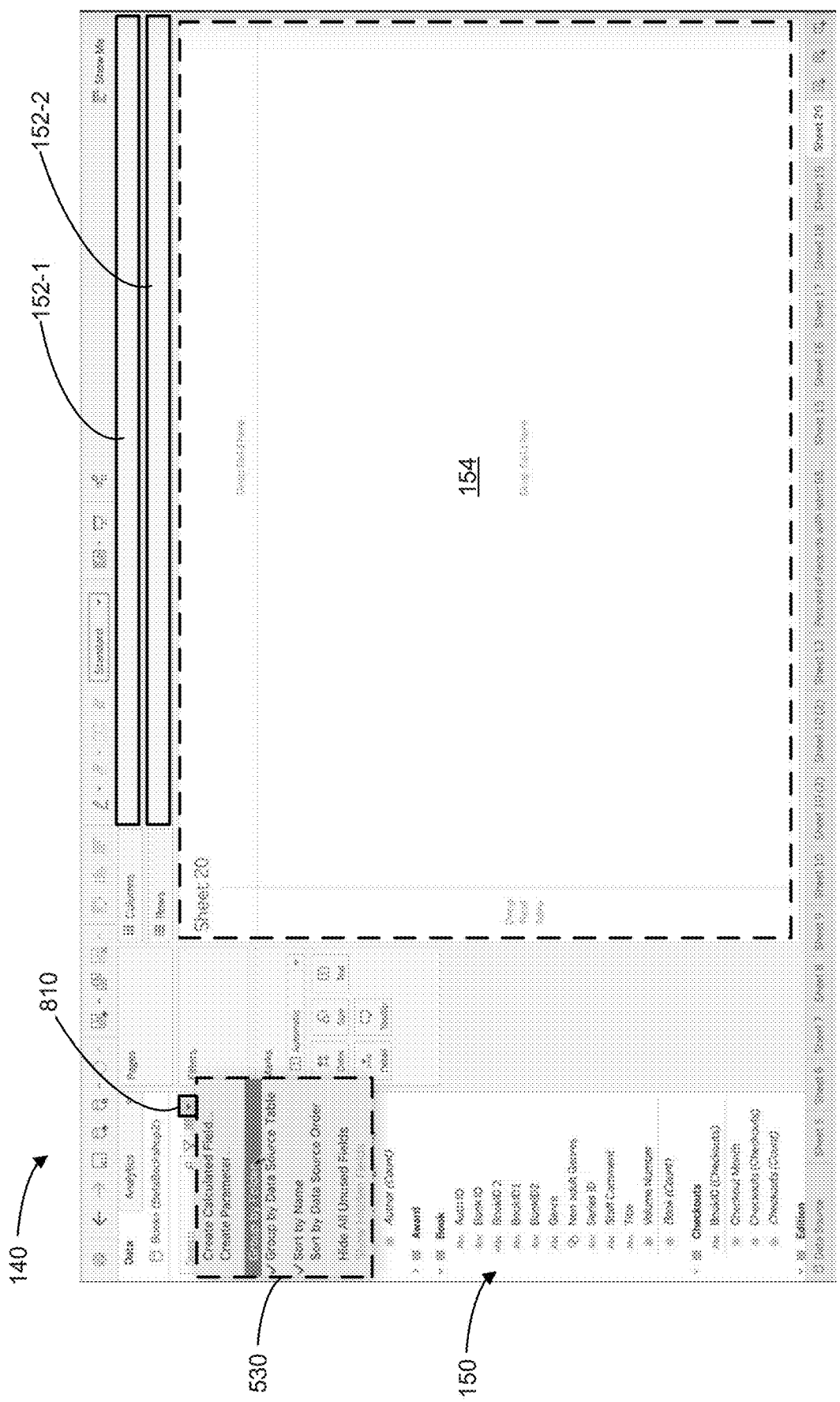
Figure 8D:
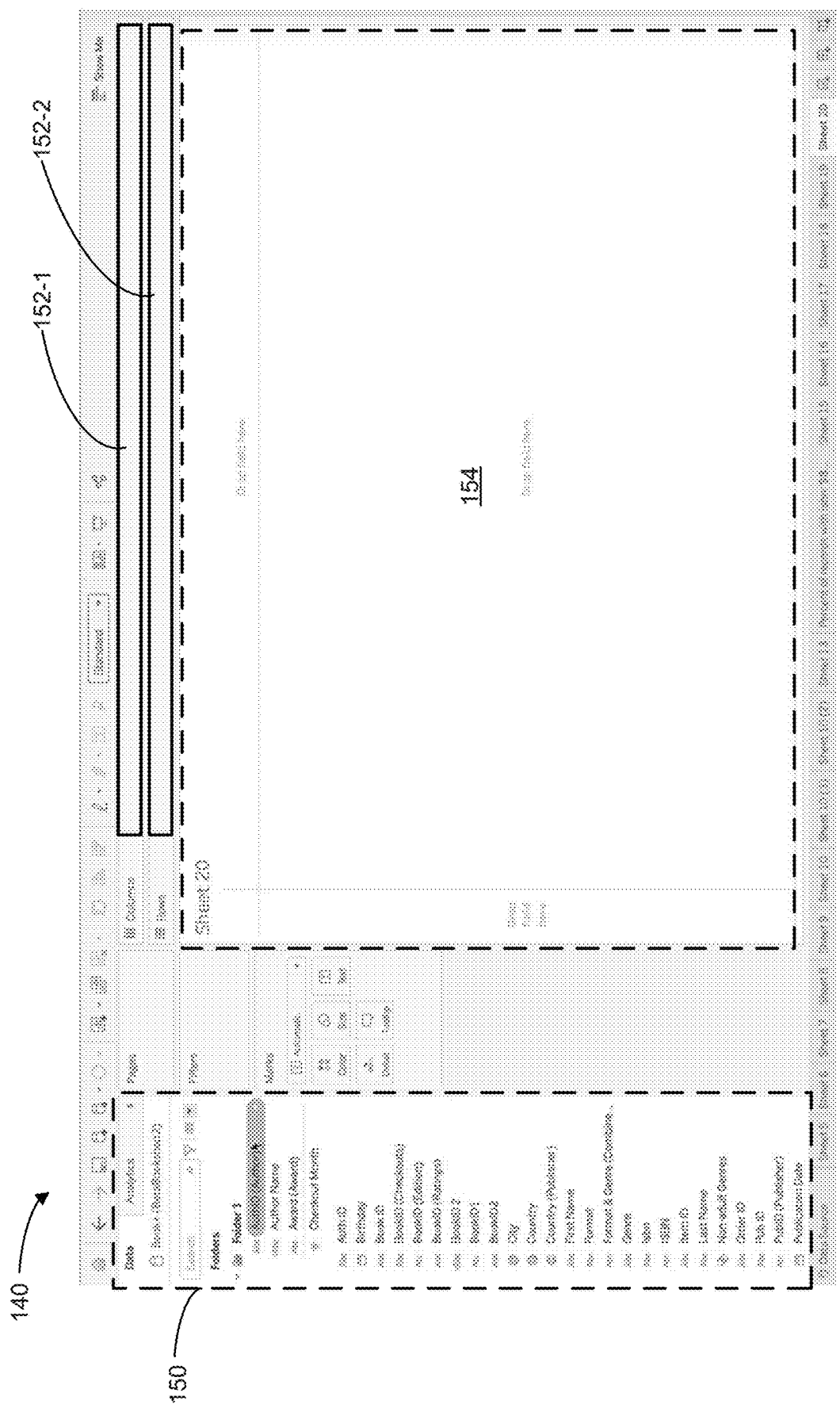
Figure 8E:
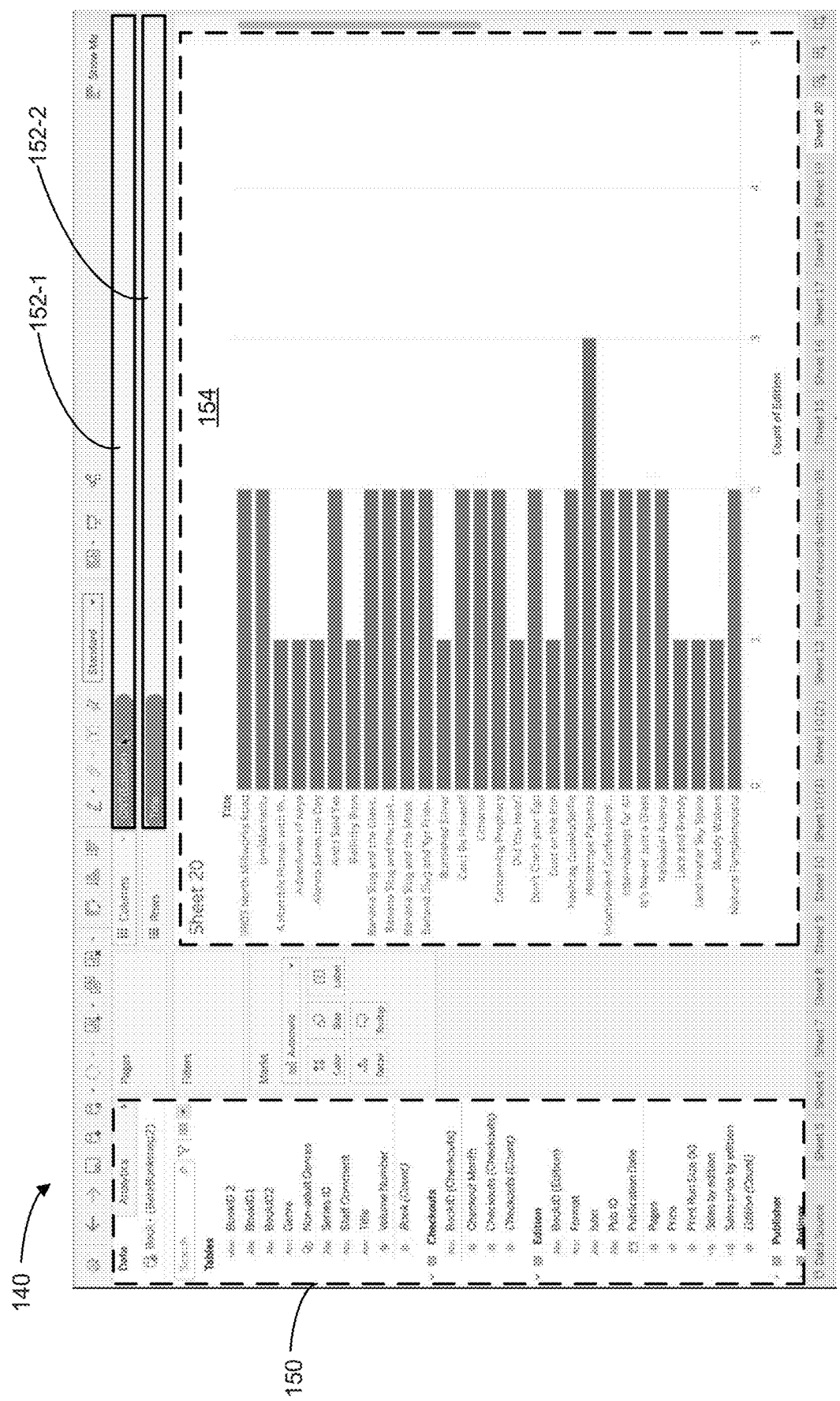
Figure 8F:
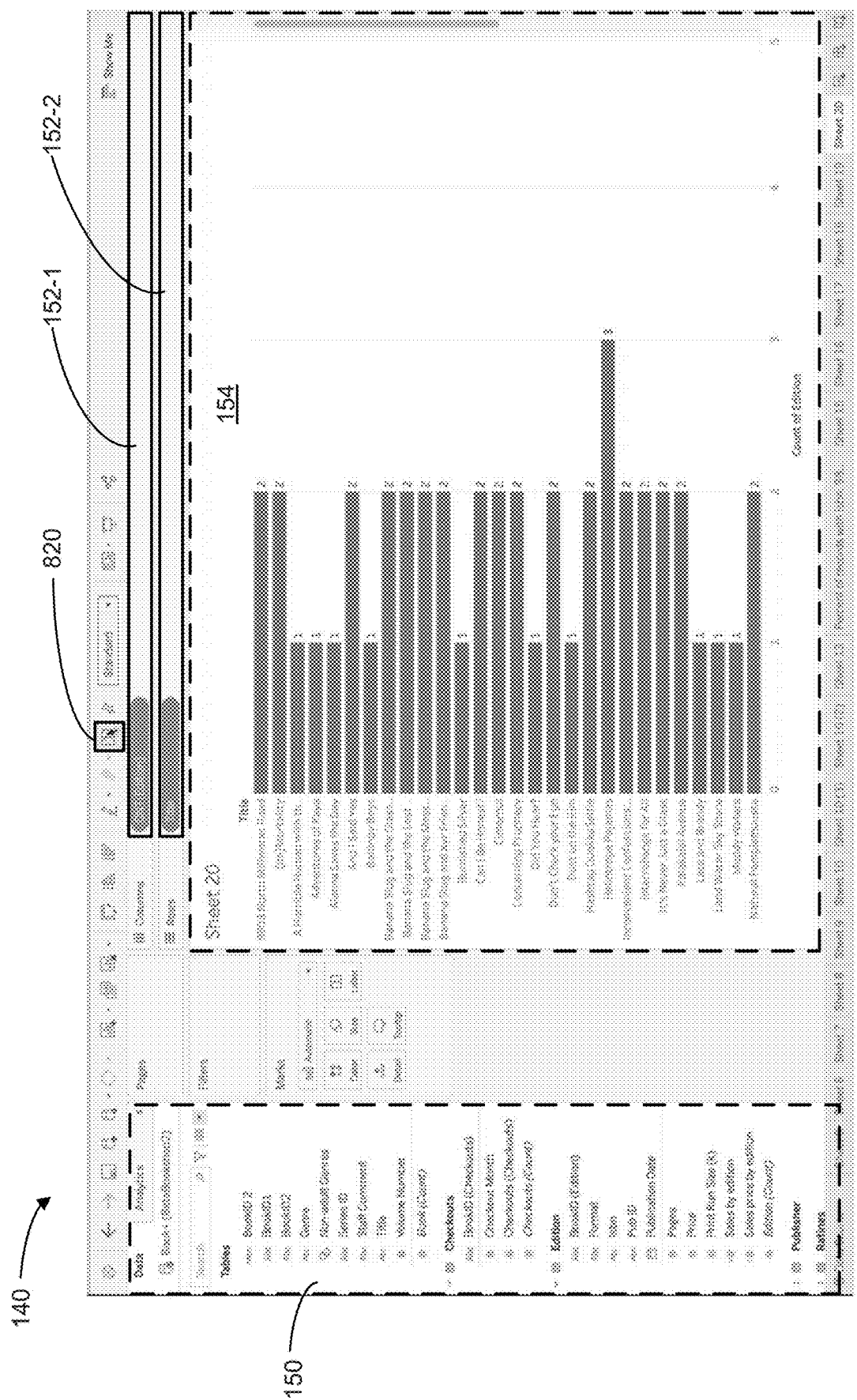
Figure 8G:
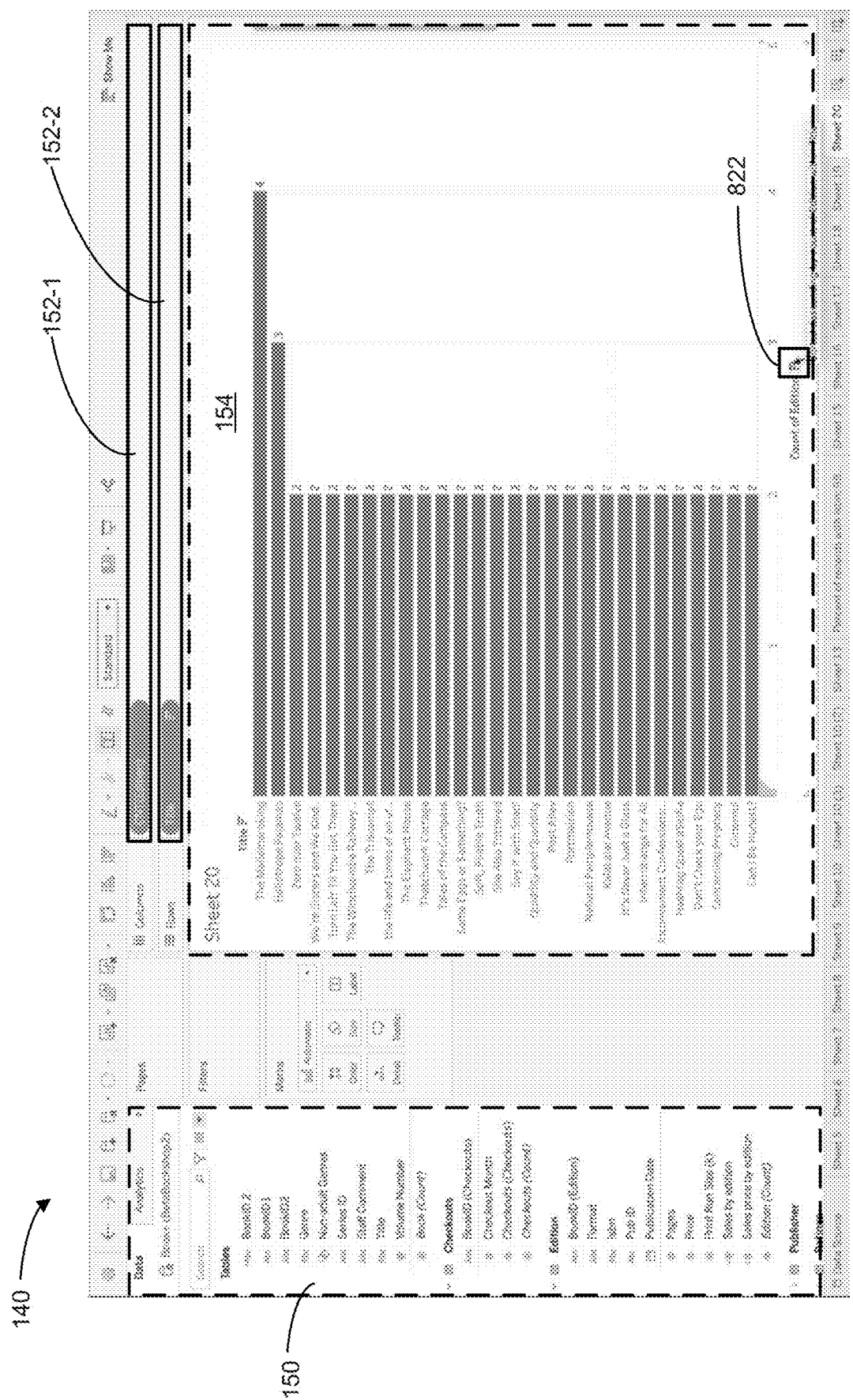
Figure 8H:
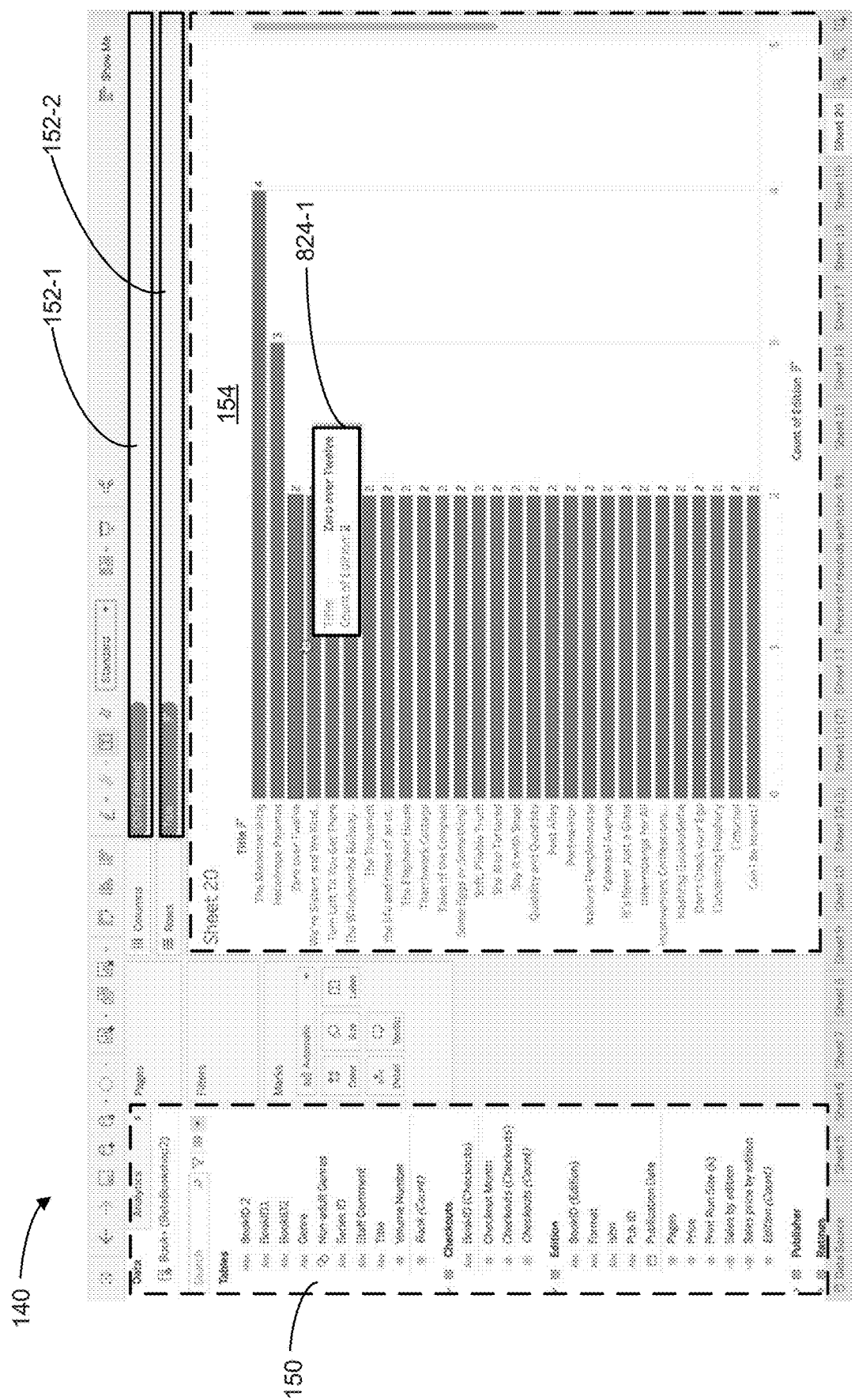
Figure 8I:
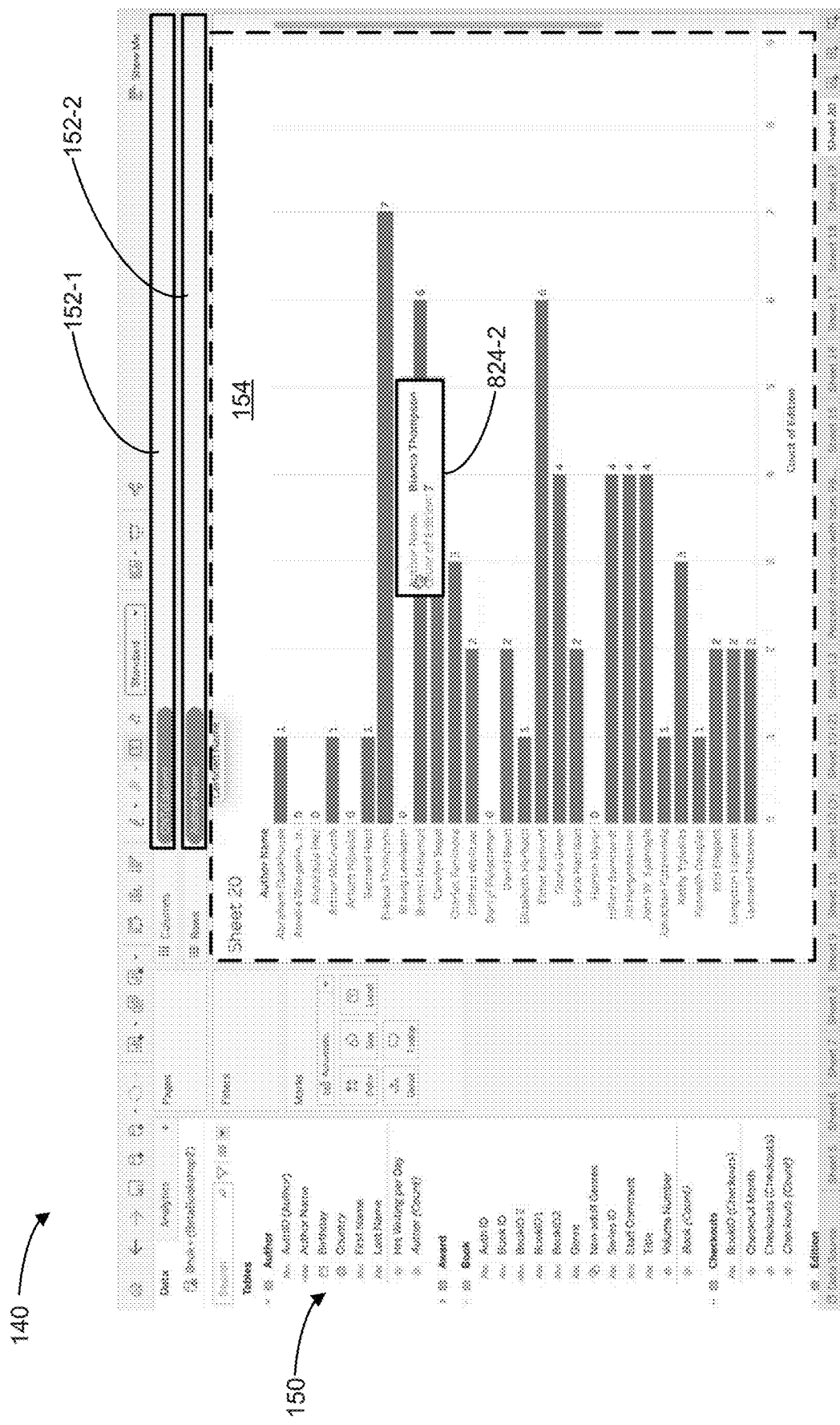
Figure 8J:
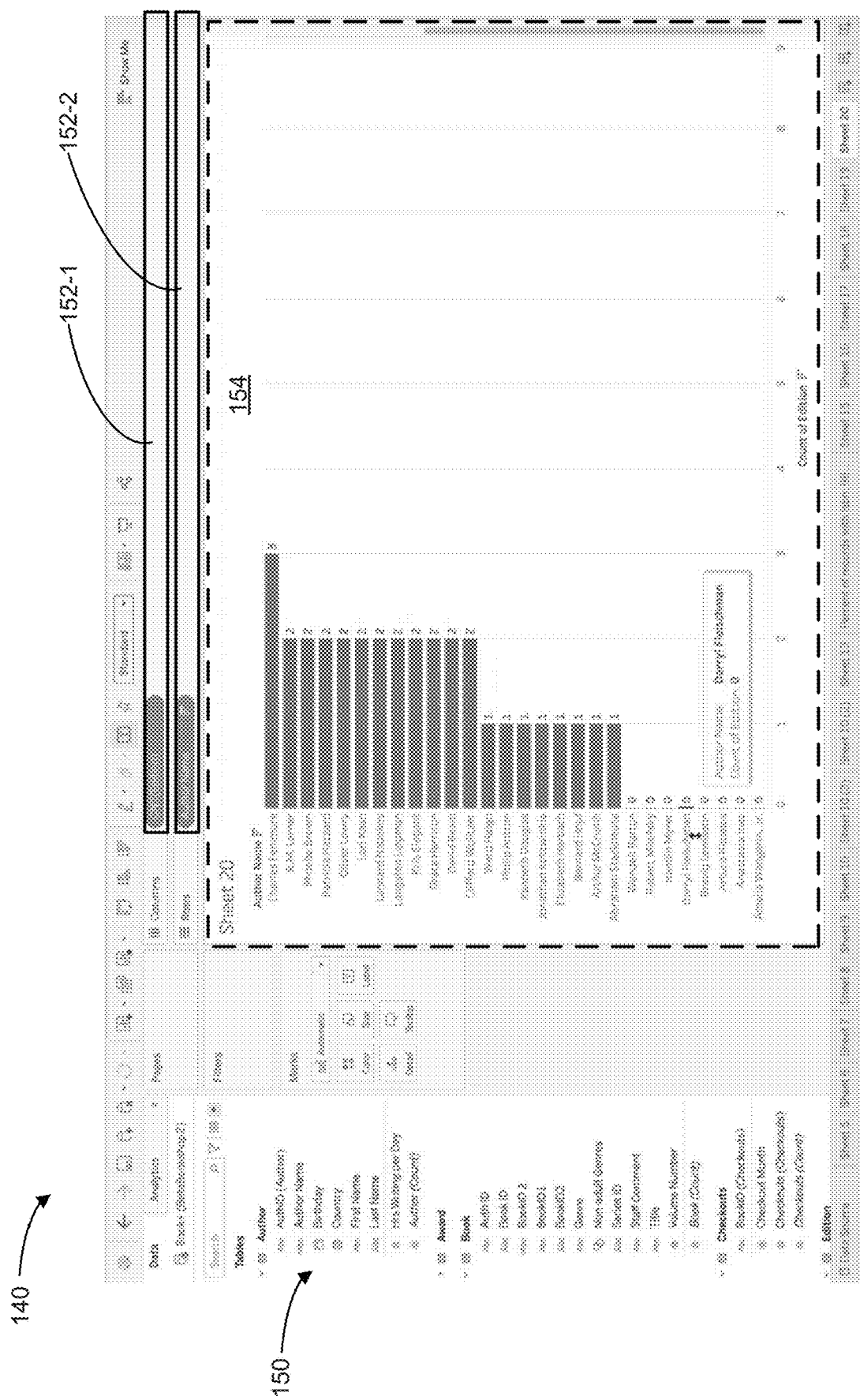
Figure 8K:
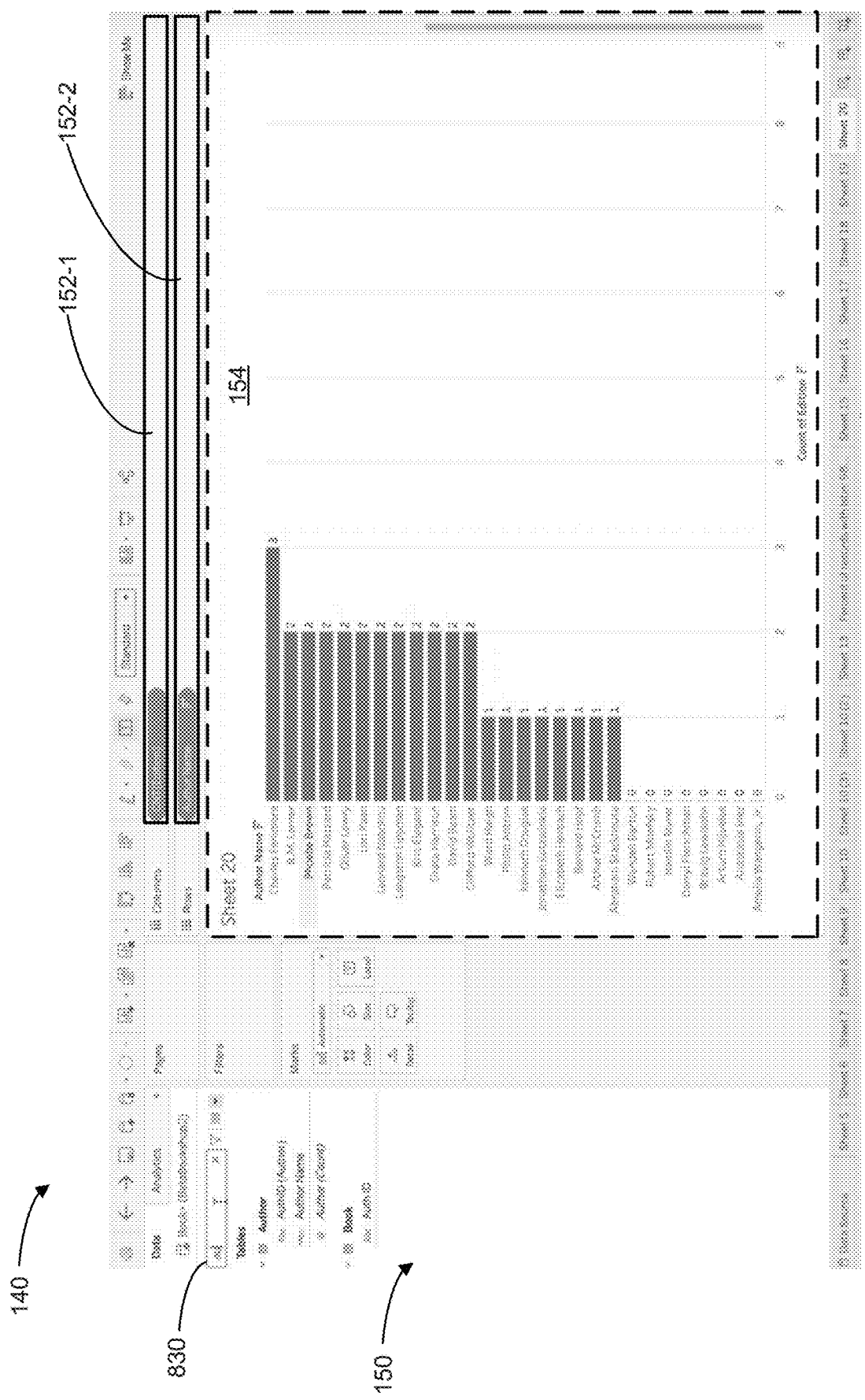
Figure 8L:
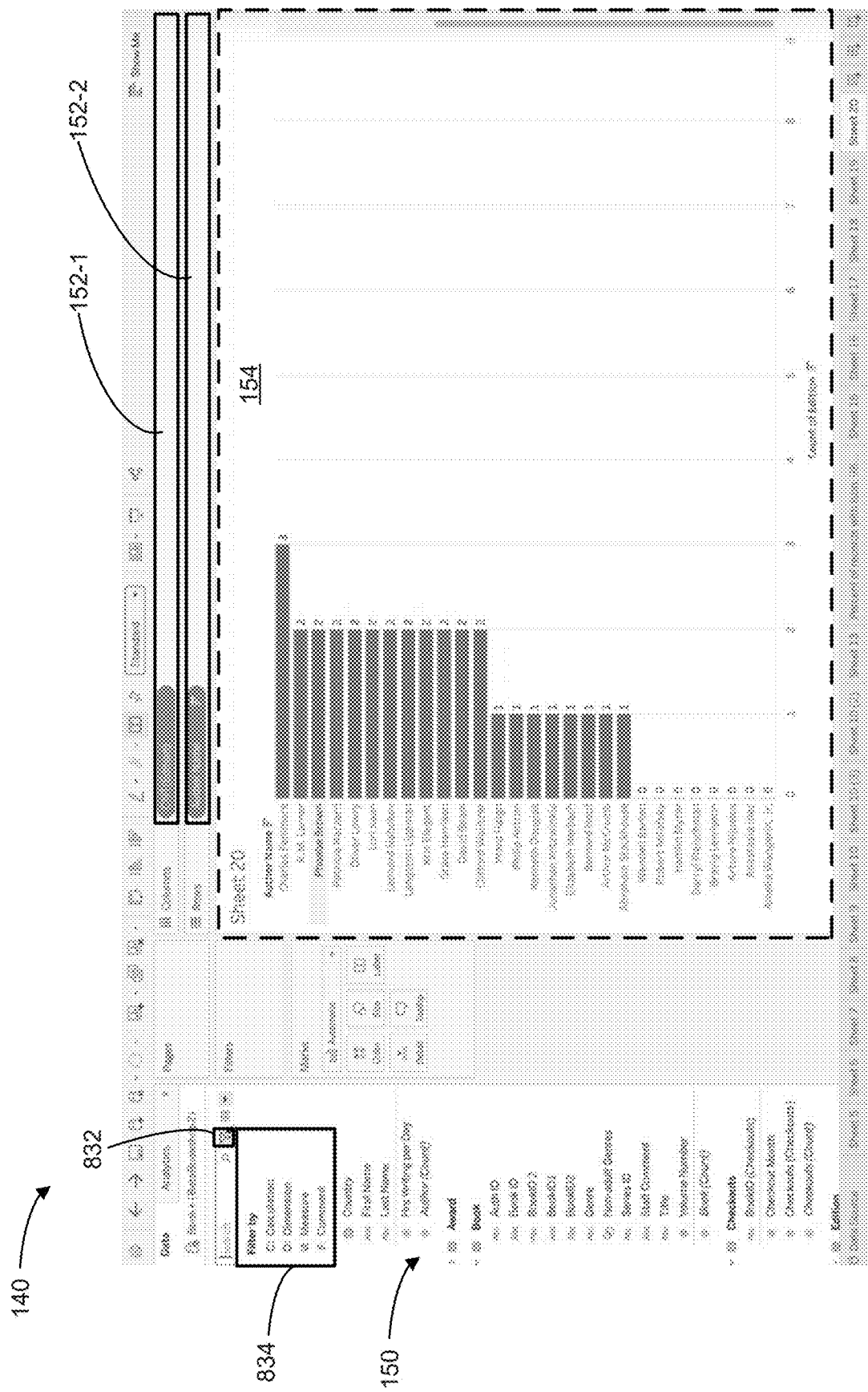
Figure 8M:
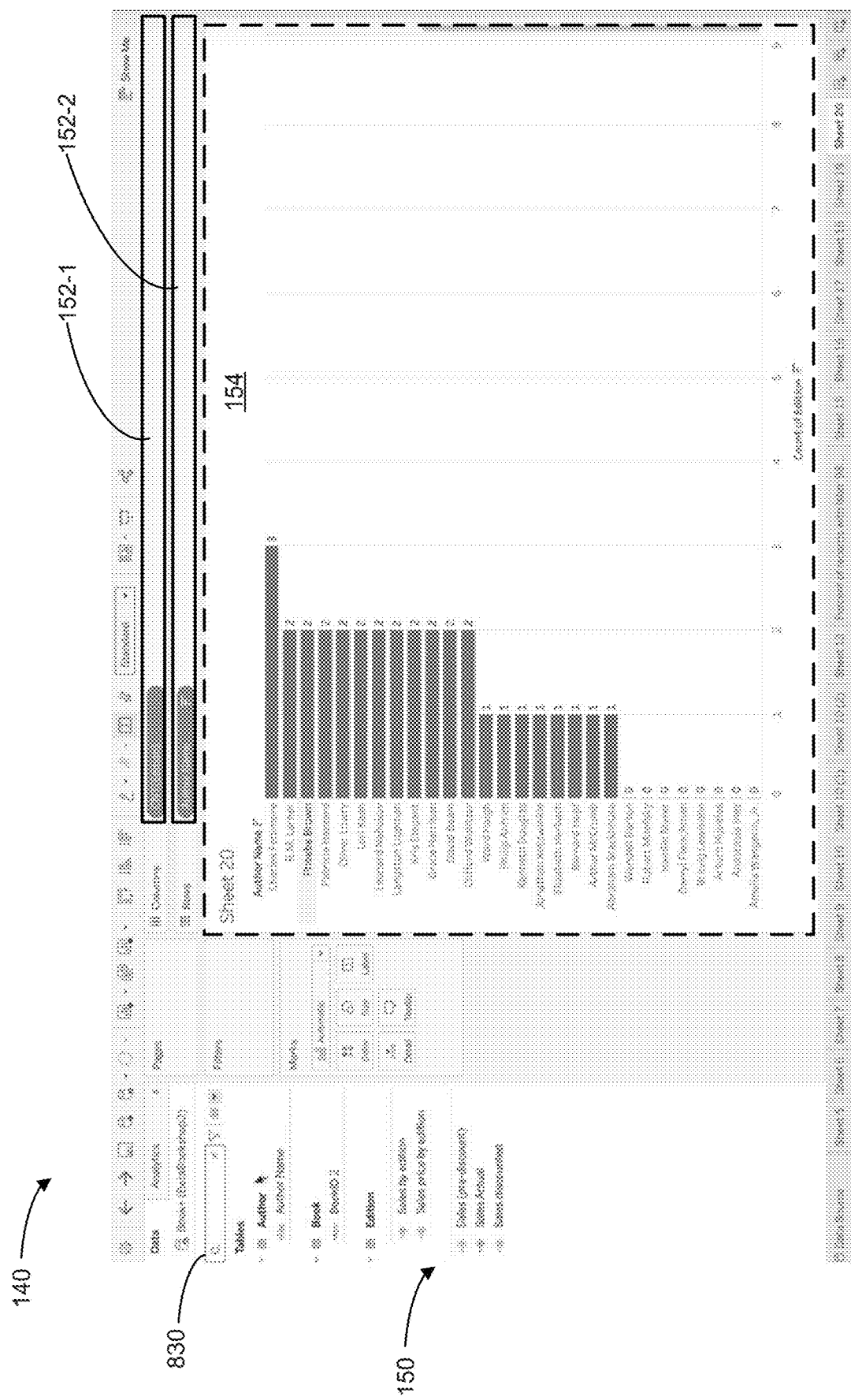
Figure 8N:
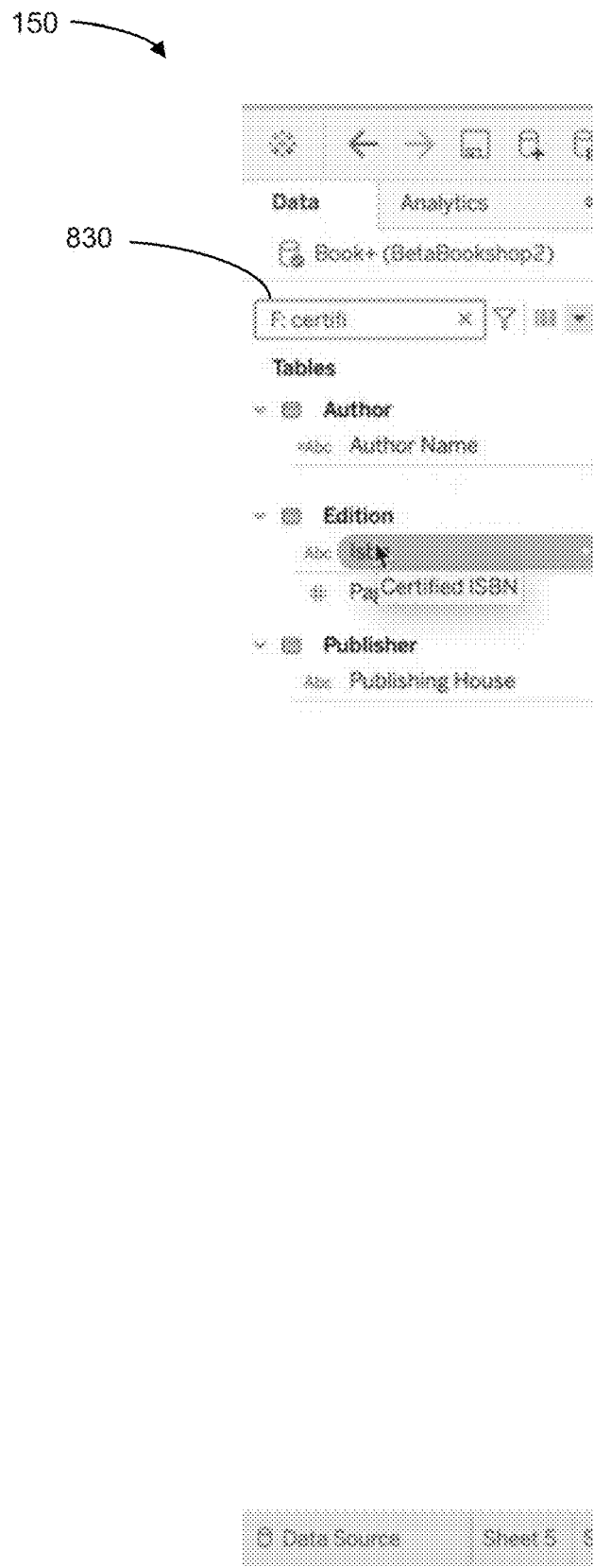
Figure 8O:
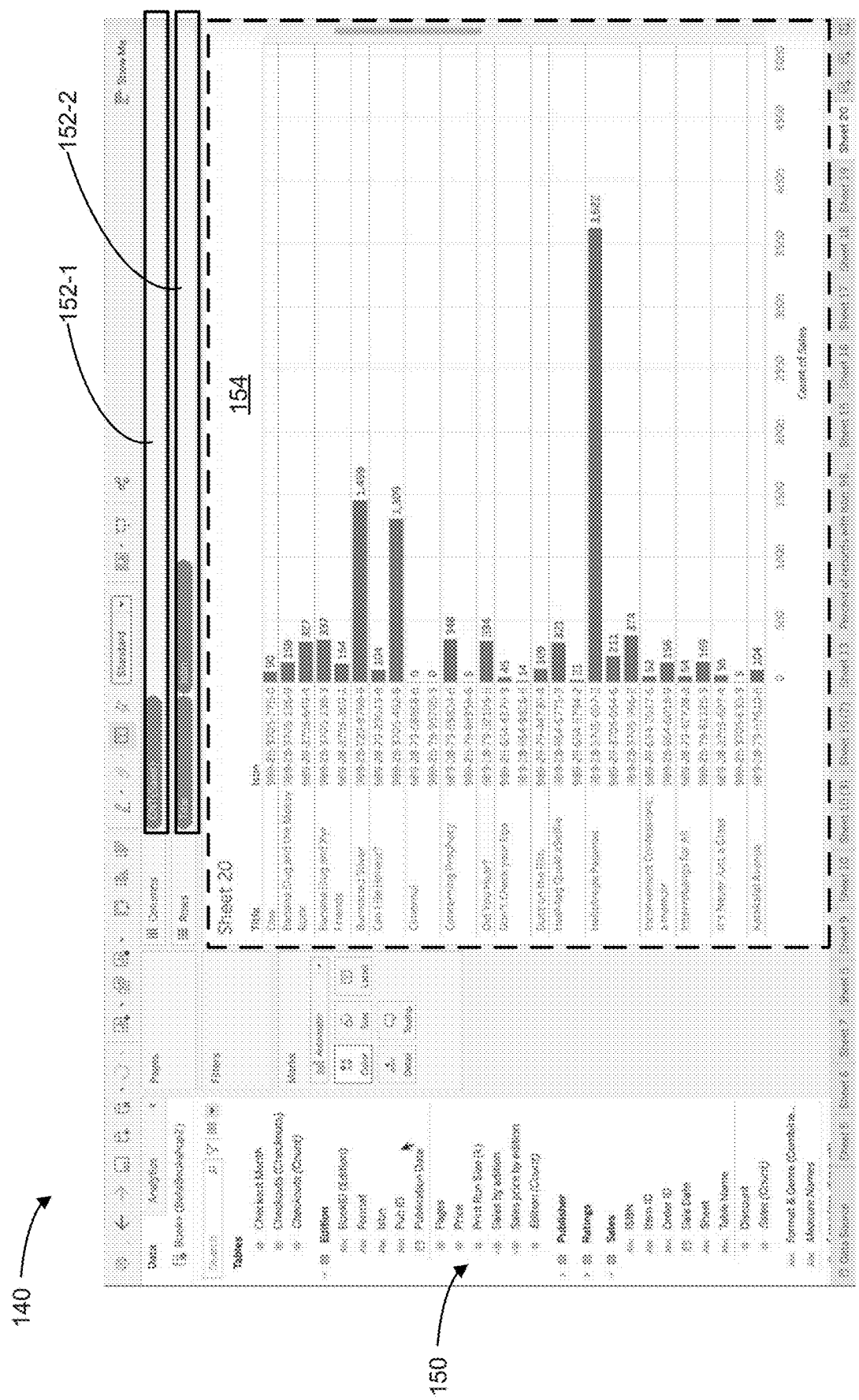
Figure 8P:
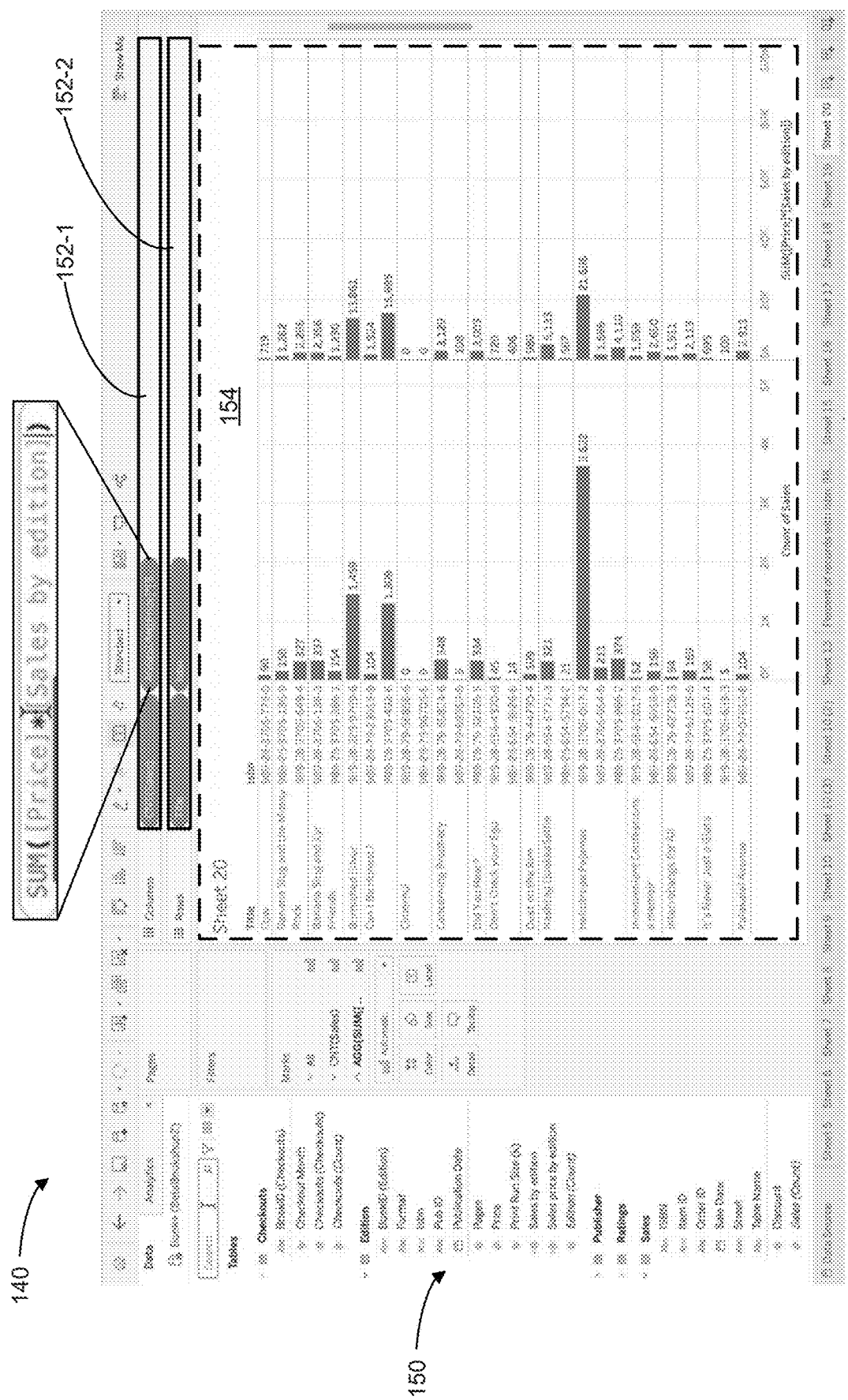
Figure 9A:
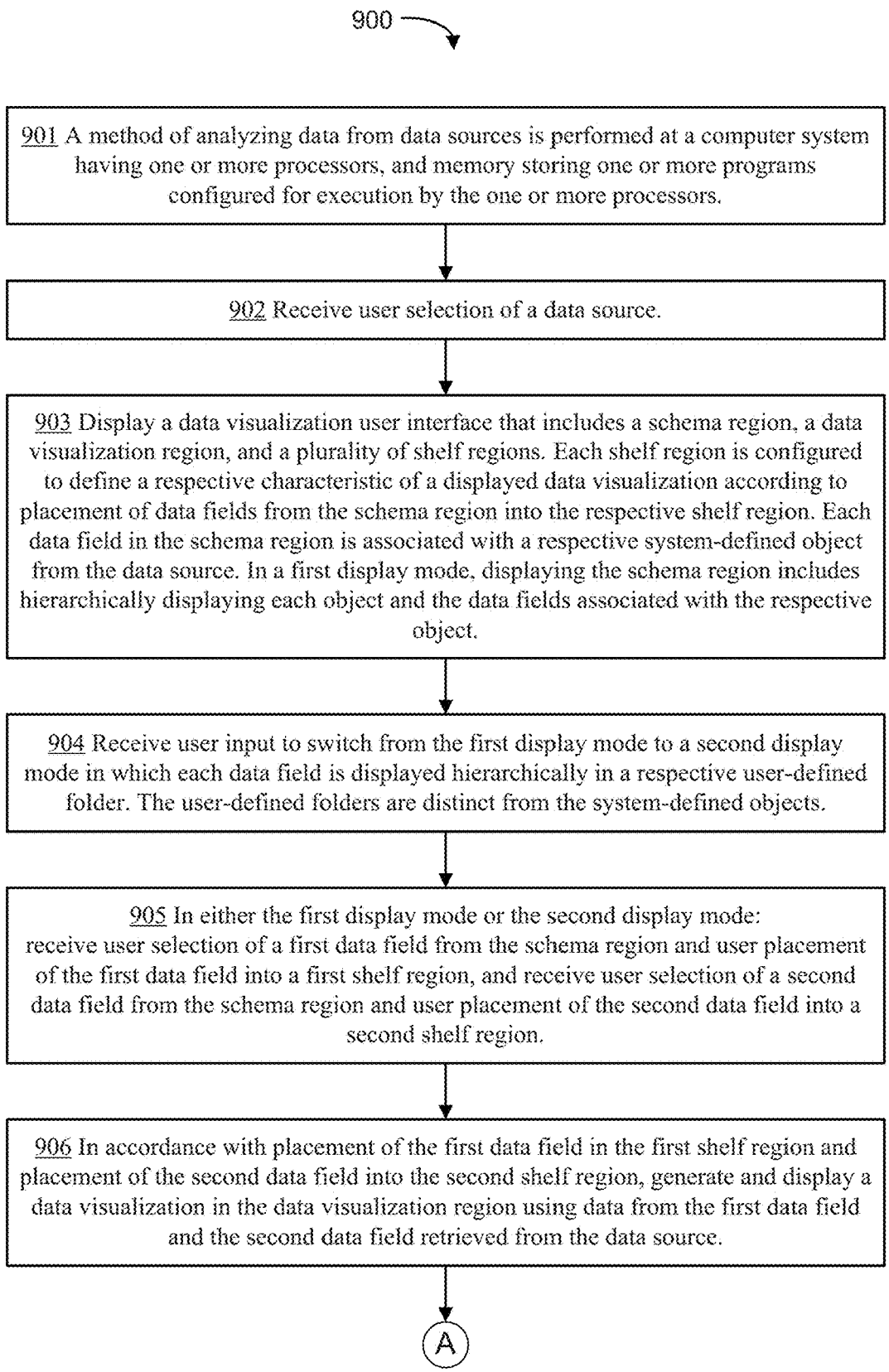
Figure 9B:
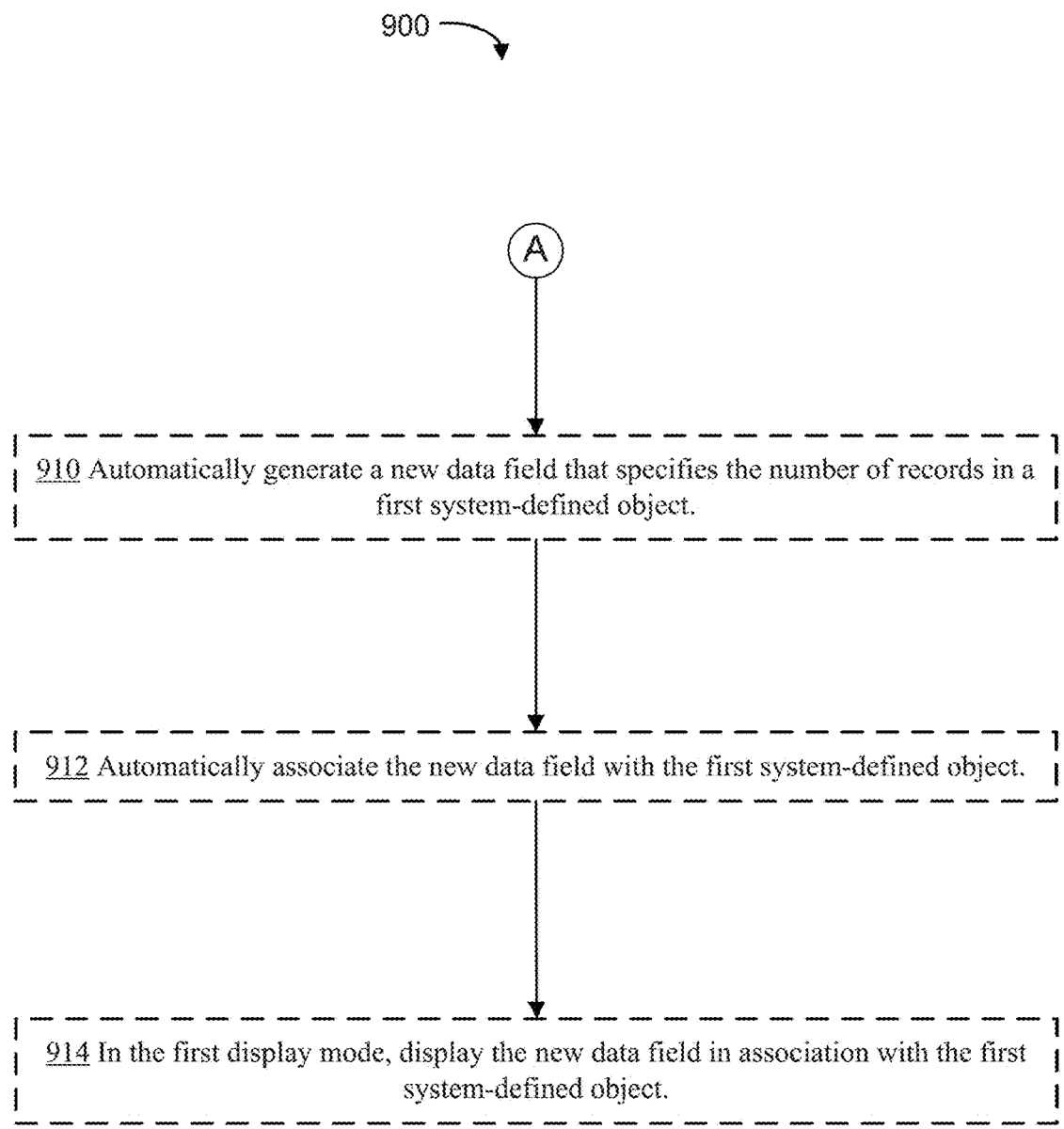
Figure 9D:
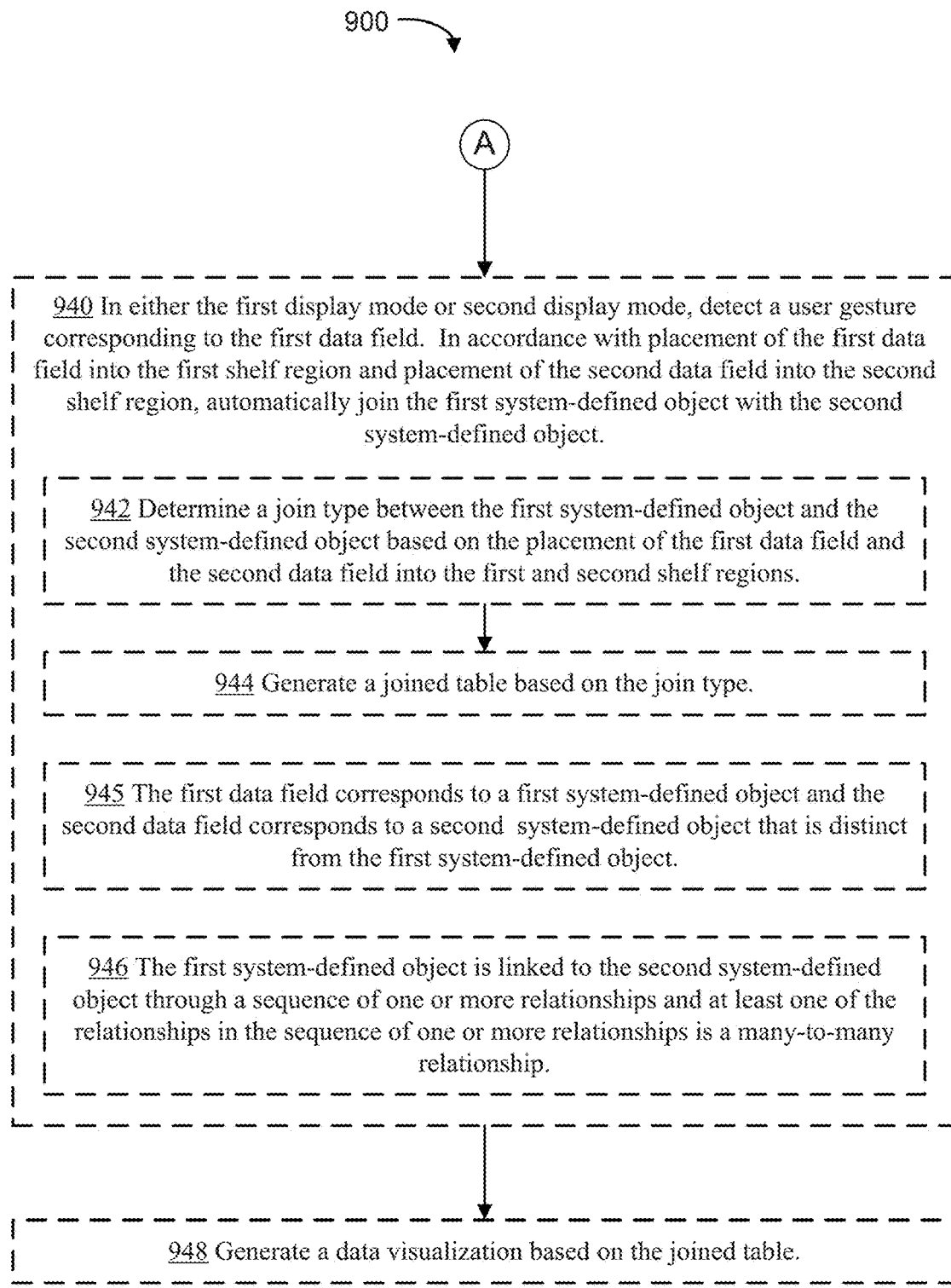
Figure 9E:
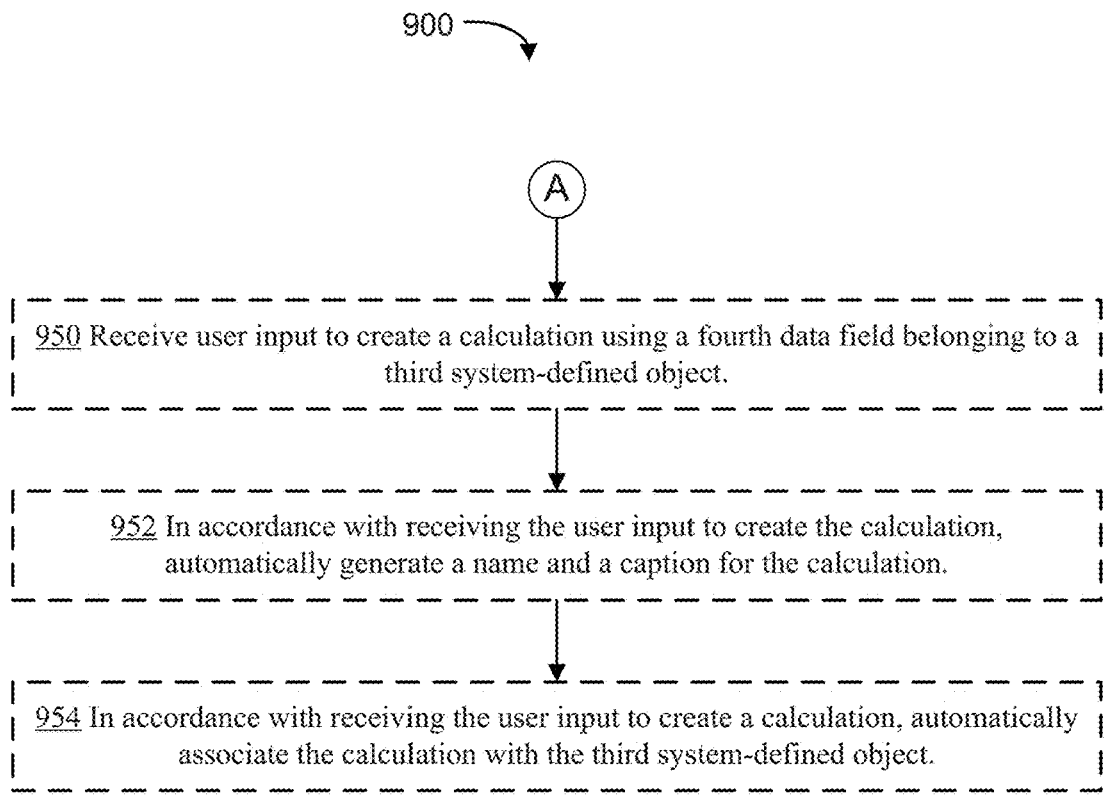
Figure 9F:
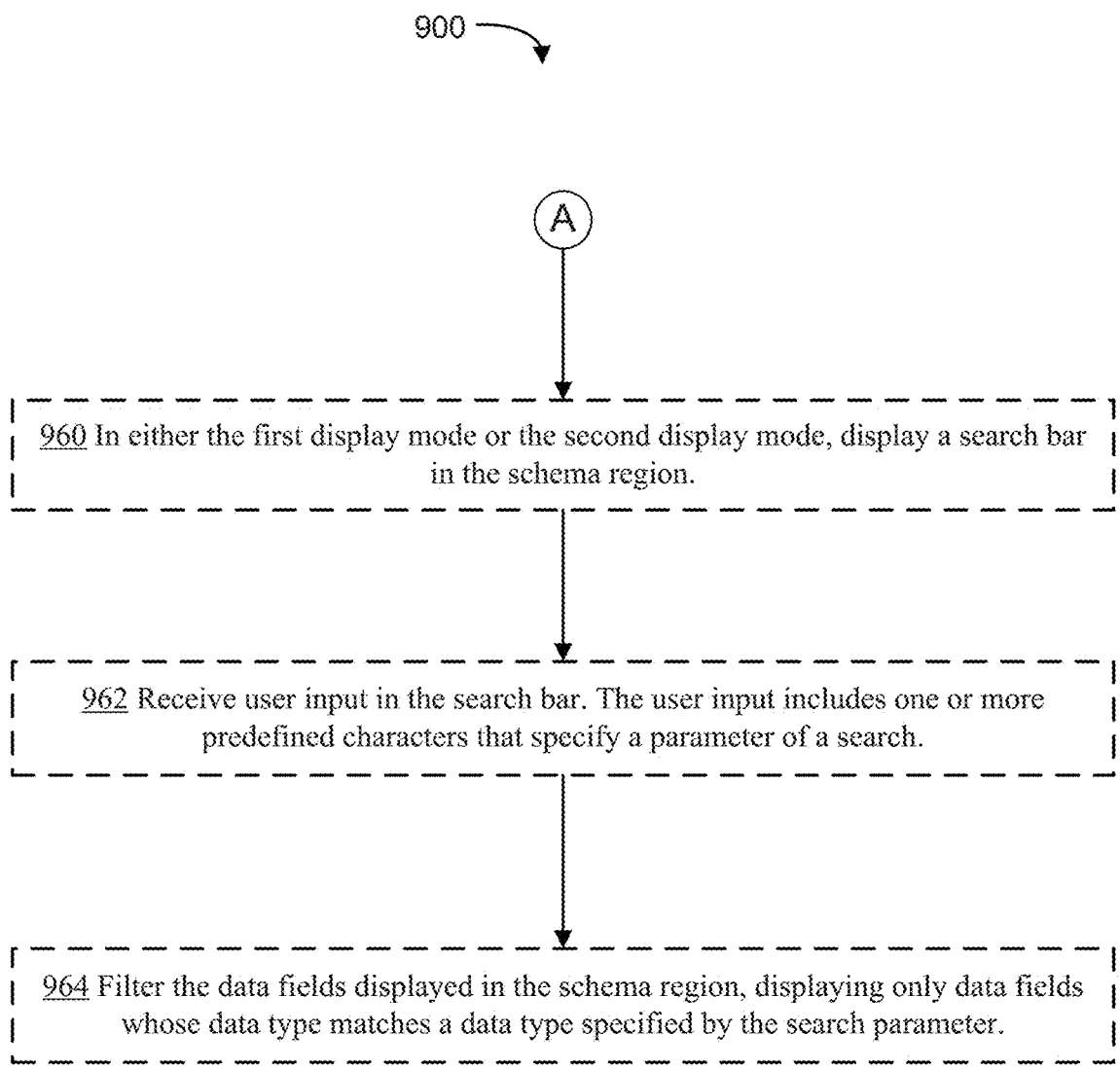
Figure 9G:
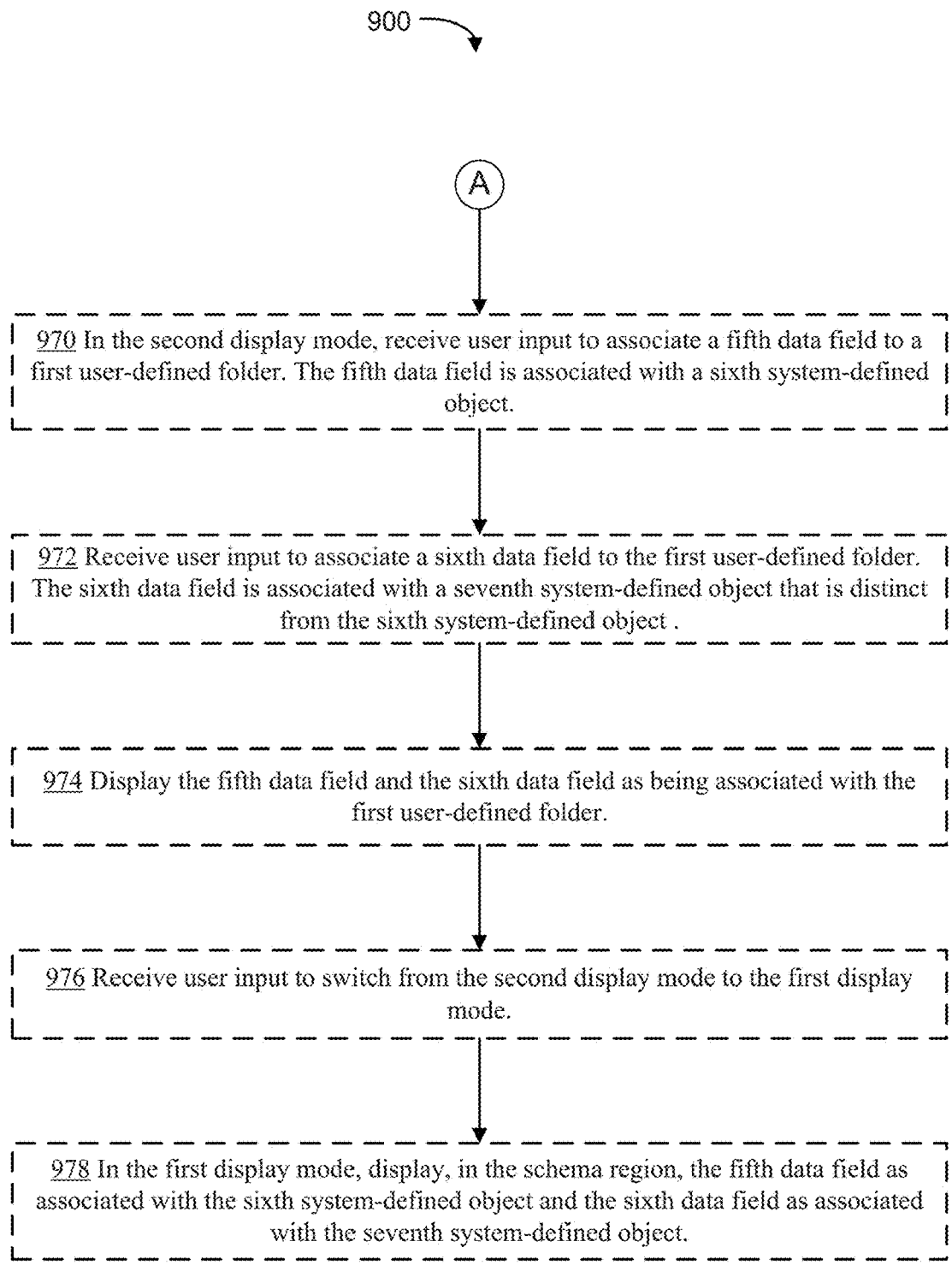
Figure 10A:
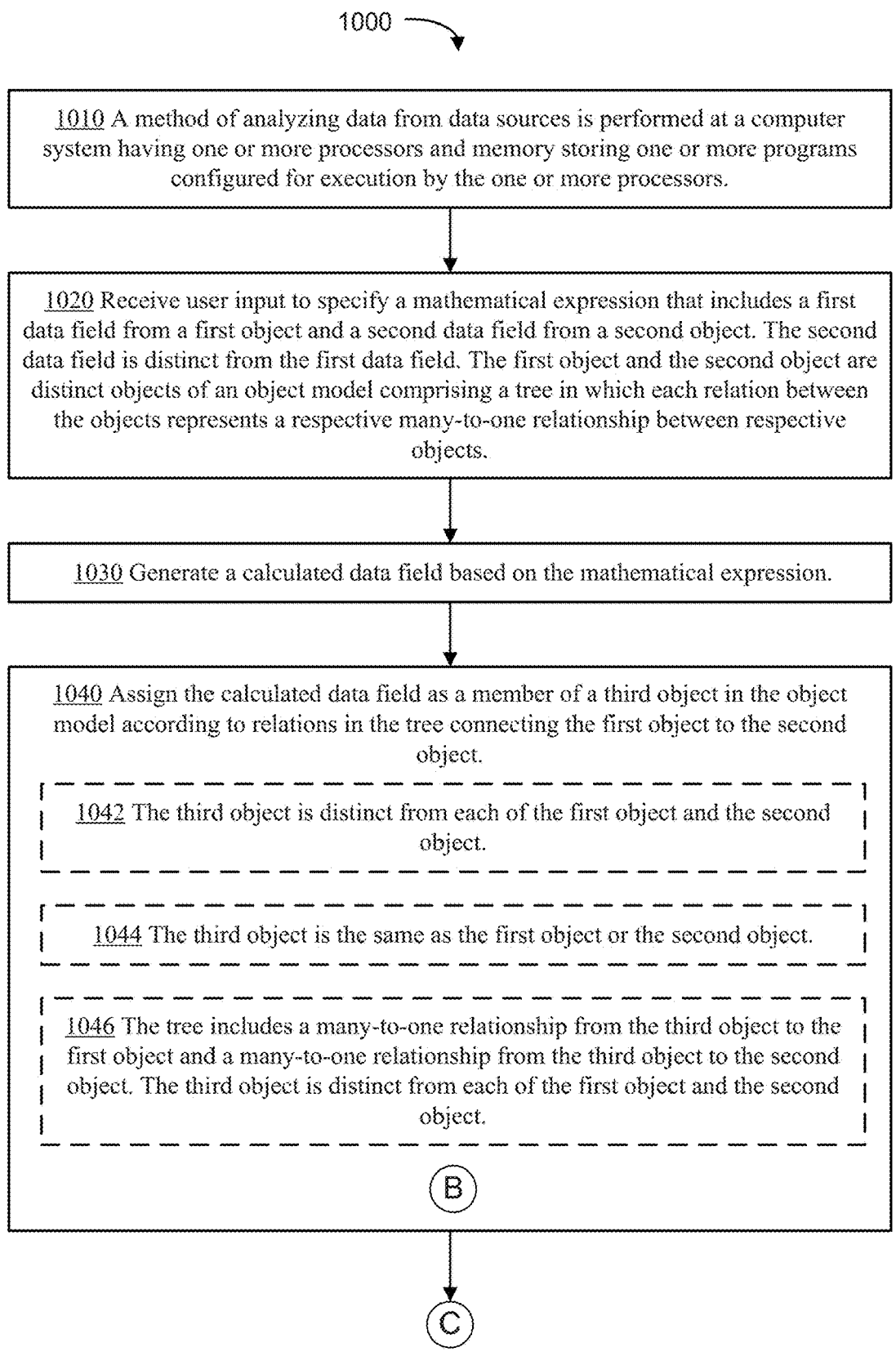
Figure 10B:
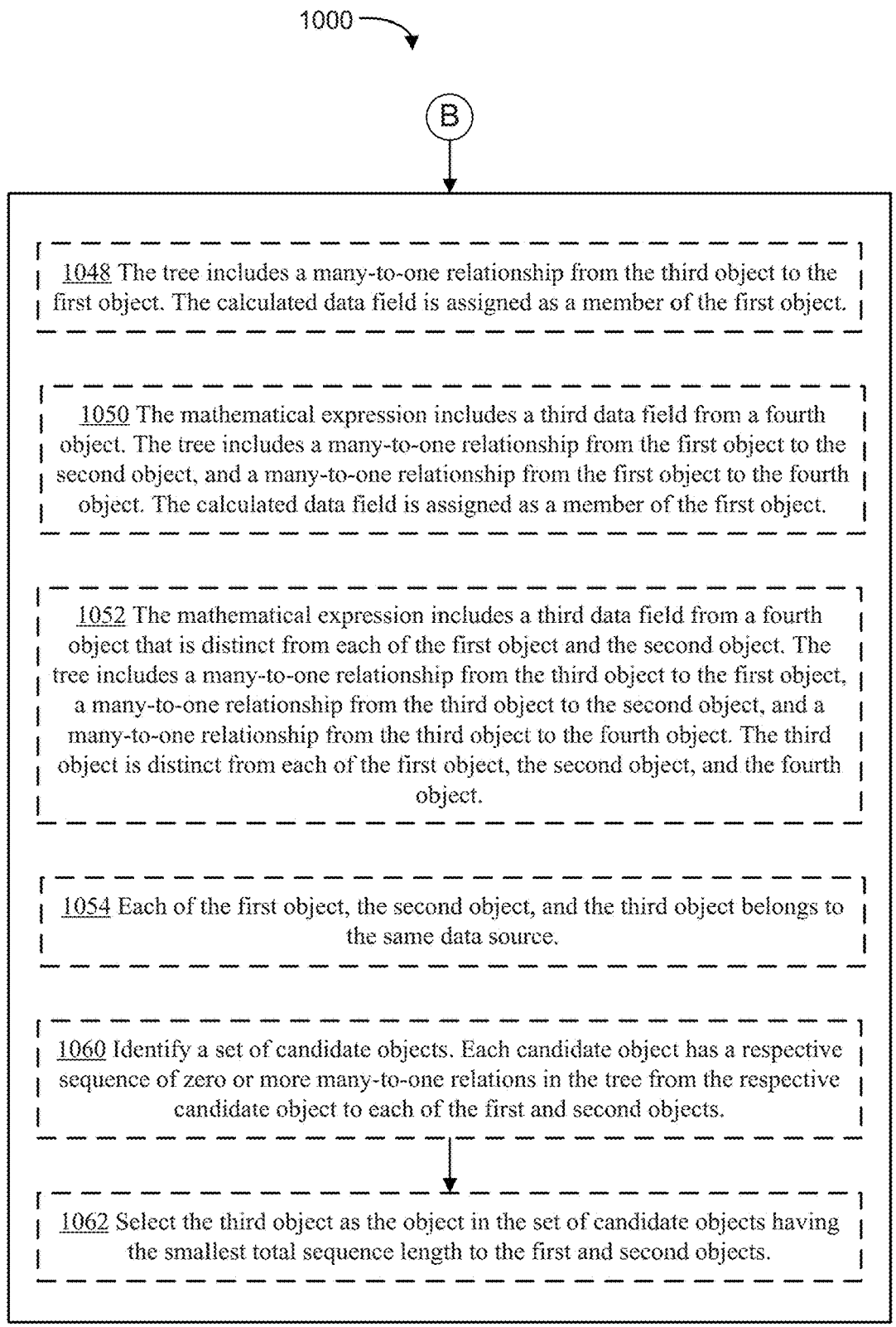
Figure 10C:
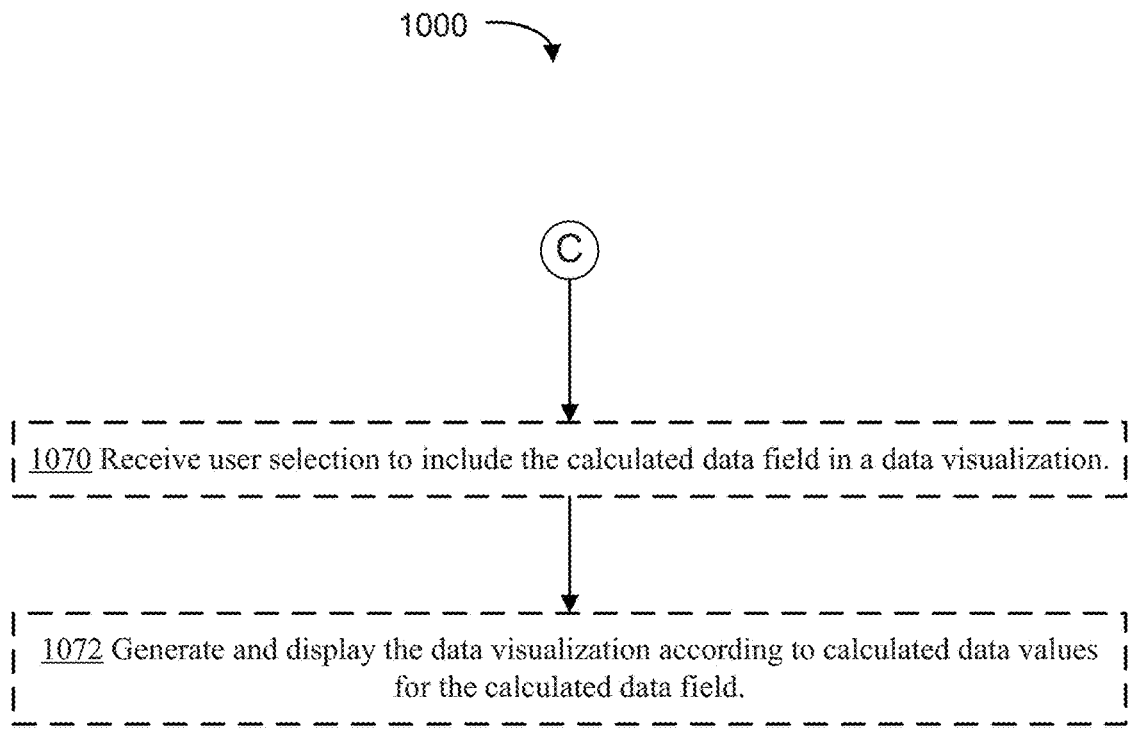
Figure 10D:
Figure 10E:
Figure 10F:
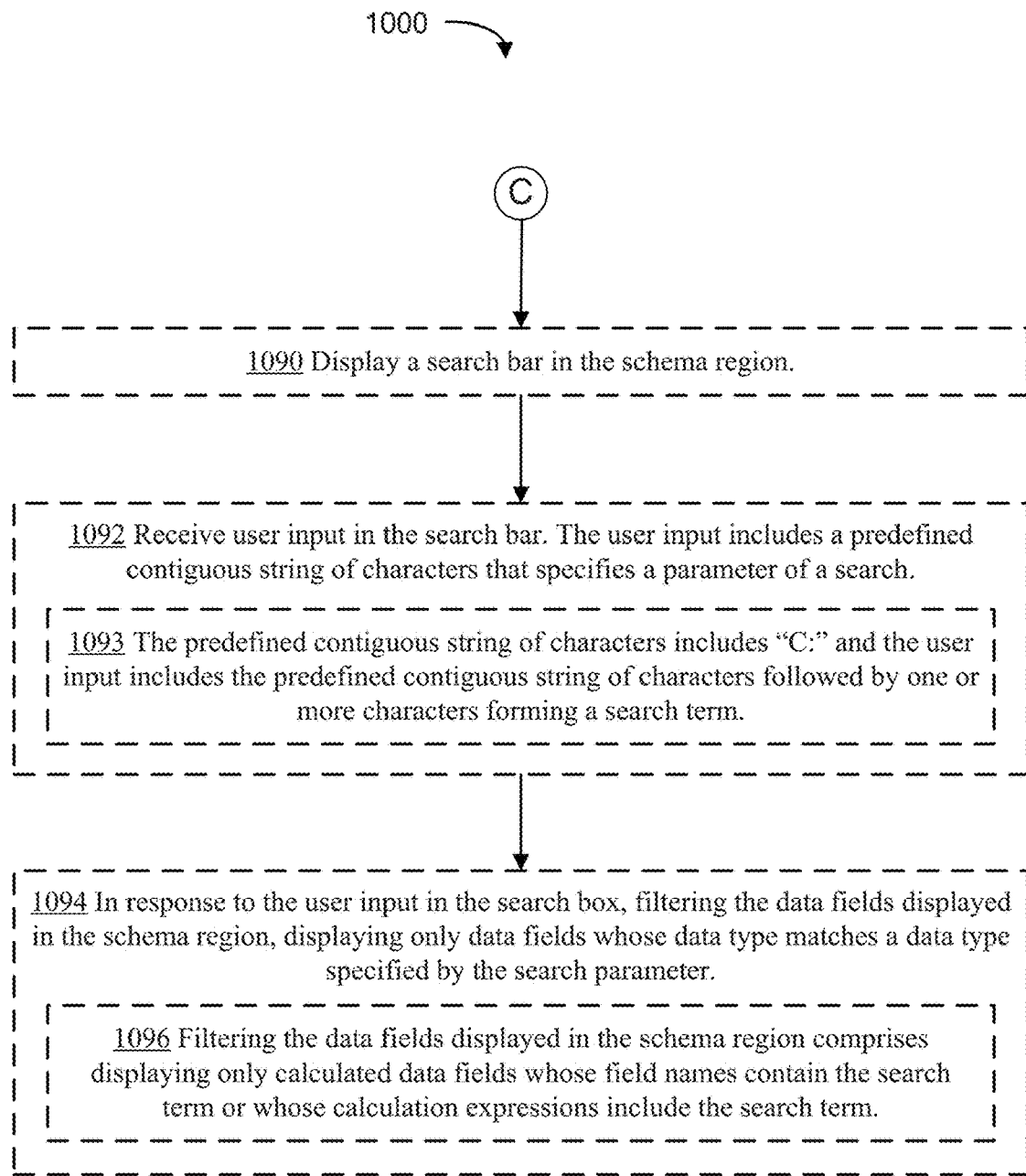

FIGS. 7A-7C and 8A-8P illustrate an example of analyzing data using data visualization application 222. FIGS. 7A-7C show a graphical user interface 140 displaying a data source screen and FIGS. 8A-8P show the graphical user interface 140 displaying a data visualization screen that allows a user to perform data analysis.

FIGS. 7A-7C show a graphical user interface 140 displaying a data source screen for visualizing an object model according to some implementations. A data source is represented by an object model that includes information regarding the relationship between different data sets (e.g., data objects, tables) within the data source. The data source screen provides a visual representation 710 (e.g., diagram) of the object model that includes the data objects in the object model and how the data objects relate to one another. FIG. 7A illustrates an object model that includes 8 different data objects. In this example, each book has one author and thus, the object model shows a 1-to-many relationship between the "Author" data object and the "Book" data object (e.g., each book has one author, but each author may have written multiple books). In this example, the user has selected the "Author" data object, and data fields 712 (e.g., columns in the data table) in the selected "Author" data object are shown. In this example, there are seven data fields 712-1 to 712-7. The data source screen 700 also provides a visual indication of whether a specific data field is a field that was generated by a user (e.g., a user-generated field) in the data visualization application 222. For example, a line 714-1 above the data field 712-1 indicates that data field 712-1 is a data field that is extracted or linked from the database corresponding to the "Author" data object. In contrast, the absence of a line at position 714-7 above the data field 712-7 indicates that the data field 712-7 is a user-generated data field that does not exist in the database. In this example, the data field 712-7 is a user-generated data field that is a concatenation of the information from two other data fields in the data object: the authors first name (data field 712-2) and the author's last name (data field 712-3). While data field 712-7 appears in the "Author" data object and the object model in data visualization application 222, data field 712-7 may not appear in the database from which the "Author" data object is linked or extracted.

Details regarding the data objects and the relationship between two data objects in the object model are also provided. For example, as shown in FIG. 7B, in response to a user gesture (e.g., click, double click, hover) over line 722 which represents the relationship between the "Award" data object and the "Book" data object, the graphical user interface 140 displays additional information regarding the relationship. In this case, the relationship is between the "Book" and "Award" data objects, the relationship is a many-to-may relationship type (e.g., a book may have many awards and a specific award may be awarded to many different books), and that the data field "Title" in the "Book" data object is related to the "Title (Award)" data field in the "Award" data object. In some implementations, as shown, the addition information is displayed via a pop-up window 720. In another example, shown in FIG. 7C, in response to a user gesture (e.g., click, double click, hover) over the "Book"

data object icon, additional information regarding the data object is provided. In this case, the additional information shows that the "Book" data object includes two tables that have been joined together. In some implementations, the additional information is provided in a pop-up window 724. In some implementations, the additional information also provides instructions of additional gestures that may cause the graphical user interface 140 to display more information. For example, a suggestion or tip is provided in the pop-up window 724, "double-click this table to see joins."

To analyze data from a multi-object data source, the relationships in the object model are leveraged when performing analysis (e.g., performing calculations and generating data visualizations) using data from the data source. For example, data fields from different data sets may be used without the user having to join (or define a join type between) two different data sets in the data source. This allows the relationships between data objects in the object model to be flexible and adapt as the user develops their analysis. By using flexible relationships in the object model opposed to generating a new table by joining multiple data sets from the object model, incorrect aggregations and duplications that may occur when joining data sets are avoided. For example, to generate a first data visualization using data fields from two different data objects (e.g., two different physical tables in the database), the relationships between the data objects to which the two data fields belong is used to determine what type of join should be performed in order to accurately generate desired data visualization. This process is repeated for each individual analytical step (e.g., generation of a data visualization or performing a calculation). Thus, two tables may be joined in a first way (e.g., an inner join) for a first data visualization and the same two tables may be joined in a second way (e.g., a left join, an outer join), different from the first way, for a second data visualization that utilizes data fields from the same two tables. The joined or unionized table generated for the first data visualization has no bearing or effect on join performed for the second data visualization and vice versa. By leveraging the relationships between objects in an object model to perform joins "as needed," the user is not restricted in their data analysis options and can have confidence in data analysis results.

When working via a data visualization application that provides a user interface, a user's workspace or workbook may be automatically organized using the relationships in the object model. FIG. 8A illustrates the graphical user interface 140 displaying a workspace screen in the object-based mode for the data source shown in FIGS. 7A-7C. The graphical user interface 140 displays the schema region 150, one or more shelf regions 152 (e.g., shelf regions 152-1 and 152-2), and a data visualization region 154. In the object based mode, data fields are listed underneath the data object to which they belong in the schema region. FIG. 8B illustrates a zoom in of the schema region 150 in the object-based mode. As shown in FIGS. 8A and 8B, all data fields (including data fields that are automatically generated by the data visualization application 222) that belong to the "Author" data object are listed under the "Author" table heading. Similarly, all data belong to the "Book" data object are listed under the "Book" table heading. Additionally, the data fields are categorized based on whether the field is a Dimension or a Measure. Data fields that are Dimensions are shown above the line 410 and data fields that are Measures are shown below line 410.

Additionally, the data visualization application 222 may automatically generate one or more data fields corresponding to a data object of the object model. In this example, the data fields "Author (Count)," "Book (Count)," and "Checkouts (Count)" are automatically generated by the data visualization application 222. In response to a user gesture (e.g., click, double click, hover) over the "Author (Count)" data field, the graphical user interface displays information regarding the system-generated data field (e.g., application-generated data field). In this example, the "Author (Count)" data field is an automatically generated data field that provides a number of records (e.g., number of rows) that are in the "Author" data object. Further, the system-generated data field is automatically associated with the data object to which they are providing a count of a number of records. As shown in FIGS. 8A and 8B, the "Author (Count)" data field is automatically associated with the "Author" data field and thus, listed underneath the "Author" data field. Similarly, the "Book (Count)" data field is automatically associated with the "Book" data field and thus, listed underneath the "Book" data field. In some implementations, data fields, calculations, and/or data visualizations that are generated (e.g., user-generated, or automatically generated by the data visualization application 222) may be automatically associated with a particular data object in the object model based on the relationships in the object model.

In some implementations, the data visualization application 222 automatically generates a count data field for every data object in the object model. In some implementations, the data visualization application 222 automatically generates a count data field for a subset, less than all, of the data objects in the object model. In some implementations, in response to a change in the information in the data object, the count data field corresponding to the object is automatically updated. For example, if a new author is added to the "Author" data object, the "Author (Count)" data field would be automatically updated to reflect the new number of records in the Author" data object. These system-generated data fields can be used in the user's analysis, such as in generating calculations and data visualizations.

FIG. 8C illustrates switching from the object-based mode to the folder-based mode. In some implementations, in response to a user gesture (e.g., right click in the schema region 150, selection of icon 810), the graphical user interface 140 displays a pop-up window or drop down menu 540 that includes options for the user to switch to the folder-based mode (e.g., by selecting the "Group by Folder" option). In response to a user selection to switch to the folder-based mode, the schema region 150 is updated to show data fields based on their association with user-defined folders, as shown in FIG. 8D. In the folder-based mode, the user can group any data fields (including system-generated data fields) from any data object in the object model into user-defined folders. In this example, the user has grouped the fields "AuthorID (Author)" (from the "Author" data object") "Author Name," "Award (Award)" (from the "Award" data object), and "Checkout Month" into a same folder that is currently named "Folder 1." The other data fields in the data object (such as the "Auth ID" data field and the "Birthday" data field) are displayed in schema region 150 as not being associated with any user-defined folders.

FIGS. 8D-8K illustrate an example of performing data analysis using data visualizations generated from the object model. As shown in FIG. 8D, a user has associated the "Edition (Count)" data field with the first shelf region 152-1 (shown abbreviated in the shelf region 152-1 as "CNT (Edition)") and associated the "Title" data field with the second shelf region 152-2. In order to generate the resulting data visualization, displayed in data visualization region 154, the data visualization application 222 performs a join between the "Edition (Count)" data field from the "Edition" data object and the "Title" data field from the "Book" data object. The data visualization application 222 uses the one-to-many relationship between the "Book" data object to the "Edition" data object (e.g., one book can have many editions) to determine and perform a left join between the "Book" data object to the "Edition" data object in order to generate the displayed data visualization. By performing a left join, the data visualization will include any books that may not have a listed edition and thus, no books are accidentally dropped from the data visualization. In other words, the data visualization application 222 automatically aggregates the "Edition (Count)" data field by the "Title" data field. The left join performed between the "Book" data object and the "Edition" data object is specific for generating this data visualization and does not change the object model or the relationships between the data objects in the object model.

Referring to FIG. 8F, in response to a user selection of an icon 820, the data visualization displays a numerical value corresponding to each visual mark (e.g., bar) displayed in the data visualization.

Referring to FIG. 8G, in response to a user selection of an icon 822, the data visualization displays the visual marks in order based on the number of editions each title (e.g., book) has. In some implementations, in response to a second user selection of the icon 822, the data visualization displays the visual marks in reverse-order, based on the number of editions each title (e.g., book) has.

Referring to FIG. 8H, in response to a user gesture (e.g., click, double click, hover) over a visual mark, the data visualization displays information corresponding to the visual mark. In this example, in response to a user hovering their mouse over a visual mark, the data visualization displays a pop-up window 824-1 that shows that the visual mark corresponds to a book with the title "Zero over Twelve" and that that title has 2 editions.

Referring to FIG. 8I, the user has generated a new data visualization by associating the "Edition (Count)" data field with the first shelf region 152-1 (shown abbreviated in the shelf region 152-1 as "CNT(Edition)") and associating the "Author Name" data field with the second shelf region 152-2. In order to generate the resulting data visualization, displayed in data visualization region 154, the data visualization application 222 aggregates the "Edition (Count)" data field by the "Author Name" data field. The aggregation performed between the "Author" data object and the "Edition" data object is specific for generating this data visualization, different and distinct from the aggregation described above with respect to FIG. 8E, and does not change the object model or the relationships between the data objects in the object model. The resulting data visualization shows a number of book editions that each author has. In response to a user hover over a visual mark, information corresponding to the visual mark is displayed in a pop-up window 824-2.

By performing aggregating the data as described, the data visualization will include any authors that may not have a listed edition and thus, no authors are accidentally dropped from the data visualization. FIG. 8J shows the data visualization displayed in a rank order. As shown, multiple authors (e.g., Wendell Barton, Robert Milofsky, etc.) that do not have any book editions are included in the data visualization and not accidentally dropped.

Referring to FIG. 8K, the schema region 150 includes a search box 830 (e.g., search bar, search field). The search box 830 is accessible in both the object-based display mode and the folder-based display mode. The search box 830 is configured to perform incremental search, as shown in FIG. 8K. In this example, the user has typed in "au" and the schema region 150 is updated to only display data fields that include the letters "au" in their data field name. In this example, the graphical user interface 140 is in the object-based mode and thus, the search results are shown grouped under the data object to which they belong. In the folder-based mode, the search results are shown grouped under the folder to which they belong (e.g., have been associated with).

Referring to FIG. 8L, the schema region 150 also includes a search filter icon 832. In response to a user selection (e.g., click, double click, hover) over the search filter icon 832, a plurality of filter options 834 are displayed (e.g., via a pp-up window or drop-down menu). The data visualization application 222 includes a filter search function that allows the user to filter search results by category. For example, search results can be filtered to show only data fields that are a calculation, only data fields that are a Dimension, only data fields that are a Measure, and/or only data fields that include comments. Additionally, the filter search function includes predefined sets of characters that can be used as shorthand in order to implement the search filter function when using the search box 830. For example, as shown in FIG. 8M, the user types in a predefined set of characters, "C:", that correspond to a filter by calculations function, in the search box 830. In response to the user input of "C:", the schema region 150 is updated to show only data fields that are calculations. Further, if the user were to type in "C: ID", the schema region 150 will show only data fields that are calculations and include the characters "ID" in the data field name. In another example, shown in FIG. 8N, the user may type "F: certifi" in the search box 830, and the schema region 150 will only display data fields that include the characters "certifi" in the comments. In this example, a user gesture (e.g., click, double click, hover) over the "isbn" data field shows that the "isbn" data field includes a comment "certified ISBN."

FIGS. 8O and 8P illustrate an example of data visualization that is generated using a calculation. FIG. 8O shows a data visualization generated based on the association of the "Sales (Count)" data field with the first shelf region 152-1 and the association of the "Title" and "Isbn" data fields with the second shelf region 152-2. In order to generate the data visualization shown in the data visualization region 154, the data visualization application aggregates the "Sales (Count)" data field (which represents a number of sales) by the "Title" and "Isbn" data fields. The resulting data visualization displayed in the in data visualization region 154 shows how many sales were made for each book title and ISBN. However, if a user wanted to know how much money was made rather than how many books were sold (since not all books are priced the same), the user may include a calculation in the shelf region. As shown in FIG. 8P, the user may edit a data field in the shelf region to include a calculation. In this example, the user has associated a calculation with the first shelf region 152-1. The calculation defines a data field that provides a total sum of the price of the book multiplied by the number of sales. Thus, the data visualization application aggregates the calculated field over book titles and ISBNs in order to generated the displayed data visualization. Since there are two data fields associated with the first shelf region 152-1, the data visualization region 154 shows two bar charts: the left bar chart indicating a number of sold books by title and ISBN and the right bar chart showing a total sales value (in dollars) by title and ISBN.

FIGS. 9A-9G provide flow charts of a method 900 of analyzing data from data sources in accordance with some implementations. The method 900 is performed (901) at a computer system having one or more processors and memory that stores one or more programs configured for execution by the one or more processors. The method 900 includes receiving (902) user selection of a data source and displays (903) a data visualization user interface 140 (e.g., a graphical user interface 140) that includes a schema region 150, a data visualization region 154, and a plurality of shelf regions 152 (e.g., shelf regions 152-1 and 152-2). Each shelf region 152 is configured to define a respective characteristic of a displayed data visualization according to placement of data fields from the schema region 150 into the respective shelf region 152. Each data field in the schema region 150 is associated with a respective system-defined object from the data source. In a first display mode (e.g., object-based display mode), displaying the schema region 150 includes hierarchically displaying each object and the data fields associated with the respective object. The method 900 also includes receiving (904) user input to switch from the first display mode to a second display mode (e.g., folder-based display mode) in which each data field is displayed hierarchically in a respective user-defined folder. The user-defined folders are distinct from the system-defined objects. The method 900 also includes, in either the first display mode or the second display mode, receiving (905) user selection of a first data field from the schema region 150 and user placement of the first data field into a first shelf region 152-1, and receiving (905) user selection of a second data field from the schema region 150 and user placement of the second data field into a second shelf region 152-2. The second data field is different (e.g., distinct) from the first data field and the second shelf region 152-2 is different (e.g., distinct) from the first shelf region 152-1. In accordance with placement of the first data field in the first shelf region and placement of the second data field into the second shelf region, the method 900 also includes generating (906) and displaying (906) a data visualization in the data visualization region 154 using data from the first data field and the second data field retrieved from the data source. An example of switching between the first and second display modes is provided with respect to FIG. 4F (e.g., see user selection of the "Group by Folder" option in the drop down menu 530 in order to switch from an object-based display mode to a folder-based display mode).

In some implementations, the method 900 also includes automatically generating (910) a new data field that specifies a number of records in a system-defined object, automatically associating (912) the new data field with the system-defined object, and displaying (914), in the first display mode, the new data field in association (e.g., as being associated) with the system-defined object. For example, the computer may automatically generate an application-generated field (e.g., a "number of records" data field as shown in FIG. 4A) in response to a first data field being associated with a first system-defined object. The application-generated field is automatically associated with the system-defined object and is displayed in the schema region 150 of the user interface 140 as being associated with the first system-defined object.

In some implementations, the method 900 includes detecting (920), in the second display mode, a user gesture (e.g., single-click, double-click, hover) corresponding to the first data field. In accordance with detection of the user gesture corresponding to the first data field, the method 900 includes displaying (922) a system-defined object that is associated with the first data field. An example is provided in FIG. 5D, where in response to a user gesture (in this example, a hover) corresponding to the "Product Name" data field (that is associated with the "Orders" user defined folder), the user interface 140 displays, in the schema region 150, the system-defined object to which the "Product Name" data field belongs (e.g., the "sales data" system-defined object).

In some implementations, the method 900 also includes, in either the first display mode or second display mode, detecting (940) a user gesture corresponding to the first data field. In accordance with placement of the first data field into the first shelf region 152-1 and placement of the second data field into the second shelf region 152-2, the method also includes automatically joining (940) the first system-defined object with the second system-defined object. Automatically joining (940) the first system-defined object with the second system-defined object includes: (i) determining (942) a join type between the first system-defined object and the second system-defined object based on the placement of the first and second data field into the first and second shelf regions 152-1 and 152-2, and (ii) generating (944) a joined table based on the join type. An example of performing a join "as needed" is provided with respect to FIG. 8D.

In some implementations, the first data field corresponds (945) to a first system-defined object and the second data field corresponds to a second system-defined object that is distinct from the first system-defined object.

In some implementations, the first system-defined object is linked (946) to the second system-defined object through a sequence of one or more relationships and at least one of the relationships in the sequence of one or more relationships is a many-to-many relationship.

In some implementations, the method 900 also includes generating (948) a data visualization based on the joined table.

In some implementations, the method 900 further includes receiving (950) user input to create a calculation (e.g., a calculated field) using a fourth data field belonging to a third system-defined object. In accordance with receiving the user input to add the calculation, the method 900 also includes automatically generating (952) a name and a caption for the calculation. In accordance with receiving the user input to add the calculation, the method 900 also includes automatically associating (954) the calculation with the third system-defined object.

In some implementations, the method 900 also includes, in either the first display mode or the second display mode, displaying a search box 830 in the schema region 150 and receiving (962) user input in the search box 830. The user input includes one or more predefined characters that specify a parameter of a search. The method 900 also includes filtering (964) the data fields displayed in the schema region, displaying only data fields whose data type matches a data type specified by the search parameter. Examples of receiving user input that includes one or more predefined characters (such as "C:", "D:", "M", and "F:") are provided in FIGS. 8L-8N.

In some implementations, the method 900 includes, in the second display mode, receiving (970) user input to associate a fifth data field that belongs to (e.g., is associated with) a sixth system-defined object to a first user-defined folder. The method 900 also includes receiving (972) user input to associate a sixth data field to the first user-defined folder.

The sixth data field is associated with a seventh system-defined object that is distinct from the sixth system-defined object (e.g., the fifth data field and the sixth data field each belong to (e.g., are each associated with different system-defined objects). The method 900 further includes displaying (974), in the second display mode, the first data field and the sixth data field as being associated with the first user defined folder. The method 900 also includes receiving (976) user input to switch from the second display mode to the first display mode and displaying (978), in the schema region 150 while in the first display mode, the fifth data field as associated with the sixth system-defined object and the sixth data field as associated with the seventh system-defined object. An example of switching between the first and second display modes is provided with respect to FIG. 4F (e.g., see user selection of the "Group by Folder" option in the drop down menu 530 in order to switch from an object-based display mode to a folder-based display mode).

FIGS. 10A-10F provide flow charts of a method 1000 of analyzing data from data sources in accordance with some implementations. The method 1000 is performed (1010) at a computer system having one or more processors and memory that stores one or more programs configured for execution by the one or more processors. The method 1000 includes receiving (1020) user input to specify a mathematical expression that includes a first data field from a first object (e.g., a first system-defined object, first data object) and a second data field from a second object (e.g., a second system-defined object). The second data field is distinct from the first data field. The first object and the second object are distinct objects of an object model 102 that includes a tree in which each relation between the objects 104 (e.g., objects 104-1 and 104-2) represents a respective many-to-one relationship between respective objects. The method 1000 also includes generating (1030) a calculated data field (e.g., a calculation) based on the mathematical expression. The method 1000 further includes assigning (1040) the calculated data field as a member of (e.g., belonging to) a third object (e.g., a system-defined object) in the object model 102 according to relations (e.g., relationships) in the tree connecting the first object to the second object. FIG. 6E provides an example of generating a calculated data field (e.g., calculation).

In some implementations, the third object is (1042) distinct (e.g., different) from each of the first object and the second object.

In some implementations, third object is (1044) the same as the first object or the second object.

In some implementations, the tree includes (1046) a many-to-one relationship from the third object to the first object and a many-to-one relationship from the third object to the second object. The third object is distinct from each of the first object and the second object.

In some implementations, the tree includes (1048) a many-to-one relationship from the third object to the first object. The calculated data field is assigned as a member of the first object.

In some implementations, the mathematical expression includes (1050) a third data field from a fourth object (e.g., a system-defined object). The tree includes a many-to-one relationship from the first object to the second object, and a many-to-one relationship from the first object to the fourth object. The calculated data field is assigned as a member of the first object.

In some implementations, the mathematical expression includes (1052) a third data field from a fourth object that is distinct from each of the first object and the second object. The tree includes a many-to-one relationship from the third object to the first object, a many-to-one relationship from the third object to the second object, and a many-to-one relationship from the third object to the fourth object. The third object is distinct from each of the first object, the second object, and the fourth object.

In some implementations, each of the first object, the second object, and the third object belongs (1054) to the same data source.

In some implementations, the method 1000 further includes identifying (1060) a set of candidate objects. Each candidate object has a respective sequence of zero or more many-to-one relations in the tree from the respective candidate object to each of the first and second objects. The method 1000 selects (1062) the third object as an object in the set of candidate objects that has the smallest total sequence length to the first and second objects.

In some implementations, the method 1000 includes receiving (1070) user selection to include the calculated data field in a data visualization, and generating (1072) and displaying (1072) the data visualization according to the calculated data values for the calculated data field. An example of a data visualization that uses a calculated data field is provided with respect to FIGS. 8O and 8P.

In some implementations, the method 1000 further includes automatically generating (1074) a name and a caption that is associated with the calculated data field. An example is provided in FIG. 6E, where the data visualization application 222 automatically generates the name "Calculation1" for the calculated data field. For example, referring to FIG. 6E, a name and caption, "Calculation1," is automatically generated for the calculated data field.

In some implementations, the method 1000 further includes, in a first display mode (e.g., object-based display mode) of a user interface 140 (e.g., a graphical user interface 140), displaying (1080) the first calculated field as belonging to the third object (e.g., system-defined object), in a schema region 150 of the user interface 140. The method 1000 also includes receiving (1081), in the first display mode, a user input to switch from the first display mode to a second display mode (e.g., folder-based display mode) that is different from the first display mode. The method 1000 also includes, in the second display mode, displaying (1082), in the schema region 150, the calculated data field as belonging to a default folder, and receiving (1083) a user input to associate the calculated data field with a user-defined folder that is distinct from the default folder. An example of switching between the first and second display modes is provided with respect to FIG. 4F (e.g., see user selection of the "Group by Folder" option in the drop down menu 530 in order to switch from an object-based display mode to a folder-based display mode). An example of automatically associating a calculated field with a default folder (e.g., "No Object" section 420) is provided with respect to FIG. 4E.

The method 1000 also includes displaying (1084), in the schema region 150 of the user interface 140, the calculated data field as belonging to the user-defined folder, and in the second display mode, receiving (1085) user input to associate the first data field with the user-defined folder. The method 1000 also includes displaying (1086), in the schema region 150 of the user interface 140 while in the second display mode, the first data field and the calculated data field as belonging (e.g., being associated with) the same user-defined folder.

In some implementations, the method 1000 further includes displaying (1090) a search box 830 in a schema region 150, and receiving (1092) user input in the search box

830. The user input includes a predefined contiguous string of characters that specifies a parameter of a search. In response to the user input in the search box, the method filters (1094) the data fields displayed in the schema region, displaying only data fields whose data type matches a data type specified by the search parameter. Examples of receiving user input that includes one or more predefined characters (such as "C:", "D:", "M", and "F:") is provided in FIGS. 8L-8N.

In some implementations, the predefined contiguous string of characters includes (1093) "C:" and the user input includes the predefined contiguous string of characters followed by one or more characters corresponding to a search term. In some implementations, "C:" is a parameter that designates searching for calculated data fields ("D:" designates dimensions, "M:" designates measures, and "F:" designates searching comments). The predefined contiguous string of characters ("C:") specifies searching only calculated data fields. In this case, filtering the data fields displayed in the schema region comprises (1096) displaying only calculated data fields whose field names contain the search term or whose calculation expressions include the search term.

An example of searching using the predefined contiguous string of characters "C:" is provided with respect to FIG. 8M. Another example of a user input in the search box 830 that includes the predefined contiguous string of characters followed by one or more characters corresponding to a search term is provided with respect to FIG. 8N where the predefined contiguous string of characters is "F:" and the one or more characters corresponding to a search term is "certifi" and corresponds to (e.g., is at least a part of, is at least a subset of) the search term "certified". The only data fields display are calculated data fields that include the term "certifi".

FIGS. 11A-11B provide flow charts of a method 1100 of analyzing data from data sources in accordance with some implementations. The method 1100 is performed (1110) at a computer system having one or more processors and memory that stores one or more programs configured for execution by the one or more processors. The method 1100 includes receiving (1120) user selection of a data source, and displaying (1130) a data visualization interface 140. The data visualization interface 140 includes a schema region 150 and a search box, and each data field displayed in the schema region 150 is associated with a respective system-defined object from the data source. In a first display mode (e.g., object-based display mode), displaying the schema region includes hierarchically displaying each system-defined object and the data fields associated with the respective system-defined object. The method 1100 also includes receiving (1140) user input to switch from the first display mode to the second display mode (e.g., a folder-based display mode). In the second display mode, each data field is displayed hierarchically in a respective user-defined folder, and the user-defined folders are distinct from the system-defined objects. The method 1100 further includes receiving (1150), in either the first display mode or the second display mode, user input in the search box 830. The user input includes a predefined contiguous string of characters specifying a search parameter. The method 1100 also includes, in response to the user input in the search box 830, filtering (1160) the data fields displayed in the schema region 150, thereby displaying (1160) only data fields whose data type matches the data type specified by the search parameter. An example is provided with respect to FIG. 8M where the search box 830 includes a predefined contiguous string of characters, "C:", which specifies a search parameter resulting in displaying only data fields that are calculations.

In some implementations, the data type specified by the search parameter is (1132) one of: (i) dimension, (ii) measure, or (iii) calculation.

In some implementations, the schema region 150 includes (1142) the search box 830. FIG. 8N illustrates a schema region 150 that includes the search box 830.

In some implementations, the user input includes (1162) the predefined contiguous string of characters followed by one or more characters specifying a search string, and the search parameter specifies searching for calculated data fields. The method 1100 filters (1162) the data fields displayed in the schema region, displaying only data fields whose displayed names include the search string or whose corresponding calculation expressions include the search string. An example is provided with respect to FIG. 8N where the search box 830 includes a predefined contiguous string of characters, "C:", that specify a search parameter such that the search results display only data fields that are calculations, and one or more characters specifying a search string, "certifi."

In some implementations, the method 1100 further includes continuing to display (1170) only data fields whose data type matches the data type specified by the search parameter, even as the display mode changes. As shown in FIG. 8M, the data fields, such as "Author Name," "BookID 2," "Sales by edition," "Sales price by edition," "Sales (pre-discount), "Sales Actual," and "Sales discounted," that shown in schema region 150 are data fields whose data type matches the data type specified by the search parameter. In this example, the predefined contiguous string of characters specifies that the data type is a calculation (e.g., the data field is a calculated data field). Thus each of the data fields displayed in the schema region 150 are data fields that are calculations (e.g., are calculated data fields).

In some implementations, the method 1100 further includes receiving (1180) user selection of a data field displayed in the schema region 150 and user placement of the selected data field into a data visualization definition region (e.g., a shelf region 152) of the data visualization user interface 140.

In some implementations, the method 1100 further includes (1182) generating a data visualization based on the user selection and placement. An example of generating a data visualization using a calculated field is provided with respect to FIG. 8P.

In some implementations, the method also includes (1184) displaying the generated data visualization, including one or more visual marks corresponding to data from the selected data field. An example of generating a data visualization using a calculated field is provided with respect to FIG. 8P.

FIGS. 12A-12B provide flow charts of a method 1200 of analyzing data from data sources in accordance with some implementations. The method 1200 is performed (1210) at a computer system having one or more processors and memory that stores one or more programs configured for execution by the one or more processors. The method 1200 includes receiving (1220) user selection of a data source, and displaying (1230) a data visualization interface 140. The data visualization interface 140 includes a schema region 150 and a search box, and each data field displayed in the schema region 150 is associated with a respective system-defined object from the data source. In a first display mode (e.g., object-based display mode), the user interface displays the schema region hierarchically, displaying each system-defined object and the data fields associated with the respective system-defined object. The method 1200 also includes receiving (1240) user input to switch from the first display mode to a second display mode (e.g., a folder-based display mode). In the second display mode, each data field is displayed hierarchically in a respective user-defined folder, and the user-defined folders are distinct from the system-defined objects. The method 1200 further includes receiving (1250), in either the first display mode or the second display mode, user input in the search box 830. The user input includes (i) a predefined contiguous string of characters specifying a search parameter and (ii) a search string. The method 1200 also includes, in response to the user input in the search box 830 and a determination that the search parameter specifies a first metadata characteristic about data fields in the data source, filtering (1260) the data fields displayed in the schema region 150, thereby displaying (1260) only data fields whose metadata characteristic includes the search string. An example of a user input, in the search box 830, that includes (i) a predefined contiguous string of characters specifying a search parameter and (ii) a search string is provided with respect to FIG. 8N.

In some implementations, the schema region 150 includes (1232) the search box 830. FIG. 8N shows a schema region 150 that includes the search box 830.

In some implementations, the first metadata characteristic stores (1262) user-provided comments about data fields from the data source.

In some implementations, the method 1200 further includes detecting (1270) a user gesture (e.g., a hover, click, or double-click) corresponding to a first data field displayed in the schema region 150. In response to detecting the user gesture, the method displays (1272) a comment associated with the first data field. FIG. 8N shows an example where in response to a user gesture (in this example, a hover) over the data field "Isbn," the computer displays a comment, "Certified ISBN," which is associated with the data field "Isbn."

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for analyzing data from data sources, comprising:
at a computer system having one or more processors and memory storing one or more programs configured for execution by the one or more processors:
receiving user selection of a data source;
displaying a data visualization user interface, including a schema region and a search box, wherein:
each data field displayed in the schema region is associated with a respective system-defined object from the data source; and
in a first display mode, displaying the schema region includes hierarchically displaying each system-defined object and the data fields associated with the respective system-defined object;
receiving user input to switch from the first display mode to a second display mode in which each data field is displayed hierarchically in a respective user-defined folder, wherein the user-defined folders are distinct from the system-defined objects;
in either the first display mode or the second display mode, receiving user input, in the search box, including (i) a predefined contiguous string of characters specifying a search parameter followed by (ii) one or more characters specifying a search string; and
in response to the user input in the search box, filtering the data fields displayed in the schema region, displaying only data fields (i) whose data type matches a data type specified by the search parameter and (ii) who displayed names include the search string.

2. The method of claim 1, wherein:
the user input includes the predefined contiguous string of characters followed by one or more characters specifying a search string;
the search parameter specifies searching for calculated data fields; and
filtering the data fields displayed in the schema region further comprises displaying only data fields whose displayed names include the search string or whose corresponding calculation expressions include the search string.

3. The method of claim 1, wherein the data type specified by the search parameter is one of (i) dimension, (ii) measure, or (iii) calculation.

4. The method of claim 1, wherein receiving the user input in the search box comprises:
detecting a user gesture to display a list of predefined search parameters;
in response to detecting the user gesture, displaying the list of predefined search parameters; and
in response to receiving a user selection from the displayed list, automatically populating the search box with the predefined contiguous string of characters corresponding to the user selection from the displayed list.

5. The method of claim 1, further comprising:
continuing to display only data fields whose data type matches the data type specified by the search parameter in response to receiving the user input to switch from the first display mode to the second display mode.

6. The method of claim 1, wherein the schema region includes the search box.

7. The method of claim 1, further comprising:
receiving user selection of a data field displayed in the schema region and user placement of the selected data field into a data visualization definition region of the data visualization user interface;
generating a data visualization based on the user selection and placement; and displaying the generated data visualization, including one or more visual marks corresponding to data from the selected data field.

8. A method for analyzing data from data sources, comprising:
at a computer system having one or more processors and memory storing one or more programs configured for execution by the one or more processors:
receiving user selection of a data source;
displaying a data visualization user interface, including a schema region and a search box, wherein:
each data field displayed in the schema region is associated with a respective system-defined object from the data source; and
in a first display mode, displaying the schema region includes hierarchically displaying each system-defined object and the data fields associated with the respective system-defined object;
receiving user input to switch from the first display mode to a second display mode in which each data field is displayed hierarchically in a respective user-defined folder, wherein the user-defined folders are distinct from the system-defined objects;
in either the first display mode or the second display mode, receiving user input, in the search box, including (i) a predefined contiguous string of characters specifying a search parameter and (ii) a search string; and
in response to the user input in the search box and a determination that the search parameter specifies a first metadata characteristic about data fields in the data source, filtering the data fields displayed in the schema region, displaying only data fields whose first metadata characteristic includes the search string.

9. The method of claim 8, wherein the first metadata characteristic stores user-provided comments about data fields from the data source.

10. The method of claim 9, further comprising:
detecting a user gesture corresponding to a first data field displayed in the schema region; and
in response to detecting the user gesture, displaying a comment associated with the first data field.

11. The method of claim 8, wherein the schema region includes the search box.

12. A computing device, comprising:
one or more processors;
memory;
a display; and
one or more programs stored in the memory and configured for execution by the one or more processors, the one or more programs comprising instructions for:
receiving user selection of a data source;
displaying a data visualization user interface, including a schema region and a search box, wherein:
each data field displayed in the schema region is associated with a respective system-defined object from the data source; and
in a first display mode, displaying the schema region includes hierarchically displaying each system-defined object and the data fields associated with the respective system-defined object;
receiving user input to switch from the first display mode to a second display mode in which each data field is displayed hierarchically in a respective user-defined folder, wherein the user-defined folders are distinct from the system-defined objects;
in either the first display mode or the second display mode, receiving user input, in the search box, including (i) a predefined contiguous string of characters specifying a search parameter followed by (ii) one or more characters specifying a search string; and
in response to the user input in the search box, filtering the data fields displayed in the schema region, displaying only data fields (i) whose data type matches a data type specified by the search parameter and (ii) who displayed names include the search string.

13. The computing device of claim 12, wherein:
the user input includes the predefined contiguous string of characters followed by one or more characters specifying a search string;
the search parameter specifies searching for calculated data fields; and
filtering the data fields displayed in the schema region further comprises displaying only data fields whose displayed names include the search string or whose corresponding calculation expressions include the search string.

14. The computing device of claim 12, wherein the data type specified by the search parameter is one of (i) dimension, (ii) measure, or (iii) calculation.

15. The computing device of claim 12, wherein receiving the user input in the search box comprises:
detecting a user gesture to display a list of predefined search parameters;
in response to detecting the user gesture, displaying the list of predefined search parameters; and
in response to receiving a user selection from the displayed list, automatically populating the search box with the predefined contiguous string of characters corresponding to the user selection from the displayed list.

16. The computing device of claim 12, the one or more programs further comprising instructions for:
continuing to display only data fields whose data type matches the data type specified by the search parameter in response to receiving the user input to switch from the first display mode to the second display mode.

17. The computing device of claim 12, wherein the schema region includes the search box.

18. The computing device of claim 12, the one or more programs further comprising instructions for:
receiving user selection of a data field displayed in the schema region and user placement of the selected data field into a data visualization definition region of the data visualization user interface;
generating a data visualization based on the user selection and placement; and
displaying the generated data visualization, including one or more visual marks corresponding to data from the selected data field.

* * * * *